US011221469B2

(12) United States Patent
Ito

(10) Patent No.: US 11,221,469 B2
(45) Date of Patent: Jan. 11, 2022

(54) ZOOMING OPTICAL SYSTEM, OPTICAL APPARATUS, AND MANUFACTURING METHOD FOR THE ZOOMING OPTICAL SYSTEM

(71) Applicant: NIKON CORPORATION, Tokyo (JP)

(72) Inventor: Tomoki Ito, Kawasaki (JP)

(73) Assignee: Nikon Corporation, Tokyo (JP)

(*) Notice: Subject to any disclaimer, the term of this patent is extended or adjusted under 35 U.S.C. 154(b) by 145 days.

(21) Appl. No.: 16/656,117

(22) Filed: Oct. 17, 2019

(65) Prior Publication Data
US 2020/0049962 A1 Feb. 13, 2020

Related U.S. Application Data

(60) Division of application No. 14/809,242, filed on Jul. 26, 2015, now Pat. No. 10,459,207, which is a (Continued)

(30) Foreign Application Priority Data

Jan. 28, 2013 (JP) .................................. 2013-012752
Jan. 28, 2013 (JP) .................................. 2013-012753
(Continued)

(51) Int. Cl.
G02B 15/14 (2006.01)
G02B 15/173 (2006.01)
(Continued)

(52) U.S. Cl.
CPC ........ G02B 15/145121 (2019.08); G02B 1/11 (2013.01); G02B 1/113 (2013.01);
(Continued)

(58) Field of Classification Search
CPC ........ G02B 15/145121; G02B 15/1461; G02B 15/173; G02B 1/113; G02B 1/11;
(Continued)

(56) References Cited

U.S. PATENT DOCUMENTS 4,896,950 A * 1/1990 Endo .................... G02B 15/173
359/683
6,084,722 A 7/2000 Horiuchi
(Continued)

FOREIGN PATENT DOCUMENTS

JP 59-52215 A 3/1984
JP 59-147314 A 8/1984
(Continued)

OTHER PUBLICATIONS

International Search Report from International Application No. PCT/JP2014/000396, dated Apr. 22, 2014.
(Continued)

Primary Examiner — Robert E. Tallman
(74) Attorney, Agent, or Firm — SGPatents PLLC

(57) ABSTRACT

A zooming optical system comprises, in order from an object, a first lens group having positive refractive power, a second lens group having negative refractive power, a third lens group having positive refractive power, a fourth lens group having negative refractive power, and a fifth lens group having positive refractive power. Upon zooming, distances between adjacent lens groups of the first to the fifth lens groups change respectively. The zooming optical system further satisfies the conditional expression 9.6<ft/(−f2)<20.0, where ft denotes a focal length of the zooming optical system in a telephoto end state, and f2 denotes a focal length of the second lens group.

23 Claims, 31 Drawing Sheets

Related U.S. Application Data continuation of application No. PCT/JP2014/000396, filed on Jan. 27, 2014.

(30) Foreign Application Priority Data

| Jan. 28, 2013 | (JP) | 2013-012754 |
|---|---|---|
| Jan. 28, 2013 | (JP) | 2013-012755 |
| Jan. 28, 2013 | (JP) | 2013-012756 |
| Jan. 28, 2013 | (JP) | 2013-012757 |
| Jan. 28, 2013 | (JP) | 2013-012758 |

(51) Int. Cl.
  *G02B 1/113* (2015.01)
  *G02B 1/11* (2015.01)
  *G02B 15/20* (2006.01)
  *G02B 27/00* (2006.01)
  *G02B 27/64* (2006.01)

(52) U.S. Cl.
  CPC ....... *G02B 15/1461* (2019.08); *G02B 15/173* (2013.01); *G02B 15/20* (2013.01); *G02B 27/0018* (2013.01); *G02B 27/0025* (2013.01); *G02B 27/646* (2013.01)

(58) Field of Classification Search
  CPC ............... G02B 15/20; G02B 27/0018; G02B 27/0025; G02B 27/646
  See application file for complete search history.

(56) References Cited

U.S. PATENT DOCUMENTS

| 7,839,577 | B2 | 11/2010 | Yamamoto et al. |
| 8,081,390 | B2 | 12/2011 | Hayakawa |
| 8,913,327 | B2* | 12/2014 | Obama .......... G02B 15/144113 359/683 |
| 2005/0219708 | A1 | 10/2005 | Shibayama et al. |
| 2010/0195215 | A1 | 8/2010 | Saori |
| 2010/0284092 | A1* | 11/2010 | Hayakawa ........... G02B 15/173 359/683 |
| 2011/0019033 | A1 | 1/2011 | Ori et al. |
| 2011/0261250 | A1 | 10/2011 | Touchi et al. |
| 2011/0317278 | A1 | 12/2011 | Sato et al. |
| 2012/0050603 | A1 | 3/2012 | Imaoka et al. |
| 2012/0194730 | A1* | 8/2012 | Morooka ............. H04N 5/2254 348/345 |
| 2012/0242887 | A1 | 9/2012 | Matsumura et al. |
| 2012/0307367 | A1 | 12/2012 | Bito et al. |
| 2013/0100325 | A1 | 4/2013 | Wada |
| 2013/0169846 | A1 | 7/2013 | Yanai et al. |
| 2013/0176479 | A1 | 7/2013 | Wada |
| 2013/0242408 | A1 | 9/2013 | Nanba |
| 2014/0063604 | A1 | 3/2014 | Wada |
| 2014/0085527 | A1 | 3/2014 | Yamano |
| 2014/0146217 | A1 | 5/2014 | Morooka |
| 2016/0299324 | A1 | 10/2016 | Yamano |

FOREIGN PATENT DOCUMENTS

| JP | 64-10207 A | 1/1989 |
|---|---|---|
| JP | 04-186211 A | 7/1992 |
| JP | 04-186212 A | 7/1992 |
| JP | 04-186213 A | 7/1992 |
| JP | 10-133107 A | 5/1998 |
| JP | 11-84241 A | 3/1999 |
| JP | 11-174324 A | 7/1999 |
| JP | 11-316342 A | 11/1999 |
| JP | 2000-356704 A | 12/2000 |
| JP | 2003-241098 A | 8/2003 |
| JP | 2004-317867 A | 11/2004 |
| JP | 2005-284097 A | 10/2005 |
| JP | 2008-216881 A | 9/2008 |
| JP | 2009-180844 A | 8/2009 |
| JP | 2010-198012 A | 9/2010 |
| JP | 2011-186417 A | 9/2011 |
| JP | 2011-232543 A | 11/2011 |
| JP | 2012-42549 A | 3/2012 |
| JP | 2012-47814 A | 3/2012 |
| JP | 2012-212106 A | 11/2012 |
| JP | 2013-011819 A | 1/2013 |
| JP | 2013-092554 A | 5/2013 |
| JP | 2013-137464 A | 7/2013 |
| JP | 2013-142781 A | 7/2013 |
| JP | 2013-190534 A | 9/2013 |
| JP | 2013-210570 A | 10/2013 |
| JP | 2013-231760 A | 11/2013 |
| JP | 2014-048622 A | 3/2014 |
| JP | 2014-066944 A | 4/2014 |
| JP | 2014-066946 A | 4/2014 |
| JP | 2014-106424 A | 6/2014 |
| WO | WO 2011/102090 A1 | 8/2011 |

OTHER PUBLICATIONS

Office Action dated Jun. 28, 2017 in Chinese Patent Application No. 201480006342.2.
English translation of International Preliminary Report on Patentability from International Patent Application No. PCT/JP2014/000396, dated Aug. 6, 2015.
Office Action dated Jun. 4, 2019, in Chinese Patent Application No. 201810303730.7.

* cited by examiner

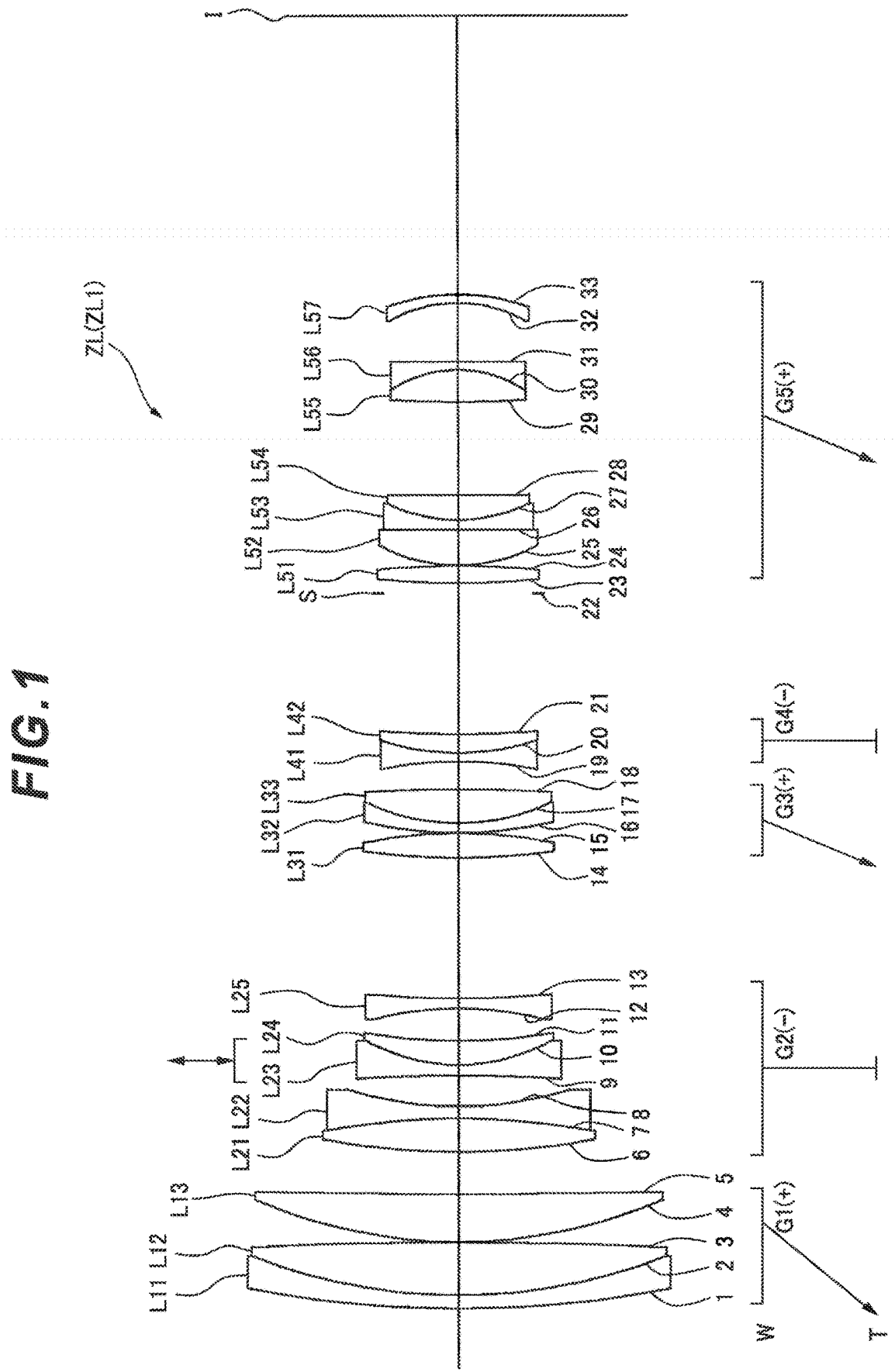

COMA ABERRATION

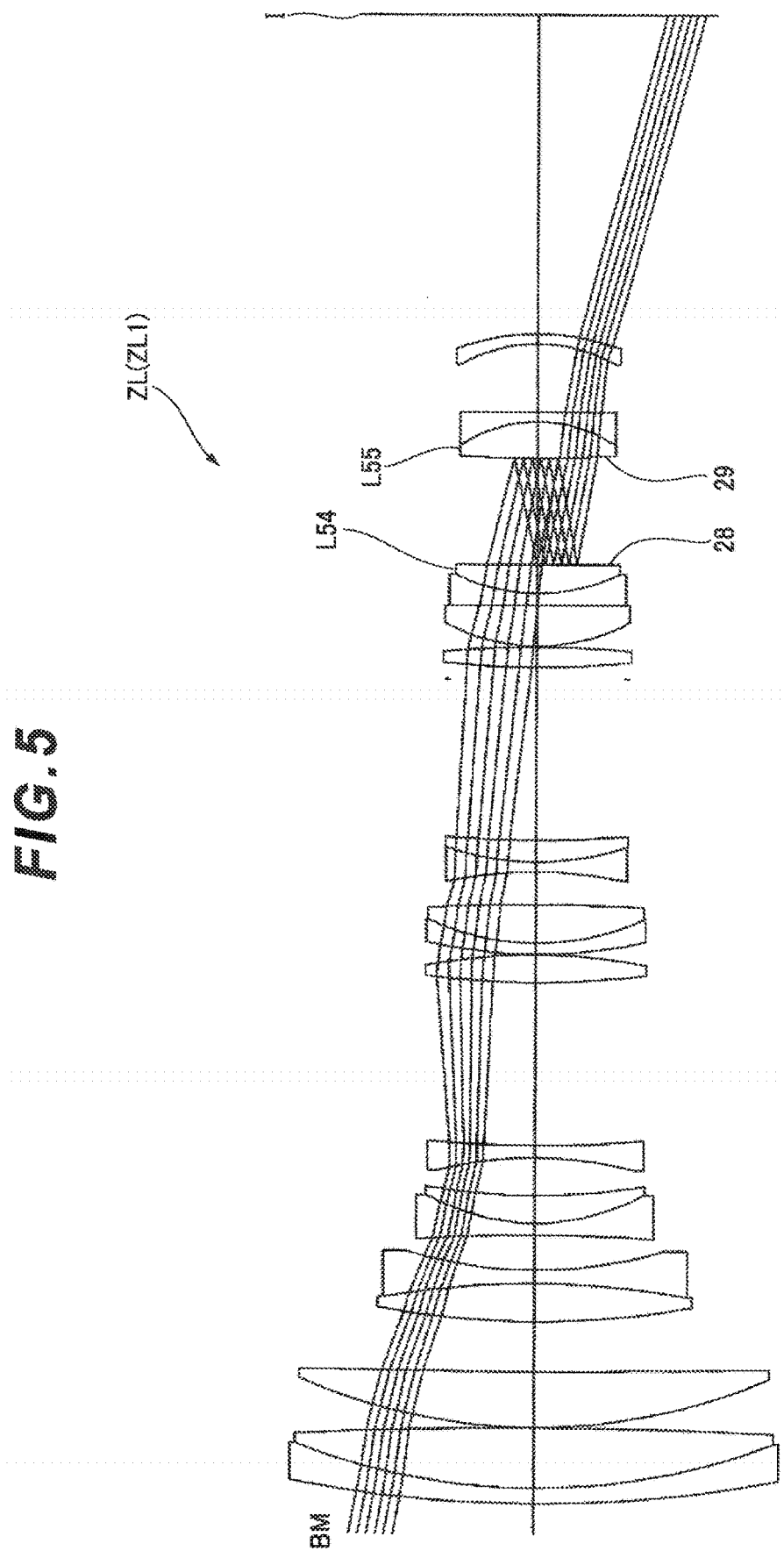

COMA ABERRATION

ZOOMING OPTICAL SYSTEM, OPTICAL APPARATUS, AND MANUFACTURING METHOD FOR THE ZOOMING OPTICAL SYSTEM

RELATED APPLICATIONS

This is a continuation of PCT International Application No. PCT/JP2014/000396, filed on Jan. 27, 2014, which is hereby incorporated by reference. This application also claims the benefit of Japanese Patent Application Nos. 2013-012752, 2013-012753, 2013-012754, 2013-012755, 2013-012756, 2013-012757 and 2013-012758 filed in Japan on Jan. 28, 2013, which are hereby incorporated by reference.

TECHNICAL FIELD

The present invention relates to a zooming optical system, an optical apparatus and a manufacturing method for the zooming optical system.

TECHNICAL BACKGROUND

A zooming optical system suitable for a photographic cameras, electronic still cameras, video cameras or the like has been proposed (e.g. Patent Document 1). In recent years, requirements for preventing ghosts and flares, which would diminish optical performance, are becoming increasingly stricter for zooming optical systems suitable for photographic cameras, electronic still cameras, video cameras or the like, therefore higher performance is also demanded for an anti-reflection film formed on a lens surface, and to meet this demand, multilayer film designing technology and multilayer film deposition technology are continuously advancing (e.g. see Patent Document 2).

PRIOR ARTS LIST

Patent Document

Patent Document 1: Japanese Laid-Open Patent Publication No. 2009-180844(A)
Patent Document 2: Japanese Laid-Open Patent Publication No. 2000-356704(A)

SUMMARY OF THE INVENTION

Problems to be Solved by the Invention

A problem of a conventional zooming optical system is that aberration fluctuation upon zooming is considerable. Moreover, in the case of a conventional zooming optical system, reflected light that causes ghosts and flares is easily generated from optical surfaces, which affects optical performance.

With the foregoing in view, it is an object of the present invention to provide a zooming optical system and an optical apparatus that ideally suppresses aberration fluctuations upon zooming, and a manufacturing method for the zooming optical system.

It is another object of the present invention to provide a zooming optical system and an optical apparatus having a high optical performance to further decrease ghosts and flares, while ideally suppressing aberration fluctuations upon zooming, and a manufacturing method for the zooming optical system.

Means to Solve the Problems

To solve the above problems, a zooming optical system according to a first aspect of the present invention is constituted by, in order from an object: a first lens group having positive refractive power; a second lens group having negative refractive power; a third lens group having positive refractive power; a fourth lens group having negative refractive power; and a fifth lens group having positive refractive power, and in this zooming optical system, the first lens group is moved along the optical axis upon zooming, at least a part of the second lens group to the fifth lens group being moved so as to include a component orthogonal to the optical axis, and the following conditional expressions are satisfied:

$$4.41 < f1/(-f2) < 5.33$$

$$2.15 < f1/f3 < 4.95$$

where f1 denotes a focal length of the first lens group, f2 denotes a focal length of the second lens group, and f3 denotes a focal length of the third lens group.

In this zooming optical system, it is preferable that the following conditional expression is satisfied:

$$0.18 < f3/(-f4) < 0.92$$

where f4 denotes a focal length of the fourth lens group.

In this zooming optical system, it is preferable that the following conditional expression is satisfied:

$$0.82 < (-f4)/f5 < 1.58$$

where f4 denotes a focal length of the fourth lens group, and f5 denotes a focal length of the fifth lens group.

In this zooming optical system, it is preferable that an aperture stop is disposed in a position closer to the image than the second lens group.

In this zooming optical system, it is preferable that an aperture stop is disposed in a position between the third lens group and the fifth lens group.

In this zooming optical system, it is preferable that an aperture stop is disposed in a position between the third lens group and the fourth lens group.

In this zooming optical system, it is preferable that at least a part of the third lens group is moved along the optical axis upon focusing.

In this zooming optical system, it is preferable that a second lens group is fixed with respect to the image plane upon zooming.

In this zooming optical system, it is preferable that at least a part of the second lens group is moved so as to include a component orthogonal to the optical axis.

In this zooming optical system, it is preferable that all the lens surfaces are spherical.

In this zooming optical system, it is preferable that the following conditional expression is satisfied:

$$0.10 < f3/f5 < 1.06$$

where f5 denotes a focal length of the fifth lens group.

In this zooming optical system, it is preferable that the following conditional expression is satisfied:

$$0.70 < f1/(-f4) < 2.55$$

where f4 denotes a focal length of the fourth lens group.

In this zooming optical system, it is preferable that the following conditional expression is satisfied:

$$0.11 < f2/f4 < 0.62$$

where f2 denotes a focal length of the second lens group, and f4 denotes a focal length of the fourth lens group.

In this zooming optical system, it is preferable that the following conditional expression is satisfied:

$$9.6 < ft/(-f2) < 20.0$$

where ft denotes a focal length of the zooming optical system in a telephoto end state.

In the zooming optical system, it is preferable that the following conditional expression is satisfied:

$$3.9 < ft/(-f4) < 8.8$$

where ft denotes a focal length of the zooming optical system in the telephoto end state, and f4 denotes a focal length of the fourth lens group.

In this zooming optical system, it is preferable that the following conditional expression is satisfied:

$$0.8 < (-f4)/f5 < 1.8$$

where f4 denotes a focal length of the fourth lens group, and f5 denotes a focal length of the fifth lens group.

In this zooming optical system, it is preferable that the following conditional expression is satisfied:

$$0.3 < (-f2)/f5 < 0.8$$

where f5 denotes a focal length of the fifth lens group.

In this zooming optical system, it is preferable that the following conditional expression is satisfied:

$$1.3 < f1/(-f4) < 3.0$$

where f4 denotes a focal length of the fourth lens group.

In this zooming optical system, it is preferable that the following conditional expression is satisfied:

$$1.9 < f1/f5 < 3.2$$

where f5 denotes a focal length of the fifth lens group.

In this zooming optical system, it is preferable that the following conditional expression is satisfied:

$$0.32 < (-f4)/f5 < 1.93$$

where f4 denotes a focal length of the fourth lens group, and f5 denotes a focal length of the fifth lens group.

In this zooming optical system, it is preferable that the following conditional expression is satisfied:

$$0.74 < f1/(-f4) < 2.82$$

where f4 denotes a focal length of the fourth lens group.

In this zooming optical system, it is preferable that the following conditional expression is satisfied:

$$0.44 < (-f2)/f3 < 0.86.$$

In this zooming optical system, it is preferable that the following conditional expression is satisfied:

$$0.32 < (-f4)/f5 < 2.07$$

where f4 denotes a focal length of the fourth lens group, and f5 denotes a focal length of the fifth lens group.

In this zooming optical system, it is preferable that the following conditional expression is satisfied:

$$0.29 < f3/(-f4) < 0.87$$

where f4 denotes a focal length of the fourth lens group.

In this zooming optical system, it is preferable that an anti-reflection film including at least one layer formed by a wet process is formed on at least one surface of the optical surfaces.

It is preferable that the anti-reflection film is a multilayer film, and the outermost layer of the multilayer film is a layer formed by the wet process.

It is more preferable that the following conditional expression is satisfied:

$$nd \leq 1.30$$

where nd denotes a refractive index at d-line of the layer formed by the wet process.

An optical apparatus according to the first aspect of the present invention includes this zooming optical system for forming an object image on a predetermined image plane.

A zooming optical system according to a second aspect of the present invention is constituted by, in order from an object: a first lens group having positive refractive power; a second lens group having negative refractive power; a third lens group having positive refractive power; a fourth lens group having negative refractive power; and a fifth lens group having positive refractive power, and in this zooming optical system, the first lens group is moved along the optical axis upon zooming, at least a part of the second lens group to the fifth lens group is moved so as to include a component orthogonal to the optical axis, and the following conditional expressions being satisfied:

$$4.41 < f1/(-f2) < 5.33$$

$$0.10 < f3/f5 < 1.06$$

where f1 denotes a focal length of the first lens group, f2 denotes a focal length of the second lens group, f3 denotes a focal length of the third lens group, and f5 denotes a focal length of the fifth lens group.

In this zooming optical system, it is preferable that the following conditional expression is satisfied: $0.70 < f1/(-f4) < 2.55$ where f4 denotes a focal length of the fourth lens group.

In this zooming optical system, it is preferable that the following conditional expression is satisfied:

$$0.11 < f2/f4 < 0.62$$

where f4 denotes a focal length of the fourth lens group.

An optical apparatus according to the second aspect of the present invention includes the zooming optical system according to the second aspect of the present invention for forming an object image on a predetermined image plane.

A zooming optical system according to a third aspect of the present invention is constituted by, in order from an object: a first lens group having positive refractive power; a second lens group having negative refractive power; a third lens group having positive refractive power; a fourth lens group having negative refractive power; and a fifth lens group having positive refractive power, and in this zooming optical system, the second lens group is fixed with respect to the image plane upon zooming, and the following conditional expressions are satisfied:

$$9.6 < ft/(-f2) < 20.0$$

$$3.9 < ft/(-f4) < 8.8$$

where ft denotes a focal length of the zooming optical system in a telephoto end state, f2 denotes a focal length of the second lens group, and f4 denotes a focal length of the fourth lens group.

In this zooming optical system, it is preferable that the following conditional expression is satisfied:

$$0.8 < (-f4)/f5 < 1.8$$

where f5 denotes a focal length of the fifth lens group.

In this zooming optical system, it is preferable that the following conditional expression is satisfied:

$$0.3 < (-f2)/f5 < 0.8$$

where f5 denotes a focal length of the fifth lens group.

An optical apparatus according to the third aspect of the present invention includes the zooming optical system according to the third aspect of the present invention for forming an object image on a predetermined image plane.

A zooming optical system according to a fourth aspect of the present invention is constituted by, in order from the object: a first lens group having positive refractive power; a second lens group having negative refractive power; a third lens group having positive refractive power; a fourth lens group having negative refractive power; and a fifth lens group having positive refractive power, and in this zooming optical system, the second lens group is fixed with respect to the image plane upon zooming, and the following conditional expressions are satisfied:

$$2.0 < f1/(-f2) < 6.1$$

$$1.3 < f1/(-f4) < 3.0$$

$$1.9 < f1/f5 < 3.2$$

where f1 denotes a focal length of the first lens group, f2 denotes a focal length of the second lens group, f4 denotes a focal length of the fourth lens group, and f5 denotes a focal length of the fifth lens group.

In this zooming optical system, it is preferable that the following conditional expression is satisfied:

$$0.8 < (-f4)/f5 < 1.8.$$

In this zooming optical system, it is preferable that the following conditional expression is satisfied:

$$0.3 < (-f2)/f5 < 0.8.$$

An optical apparatus according to the fourth aspect of the present invention includes the zooming optical system according to the fourth aspect of the present invention for forming an object image on a predetermined image plane.

A zooming optical system according to the fifth aspect of the present invention is constituted by, in order from an object: a first lens group having positive refractive power; a second lens group having negative refractive power; a third lens group having positive refractive power; a fourth lens group having negative refractive power; and a fifth lens group having positive refractive power, and in this zooming optical system, the second lens group and the fourth lens group are fixed with respect to the image plane upon zooming, and the following conditional expressions are satisfied:

$$1.05 < f1/(-f2) < 6.10$$

$$0.32 < (-f4)/f5 < 1.93$$

where f1 denotes a focal length of the first lens group, f2 denotes a focal length of the second lens group, f4 denotes a focal length of the fourth lens group, and f5 denotes a focal length of the fifth lens group.

In this zooming optical system, it is preferable that the following conditional expression is satisfied:

$$0.74 < f1/(-f4) < 2.82.$$

An optical apparatus according to the fifth aspect of the present invention includes the zooming optical system according to the fifth aspect of the present invention for forming an object image on a predetermined image plane.

A zooming optical system according to a sixth aspect of the present invention is constituted by, in order from an object: a first lens group having positive refractive power; a second lens group having negative refractive power; a third lens group having positive refractive power; a fourth lens group having negative refractive power; and a fifth lens group having positive refractive power, and in this zooming optical system, the second lens group and the fourth lens group are fixed with respect to the image plane upon zooming, and the following conditional expressions are satisfied:

$$0.44 < (-f2)/f3 < 0.86$$

$$0.32 < (-f4)/f5 < 2.07$$

where f2 denotes a focal length of the second lens group, f3 denotes a focal length of the third lens group, f4 denotes a focal length of the fourth lens group, and f5 denotes a focal length of the fifth lens group.

In this zooming optical system, it is preferable that the following conditional expression is satisfied:

$$0.29 < f3/(-f4) < 0.87.$$

An optical apparatus according to the sixth aspect of the present invention includes the zooming optical system according to the sixth aspect of the present invention for forming an object image on a predetermined image plane.

A manufacturing method for a zooming optical system according to a first aspect of the present invention is a manufacturing method for a zooming optical system constituted by, in order from an object: a first lens group having positive refractive power; a second lens group having negative refractive power; a third lens group having positive refractive power; a fourth lens group having negative refractive power; and a fifth lens group having positive refractive power, the method including: disposing the first lens group to move along the optical axis upon zooming; disposing the second lens group to the fifth lens group so that at least a part of the second lens group to the fifth lens group move so as to include a component orthogonal to the optical axis, and the following conditional expressions are satisfied:

$$4.41 < f1/(-f2) < 5.33$$

$$2.15 < f1/f3 < 4.95$$

where f1 denotes a focal length of the first lens group, f2 denotes a focal length of the second lens group, and f3 denotes a focal length of the third lens group.

A manufacturing method for a zooming optical system according to a second aspect of the present invention is a manufacturing method for a zooming optical system constituted by, in order from an object: a first lens group having positive refractive power; a second lens group having negative refractive power; a third lens group having positive refractive power; a fourth lens group having negative refractive power; and a fifth lens group having positive refractive power, the method including: disposing the first lens group to move along the optical axis upon zooming; disposing the second lens group to the fifth lens group so that at least a part of the second lens group to the fifth lens group move so as to include a component orthogonal to the optical axis, and the following conditional expressions are satisfied:

$$4.41 < f1/(-f2) < 5.33$$

$$0.10 < f3/f5 < 1.06$$

where f1 denotes a focal length of the first lens group, f2 denotes a focal length of the second lens group, and f3 denotes a focal length of the third lens group, and f5 denotes a focal length of the fifth lens group.

A manufacturing method for a zooming optical system according to a third aspect of the present invention is a manufacturing method for a zooming optical system constituted by, in order from an object: a first lens group having positive refractive power; a second lens group having negative refractive power; a third lens group having positive refractive power; a fourth lens group having negative refractive power; and a fifth lens group having positive refractive power, the method including; disposing the second lens group to be fixed with respect to the image plane upon zooming, and the following conditional expressions being satisfied:

$$9.6 < ft/(-f2) < 20.0$$

$$3.9 < ft/(-f4) < 8.8$$

where ft denotes a focal length of the zooming optical system in a telephoto end state, f2 denotes a focal length of the second lens group, and f4 denotes a focal length of the fourth lens group.

A manufacturing method for a zooming optical system according to a fourth aspect of the present invention is a manufacturing method for a zooming optical system constituted by, in order from an object: a first lens group having positive refractive power; a second lens group having negative refractive power; a third lens group having positive refractive power; a fourth lens group having negative refractive power; and a fifth lens group having positive refractive power, the method including: disposing the second lens group to be fixed with respect to the image plane upon zooming, and the following conditional expressions being satisfied:

$$2.0 < f1/(-f2) < 6.1$$

$$1.3 < f1/(-f4) < 3.0$$

$$1.9 < f1/f5 < 3.2$$

where f1 denotes a focal length of the first lens group, f2 denotes a focal length of the second lens group, f4 denotes a focal length of the fourth lens group, and f5 denotes a focal length of the fifth lens group.

A manufacturing method for a zooming optical system according to a fifth aspect of the present invention is a manufacturing method for a zooming optical system constituted by, in order from an object: a first lens group having positive refractive power; a second lens group having negative refractive power; a third lens group having positive refractive power; a fourth lens group having negative refractive power; and a fifth lens group having positive refractive power, the method including: disposing the second lens group and the fourth lens group to be fixed with respect to the image plane upon zooming, and the following conditional expressions being satisfied:

$$1.05 < f1/(-f2) < 6.10$$

$$0.32 < (-f4)/f5 < 1.93$$

where f1 denotes a focal length of the first lens group, f2 denotes a focal length of the second lens group, f4 denotes a focal length of the fourth lens group, and f5 denotes a focal length of the fifth lens group.

A manufacturing method for a zooming optical system according to a sixth aspect of the present invention is a manufacturing method for a zooming optical system constituted by, in order from an object: a first lens group having positive refractive power; a second lens group having negative refractive power; a third lens group having positive refractive power; a fourth lens group having negative refractive power; and a fifth lens group having positive refractive power, the method including: disposing the second lens group and the fourth lens group to be fixed with respect to the image plane upon zooming, and the following conditional expressions being satisfied:

$$0.44 < (-f2)/f3 < 0.86$$

$$0.32 < (-f4)/f5 < 2.07$$

where f2 denotes a focal length of the second lens group, f3 denotes a focal length of the third lens group, f4 denotes a focal length of the fourth lens group, and f5 denotes a focal length of the fifth lens group.

Advantageous Effects of the Invention

According to the present invention, a zooming optical system and an optical apparatus that ideally suppresses aberration fluctuations upon zooming, and a manufacturing method for the zooming optical system, can be provided.

According to another aspect of the present invention, a zooming optical system and an optical apparatus having a high optical performance to further decrease ghosts and flares while ideally suppressing aberration fluctuations upon zooming, and a manufacturing method for the zooming optical system, can be provided.

BRIEF DESCRIPTION OF THE DRAWINGS

FIG. 1 is a cross-sectional view depicting a lens configuration of a zooming optical system according to Example 1;

FIG. 2A shows various aberrations in the infinity focusing state, and FIG. 2B shows coma aberrations when image blur is corrected in the infinity focusing state;

FIG. 3A shows various aberrations in the infinity focusing state, and FIG. 3B shows coma aberrations when image blur is corrected in the infinity focusing state;

FIG. 4A shows various aberrations in the infinity focusing state, and FIG. 4B shows coma aberrations when image blur is corrected in the infinity focusing state;

FIG. 5 is a diagram depicting a state of the incident rays reflecting on the first ghost generation plane and the second ghost generation plane in the zooming optical system according to Example 1;

FIG. 7A shows various aberrations in the infinity focusing state, and FIG. 7B shows coma aberrations when image blur is corrected in the infinity focusing state;

8A shows various aberrations in the infinity focusing state, and FIG. 8B shows coma aberrations when image blur is corrected in the infinity focusing state;

FIG. 9A shows various aberrations in the infinity focusing state, and FIG. 9B shows coma aberrations when image blur is corrected in the infinity focusing state;

FIG. 11A shows various aberrations in the infinity focusing state, and FIG. 11B shows coma aberrations when image blur is corrected in the infinity focusing state;

FIG. 12A shows various aberrations in the infinity focusing state, and FIG. 12B shows coma aberrations when image blur is corrected in the infinity focusing state;

FIG. 13A shows various aberrations in the infinity focusing state, and FIG. 13B shows coma aberrations when image blur is corrected in the infinity focusing state;

FIG. 15A shows various aberrations in the infinity focusing state, and FIG. 15B shows coma aberrations when image blur is corrected in the infinity focusing state;

FIG. 16A shows various aberrations in the infinity focusing state, and FIG. 16B shows coma aberrations when image blur is corrected in the infinity focusing state;

FIG. 17A shows various aberrations in the infinity focusing state, and FIG. 17B shows coma aberrations when image blur is corrected in the infinity focusing state;

FIG. 19A shows various aberrations in the infinity focusing state, and FIG. 19B shows coma aberrations when image blur is corrected in the infinity focusing state;

FIG. 20A shows various aberrations in the infinity focusing state, and FIG. 20B shows coma aberrations when image blur is corrected in the infinity focusing state;

FIG. 21A shows various aberrations in the infinity focusing state, and FIG. 21B shows coma aberrations when image blur is corrected in the infinity focusing state;

DESCRIPTION OF THE EMBODIMENTS

Figure 2A:
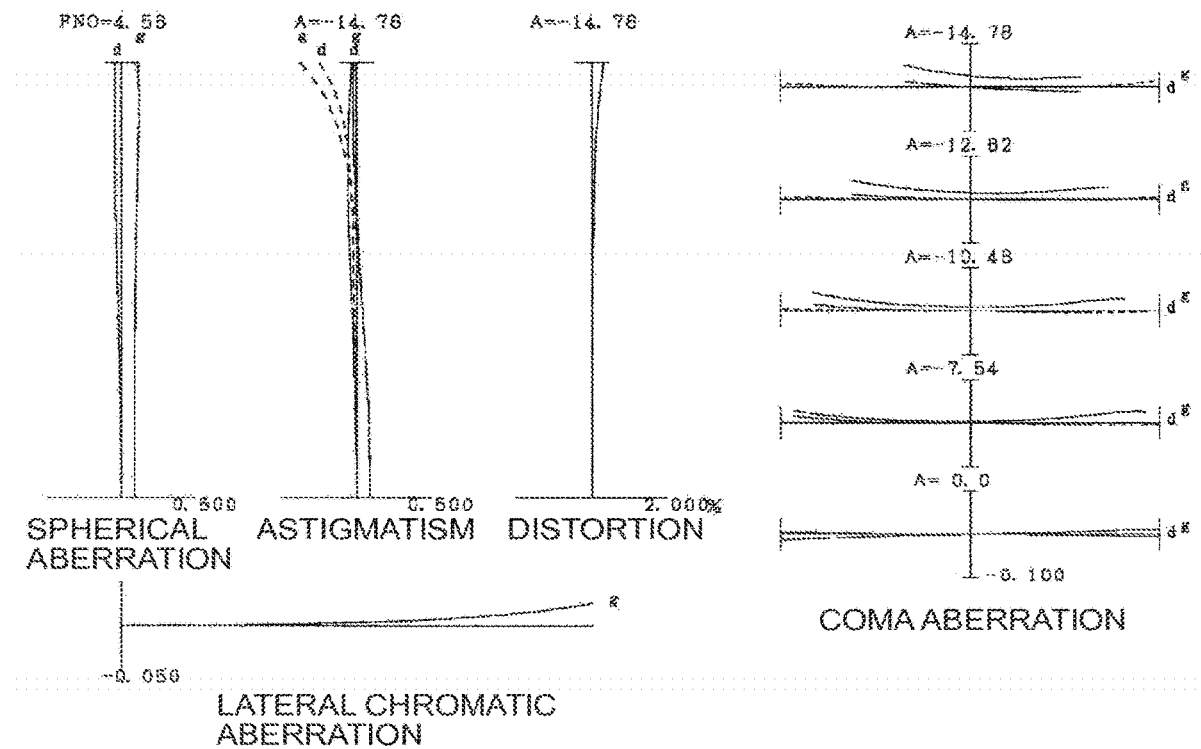
FIGS. 2A and 2B are sets of graphs showing various aberrations of the zooming optical system according to Example 1 in the wide-angle end state, where

Preferable embodiments of the present invention will now be described with reference to the drawings. As shown in FIG. 1, a zooming optical system ZL according to the present invention is constituted by, in order from the object: a first lens group G1 having positive refractive power; a second lens group G2 having negative refractive power; a third lens group G3 having positive refractive power; a fourth lens group G4 having negative refractive power; and a fifth lens group G5 having positive refractive power. In this zooming optical system ZL, it is preferable that the first lens group G1 is moved toward the image plane I along the optical axis upon zooming. By this configuration, aberration fluctuation during zooming can be decreased. Moreover, the refractive power of the first lens group G1 can be weakened, hence a worsening of aberrations, when decentering is generated due to manufacturing error, can be controlled.

In the zooming optical system ZL, it is preferable that at least a part of the second lens group G2 to the fifth lens group G5 (a plurality of lens groups, one of the lens groups, or a part of the lenses constituting any of the lens groups) is moved so as to include a component orthogonal to the optical axis. In this case, it is more preferable that at least a part of the second lens group G2 is moved so as to include a component orthogonal to the optical axis. By this configuration, camera shake can be corrected by a lens having a small diameter, therefore the size of the lens barrel can be smaller.

Conditions to construct this zooming optical system ZL will now be described. It is preferable that the zooming optical system ZL satisfies the following conditional expression (1).

$$4.41 < f1/(-f2) < 5.33 \tag{1}$$

where f1 denotes a focal length of the first lens group G1, and f2 denotes a focal length of the second lens group G2.

The conditional expression (1) specifies an appropriate focal length of the first lens group G1 with respect to the focal length of the second lens group G2. By satisfying the conditional expression (1), spherical aberration and chromatic aberration in the telephoto end state can be corrected well. If the lower limit value of the conditional expression (1) is not reached, the refractive power of the first lens group G1 increases, and correction of spherical aberration and chromatic aberration in the telephoto end state becomes difficult, which is not desirable. If the lower limit value of the conditional expression (1) is 4.45, the effect of the present application can be demonstrated with certainty. If the upper limit value of the conditional expression (1) is exceeded, the refractive power of the first lens group G1 decreases and the total length of the zooming optical system increases, which is not desirable. If the upper limit value of the conditional expression (1) is 5.30, the effect of the present application can be demonstrated with certainty.

In the zooming optical system ZL, it is preferable that the following conditional expression (2) is satisfied.

$$2.15 < f1/f3 < 4.95 \qquad (2)$$

where f1 denotes a focal length of the first lens group G1, and f3 denotes a focal length of the third lens group G3.

The conditional expression (2) specifies an appropriate focal length of the first lens group G1 with respect to the focal length of the third lens group G3. By satisfying the conditional expression (2), spherical aberration and chromatic aberration in the telephoto end state can be corrected well. If the lower limit value of the conditional expression (2) is not reached, the refractive power of the first lens group G1 increases, and correction of spherical aberration and chromatic aberration in the telephoto end state becomes difficult, which is not desirable. If the lower limit value of the conditional expression (2) is 2.20, the effect of the present application can be demonstrated with certainty. If the upper limit value of the conditional expression (2) is exceeded, the refractive power of the first lens group G1 decreases, and the total length of the zooming optical system increases, which is not desirable. If the upper limit value of the conditional expression (2) is 4.35, the effect of the present application can be demonstrated with certainty.

In the zooming optical system ZL, it is preferable that the following conditional expression (3) is satisfied.

$$0.18 < f3/(-f4) < 0.92 \qquad (3)$$

where f3 denotes a focal length of the third lens group G3, and f4 denotes a focal length of the fourth lens group G4.

The conditional expression (3) specifies an appropriate focal length of the third lens group G3 with respect to the focal length of the fourth lens group G4. By satisfying the conditional expression (3), spherical aberration and chromatic aberration in the telephoto end state can be corrected well. If the lower limit value of the conditional expression (3) is not reached, the refractive power of the third lens group G3 increases, and correction of spherical aberration and chromatic aberration in the telephoto end state becomes difficult, which is not desirable. If the lower limit value of the conditional expression (3) is 0.22, the effect of the present application can be demonstrated with certainty. If the upper limit value of the conditional expression (3) is exceeded, the refractive power of the third lens group G3 decreases, and the total length of the zooming optical system increases, which is not desirable. If the upper limit value of the conditional expression (3) is 0.85, the effect of the present application can be demonstrated with certainty.

In the zooming optical system ZL, it is preferable that the following conditional expression (4) is satisfied.

$$0.82 < (-f4)/f5 < 1.58 \qquad (4)$$

where f4 denotes a focal length of the fourth lens group G4, and f5 denotes a focal length of the fifth lens group G5.

The conditional expression (4) specifies an appropriate focal length of the fourth lens group G4 with respect to the focal length of the fifth lens group G5. By satisfying the conditional expression (4), curvature of field and distortion in the wide-angle end state can be corrected well. If the lower limit value of the conditional expression (4) is not reached, the refractive power of the fourth lens group G4 increases, and correction of chromatic aberration in the telephoto end state becomes difficult, which is not desirable. If the lower limit value of the conditional expression (4) is 0.88, the effect of the present application can be demonstrated with certainty. If the upper limit value of the conditional expression (4) is exceeded, the refractive power of the fifth lens group G5 increases, and correction of curvature of field and distortion in the wide-angle end state becomes difficult, which is not desirable. If the upper limit value of the conditional expression (4) is 1.52, the effect of the present application can be demonstrated with certainty.

In the zooming optical system ZL, it is preferable that an aperture stop S is disposed in a position closer to the image than the second lens group G2. In this case, it is preferable that the aperture stop S is disposed between the third lens group G3 and the fifth lens group G5. It is more preferable that the aperture stop S is disposed between the third lens group G3 and the fourth lens group G4. By this configuration, coma aberration and curvature of field can be corrected well.

In the zooming optical system ZL, it is preferable that at least a part of the third lens group G3 is moved along the optical axis upon focusing. By this configuration, quick focusing is implemented, and fluctuation of angle of view and fluctuation of spherical aberration during focusing can be decreased.

In the zooming optical system ZL, it is preferable that the second lens group G2 is fixed with respect to the image plane I upon zooming. By this configuration, the lens barrel configuration during zooming can be simplified, and the size of the lens barrel can be smaller. Further, deterioration of optical performance, due to manufacturing error, can be controlled.

In the zooming optical system ZL, it is preferable that all the lens surfaces are spherical. By this configuration, processing, assembly and adjustment of the lenses become easier, and deterioration of optical performance, due to an error in processing, assembly and adjustment, can be prevented. Even if the image plane is shifted, the drawing performance is not affected very much, which is desirable.

Figure 23:
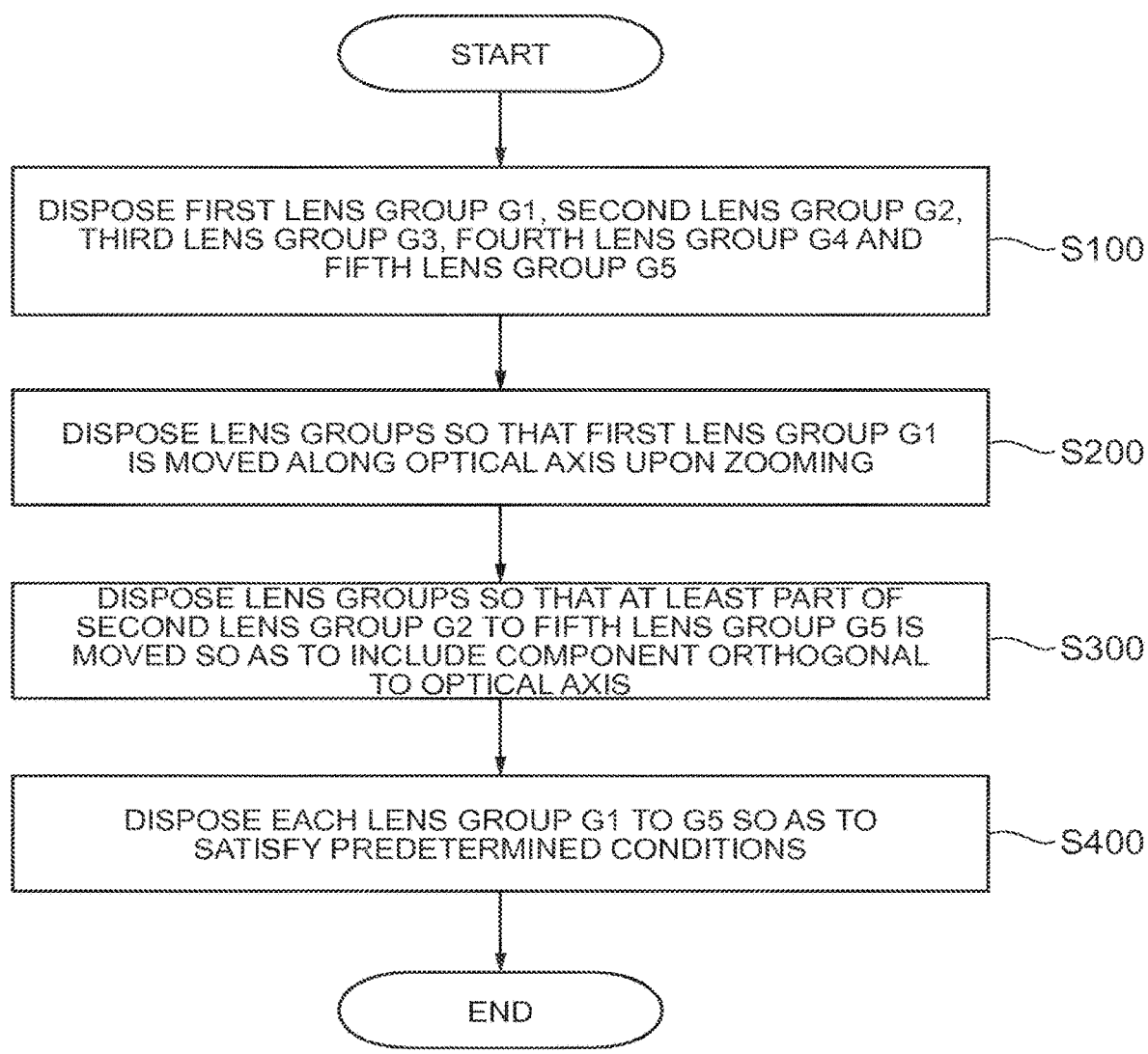
FIG. 23 is a flow chart depicting a manufacturing method for the zooming optical system.

An overview of the manufacturing method for the zooming optical system ZL according to this embodiment will be described with reference to FIG. 23. First the lens groups G1 to G5 are prepared by disposing each lens (step S100). Each lens group is disposed so that the first lens group G1 is moved along the optical axis upon zooming (step S200). Further, each lens group is disposed so that at least a part of the second lens group G2 to the fifth lens group G5 is moved so as to include a component orthogonal to the optical axis (step S300). Furthermore, each lens group G1 to G5 is disposed so that each lens group G1 to G5 satisfies the above mentioned conditional expressions (1) and (2) (step S400).

In concrete terms, as shown in FIG. 1 for example, the first lens group G1 is created by disposing, in order from the object: a cemented lens (in which a negative meniscus lens L11 having a convex surface facing the object and a biconvex lens L12 are cemented), and a positive meniscus lens L13 having a convex surface facing the object; the second lens group G2 is created by disposing a cemented lens (in which a biconvex lens L21 and a biconcave lens L22 are cemented), a cemented lens (in which a biconcave lens L23 and a positive meniscus lens L24 having a convex surface facing the object are cemented), and a biconcave lens L25; the third lens group G3 is created by disposing a biconvex lens L31, and a cemented lens (in which a negative meniscus lens L32 having a convex surface facing the object and a biconvex lens L33 are cemented); the fourth lens group G4 is created by disposing a cemented lens, (in which a biconcave lens L41 and a positive meniscus lens L42 having the convex surfaces facing the object are cemented); and the fifth lens group G5 is created by disposing a biconvex lens L51, a cemented lens, (in which a plano-convex lens L52 having a convex surface facing the object, a plano-concave lens L53 having a concave surface facing the image, and a plano-convex lens L54 having a convex surface facing the object are cemented), a cemented lens, (in which a biconvex lens L55 and a plano-concave lens L56 having a concave surface facing the object are cemented), and a negative meniscus lens L57 having a concave surface facing the object. Each lens group prepared like this is disposed according to the above mentioned procedure, whereby the zooming optical system ZL is manufactured.

A second preferred embodiment of the present invention will now be described with reference to the drawings. As shown in FIG. 1, a zooming optical system ZL according to the second preferred embodiment is constituted by, in order from the object: a first lens group G1 having positive refractive power; a second lens group G2 having negative refractive power; a third lens group G3 having positive refractive power; a fourth lens group G4 having negative refractive power; and a fifth lens group G5 having positive refractive power. In this zooming optical system ZL, it is preferable that the first lens group G1 is moved toward the image plane I along the optical axis upon zooming. By this configuration, aberration fluctuation during zooming can be decreased. Moreover, the refractive power of the first lens group G1 can be weakened, hence a worsening of aberrations, when decentering is generated due to manufacturing error, can be controlled.

In the zooming optical system ZL, it is preferable that at least a part of the second lens group G2 to the fifth lens group G5 (a plurality of lens groups, one of the lens groups, or a part of the lenses constituting any of the lens groups) is moved so as to include a component orthogonal to the optical axis. In this case, it is more preferable that at least a part of the second lens group G2 is moved so as to include a component orthogonal to the optical axis. By this configuration, camera shake can be corrected by a lens having a small diameter, therefore the size of the lens barrel can be smaller.

Conditions to construct the zooming optical system ZL according to the second preferred embodiment will now be described. It is preferable that the zooming optical system ZL satisfies the following conditional expression (5).

$$4.41 < f1/(-f2) < 5.33 \tag{5}$$

where f1 denotes a focal length of the first lens group G1, and f2 denotes a focal length of the second lens group G2.

The conditional expression (5) specifies an appropriate focal length of the first lens group G1 with respect to the focal length of the second lens group G2. By satisfying the conditional expression (5), spherical aberration and chromatic aberration in the telephoto end state can be corrected well. If the lower limit value of the conditional expression (5) is not reached, the refractive power of the first lens group G1 increases, and correction of spherical aberration and chromatic aberration in the telephoto end state becomes difficult, which is not desirable. If the lower limit value of the conditional expression (5) is 4.45, the effect of the present application can be demonstrated with certainty. If the upper limit value of the conditional expression (5) is exceeded, the refractive power of the first lens group G1 decreases and the total length of the zooming optical system increases, which is not desirable. If the upper limit value of the conditional expression (5) is 5.30, the effect of the present application can be demonstrated with certainty.

In the zooming optical system ZL, it is preferable that the following conditional expression (6) is satisfied.

$$0.10 < f3/f5 < 1.06 \tag{6}$$

where f3 denotes a focal length of the third lens group G3, and f5 denotes a focal length of the fifth lens group G5.

The conditional expression (6) specifies an appropriate focal length of the third lens group G3 with respect to the focal length of the fifth lens group G5. By satisfying the conditional expression (6), spherical aberration and chromatic aberration in the telephoto end state can be corrected well. If the lower limit value of the conditional expression (6) is not reached, the refractive power of the third lens group G3 increases, and correction of spherical aberration and chromatic aberration in the telephoto end state becomes difficult, which is not desirable. If the lower limit value of the conditional expression (6) is 0.24, the effect of the present application can be demonstrated with certainty. If the upper limit value of the conditional expression (6) is exceeded, the refractive power of the third lens group G3 decreases, and the total length of the zooming optical system increases, which is not desirable. If the upper limit value of the conditional expression (6) is 1.00, the effect of the present application can be demonstrated with certainty.

In the zooming optical system ZL, it is preferable that the following conditional expression (7) is satisfied.

$$0.70 < f1/(-f4) < 2.55 \tag{7}$$

where f1 denotes a focal length of the first lens group G1, and f4 denotes a focal length of the fourth lens group G4.

The conditional expression (7) specifies an appropriate focal length of the first lens group G1 with respect to the focal length of the fourth lens group G4. By satisfying the conditional expression (7), spherical aberration and chromatic aberration in the telephoto end state can be corrected well. If the lower limit value of the conditional expression (7) is not reached, the refractive power of the first lens group G1 increases, and correction of spherical aberration and chromatic aberration in the telephoto end state becomes difficult, which is not desirable. If the lower limit value of the conditional expression (7) is 0.77, the effect of the present application can be demonstrated with certainty. If the upper limit value of the conditional expression (7) is exceeded, the refractive power of the first lens group G1 decreases, and the total length of the zooming optical system increases, which is not desirable. If the upper limit value of the conditional expression (7) is 2.45, the effect of the present application can be demonstrated with certainty.

In the zooming optical system ZL, it is preferable that the following conditional expression (8) is satisfied.

$$0.11 < f2/f4 < 0.62 \tag{8}$$

where f2 denotes a focal length of the second lens group G2, and f4 denotes a focal length of the fourth lens group G4.

The conditional expression (8) specifies an appropriate focal length of the second lens group G2 with respect to the focal length of the fourth lens group G4. By satisfying the conditional expression (8), coma aberration in the wide-angle end state and chromatic aberration in the telephoto end state can be corrected well. If the lower limit value of the conditional expression (8) is not reached, the refractive power of the second lens group G2 increases, and correction of coma aberration in the wide-angle end state becomes difficult, which is not desirable. If the lower limit value of the conditional expression (8) is 0.14, the effect of the present application can be demonstrated with certainty. If the upper limit value of the conditional expression (8) is exceeded, the refractive power of the fourth lens group G4 increases, and correction of the Chromatic aberration in the telephoto end state becomes difficult, which is not desirable. If the upper limit value of the conditional expression (8) is 0.55, the effect of the present application can be demonstrated with certainty.

In the zooming optical system ZL, it is preferable that an aperture stop S is disposed in a position closer to the image than the second lens group G2. In this case, it is preferable that the aperture stop S is disposed between the third lens group G3 and the fifth lens group G5. It is more preferable that the aperture stop S is disposed between the third lens group G3 and the fourth lens group G4. By this configuration, coma aberration and curvature of field can be corrected well.

In the zooming optical system ZL, it is preferable that at least a part of the third lens group G3 is moved along the optical axis upon focusing. By this configuration, quick focusing is implemented, and fluctuation of angle of view and fluctuation of spherical aberration during focusing can be decreased.

In the zooming optical system ZL, it is preferable that the second lens group G2 is fixed with respect to the image plane I upon zooming. By this configuration, the lens barrel configuration during zooming can be simplified, and the size of the lens barrel can be smaller. Further, deterioration of optical performance, due to manufacturing error, can be controlled.

In the zooming optical system ZL, it is preferable that all the lens surfaces are spherical. By this configuration, processing, assembly and adjustment of the lenses become easier, and deterioration of optical performance, due to an error in processing, assembly and adjustment, can be prevented. Even if the image plane is shifted, the drawing performance is not affected very much, which is desirable.

An overview of the manufacturing method for the zooming optical system ZL according to a second embodiment will be described with reference to FIG. 23. First the lens groups G1 to G5 are prepared by disposing each lens (step S100). Each lens group is disposed so that the first lens group G1 is moved along the optical axis upon zooming (step S200). Further, each lens group G1 to G5 is disposed so that at least a part of the second lens group G2 to the fifth lens group G5 is moved so as to include a component orthogonal to the optical axis (step S300). Furthermore, each lens group is disposed so that each lens group G1 to G5 satisfies the above mentioned conditional expressions (5) and (6) (step S400).

In concrete terms, as shown in FIG. 1 for example, the first lens group G1 is created by disposing, in order from the object: a cemented lens (in which a negative meniscus lens L11 having a convex surface facing the object and a biconvex lens L12 are cemented), and a positive meniscus lens L13 having a convex surface facing the object; the second lens group G2 is created by disposing a cemented lens (in which a biconvex lens L21 and a biconcave lens L22 are cemented), and a cemented lens (in which a biconcave lens L23 and a positive meniscus lens L24 having a convex surface facing the object are cemented), and a biconcave lens L25; the third lens group G3 is created by disposing a biconvex lens L31, and a cemented lens (in which a negative meniscus lens L32 having a convex surface facing the object and a biconvex lens L33 are cemented); the fourth lens group G4 is created by disposing a cemented lens (in which a biconcave lens L41 and a positive meniscus lens L42 having the convex surfaces facing the object are cemented); and the fifth lens group G5 is created by disposing a biconvex lens L51, a cemented lens (in which a plano-convex lens L52 having a convex surface facing the object, a plano-concave lens L53 having a concave surface facing the image, and a plano-convex lens L54 having a convex surface facing the object are cemented), a cemented lens (in which a biconvex lens L55 and a plano-concave lens L56 having a concave surface facing the object are cemented), and a negative meniscus lens L57 having a concave surface facing the object. Each lens group prepared like this is disposed according to the above mentioned procedure, whereby the zooming optical system ZL is manufactured.

A third preferred embodiment of the present invention will now be described with reference to the drawings. As shown in FIG. 1, a zooming optical system ZL according to the third preferred embodiment is constituted by, in order from the object: a first lens group G1 having positive refractive power; a second lens group G2 having negative refractive power; a third lens group G3 having positive refractive power; a fourth lens group G4 having negative refractive power; and a fifth lens group G5 having positive refractive power. In this zooming optical system ZL, it is preferable that the second lens group G2 is fixed with respect to the image plane upon zooming. By this configuration, the moving distance of each lens group upon zooming can be decreased. Fixing the second lens group G2 can also minimize the influence of decentering due to manufacturing error.

Conditions to construct the zooming optical system ZL according to the third preferred embodiment will now be described. It is preferable that the zooming optical system ZL satisfies the following conditional expression (9).

$$9.6 < ft/(-f2) < 20.0 \qquad (9)$$

where ft denotes a focal length of the zooming optical system in the telephoto end state, and f2 denotes a focal length of the second lens group G2.

The conditional expression (9) specifies an appropriate focal length of the second lens group G2 with respect to the focal length of the entire system of the zooming optical system ZL in the telephoto end state. By satisfying the conditional expression (9), coma aberration in the wide-angle end state can be corrected favorably. If the lower limit value of the conditional expression (9) is not reached, the refractive power of the second lens group G2 increases, and correction of coma aberration in the wide-angle end state becomes difficult, which is not desirable. If the lower limit value of the conditional expression (9) is 10.0, the effect of the present application can be demonstrated with certainty. If the upper limit value of the conditional expression (9) is exceeded, the refractive power of the second lens group G2 decreases, and the diameter of the first lens group G1 increases, and decreasing the size of the lens barrel becomes difficult, which is not desirable. If the upper limit value of the conditional expression (9) is 18.0, the effect of the present application can be demonstrated with certainty.

In the zooming optical system ZL, it is preferable that the following conditional expression (10) is satisfied.

$$3.9 < ft/(-f4) < 8.8 \qquad (10)$$

where ft denotes a focal length of the zooming optical system in the telephoto end state, and f4 denotes a focal length of the fourth lens group G4.

The conditional expression (10) specifies an appropriate focal length of the fourth lens group G4 with respect to the focal length of the entire system of the zooming optical system ZL in the telephoto end state. By satisfying the conditional expression (10), spherical aberration and chromatic aberration in the telephoto end state can be corrected well. If the lower limit value of the conditional expression (10) is not reached, the refractive power of the fourth lens group G4 increases, and correction of chromatic aberration in the telephoto end state becomes difficult, which is not preferable. If the lower limit value of the conditional expression (10) is 4.0, the effect of the present application can be demonstrated with certainty. If the upper limit value of the conditional expression (10) is exceeded, the refractive power of the fourth lens group G4 decreases, and shortening of the total length of the zooming optical system ZL becomes difficult, which is not desirable. If the upper limit value of the conditional expression (10) is 8.0, the effect of the present application can be demonstrated with certainty.

In the zooming optical system ZL, it is preferable that the following conditional expression (11) is satisfied.

$$0.8 < (-f4)/f5 < 1.8 \qquad (11)$$

where f4 denotes a focal length of the fourth lens group G4, and f5 denotes a focal length of the fifth lens group G5.

The conditional expression (11) specifies an appropriate focal length of the fourth lens group G4 with respect to the focal length of the fifth lens group G5. By satisfying the conditional expression (11), curvature of field and distortion in the wide-angle end state can be corrected well. If the lower limit value of the conditional expression (11) is not reached, the refractive power of the fourth lens group G4 increases, and correction of chromatic aberration in the telephoto end state becomes difficult, which is not desirable. If the lower limit value of the conditional expression (11) is 0.9, the effect of the present application can be demonstrated with certainty. If the upper limit value of the conditional expression (11) is exceeded, the refractive power of the fifth lens group G5 increases, and correction of curvature of field and distortion in the wide-angle end state becomes difficult, which is not desirable. If the upper limit value of the conditional expression (11) is 1.6, the effect of the present application can be demonstrated with certainty.

In the zooming optical system ZL, it is preferable that the following conditional expression (12) is satisfied.

$$0.3 < (-f2)/f5 < 0.8 \qquad (12)$$

where f2 denotes a focal length of the second lens group G2, and f5 denotes a focal length of the fifth lens group G5.

The conditional expression (12) specifies an appropriate focal length of the second lens group G2 with respect to the focal length of the fifth lens group G5. By satisfying the conditional expression (12), curvature of field and distortion in the wide-angle end state can be corrected well. If the lower limit value of the conditional expression (12) is not reached, the refractive power of the second lens group G2 increases, and correction of coma aberration in the wide-angle end state becomes difficult, which is not desirable. If the lower limit value of the conditional expression (12) is 0.4, the effect of the present application can be demonstrated with certainty. If the upper limit value of the conditional expression (12) is exceeded, the refractive power of the fifth lens group G5 increases, and correction of curvature of field and distortion in the wide-angle end state becomes difficult, which is not desirable. If the upper limit value of the conditional expression (12) is 0.7, the effect of the present application can be demonstrated with certainty. If the upper limit value of the conditional expression (12) is 0.6, the effect of the present application can be demonstrated at the maximum.

In the zooming optical system ZL, it is preferable that an aperture stop S is disposed in a position closer to the image than the second lens group G2. In this case, it is preferable that the aperture stop S is disposed between the third lens group G3 and the fifth lens group G5. It is more preferable that the aperture stop S is disposed between the third lens group G3 and the fourth lens group G4. By this configuration, coma aberration and curvature of field can be corrected well.

In the zooming optical system ZL, it is preferable that at least a part of the third lens group G3 is moved along the optical axis upon focusing. By this configuration, quick focusing is implemented, and fluctuation of angle of view and fluctuation of spherical aberration during focusing can be decreased.

In the zooming optical system ZL, it is preferable that at least a part of the second lens group G2 to the fifth lens group G5 (a plurality of lens groups, one of the lens groups, or a part of the lenses constituting any of the lens groups) is moved so as to include a component orthogonal to the optical axis. In this case, it is more preferable that at least a part of the second lens group G2 is moved so as to include a component orthogonal to the optical axis. By this configuration, camera shake can be corrected by a lens having a small diameter, therefore the size of the lens barrel can be smaller.

In the zooming optical system ZL, it is preferable that all the lens surfaces are spherical. By this configuration, processing, assembly and adjustment of the lenses become easier, and deterioration of optical performance, due to an error in processing, assembly and adjustment, can be prevented. Even if the image plane is shifted, the drawing performance is not affected very much, which is desirable.

Figure 24:
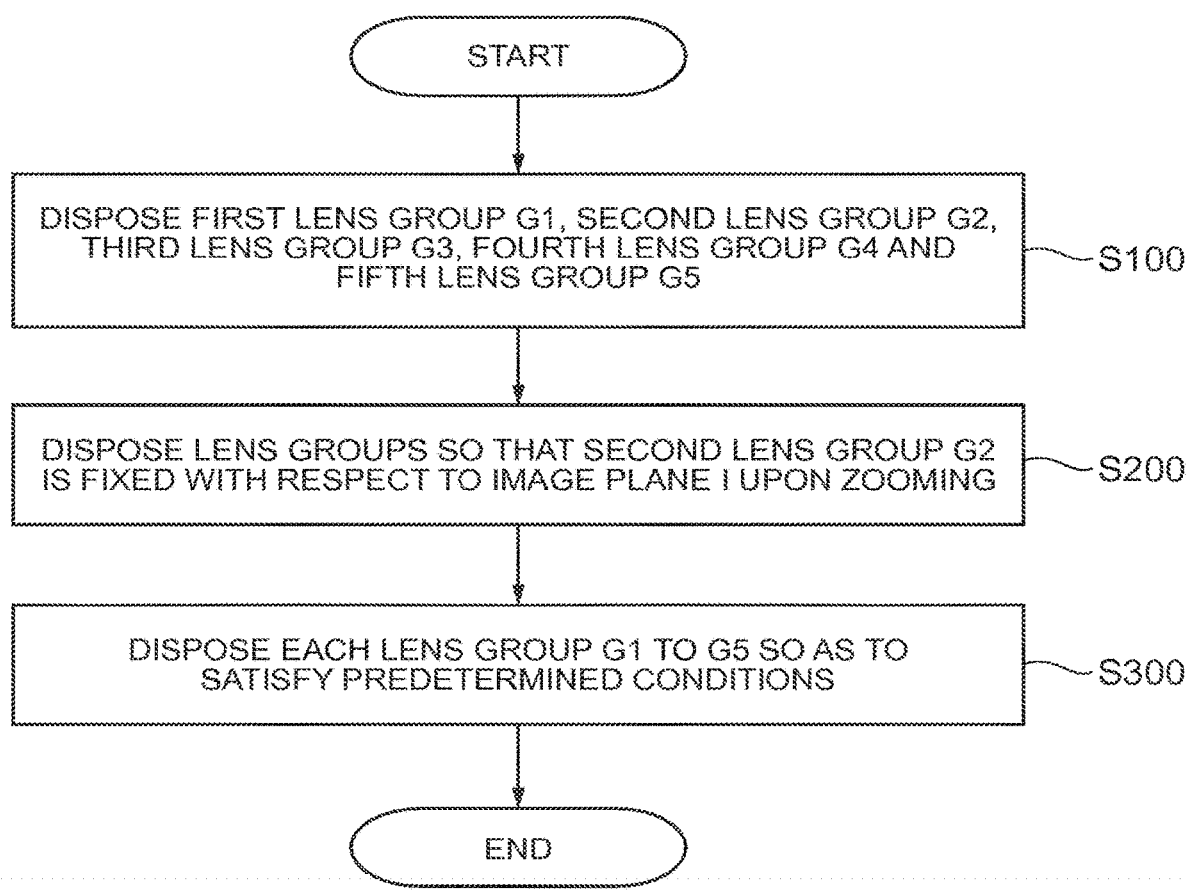
FIG. 24 is a flow chart depicting another manufacturing method for the zooming optical system.

An overview of the manufacturing method for the zooming optical system ZL according to the third embodiment will be described with reference to FIG. 24. First the lens groups G1 to G5 are prepared by disposing each lens (step S100). Each lens group is disposed so that the second lens group G2 is fixed with respect to the image plane I upon zooming (step S200). Further, each lens group G1 to G5 is disposed so that the conditional expressions (9) and (10) are satisfied (step S300).

In concrete terms, in the present embodiment as shown in FIG. 1 for example, the first lens group G1 is created by disposing, in order from the object: a cemented lens (in which a negative meniscus lens L11 having a convex surface facing the object and a biconvex lens L12 are cemented), and a positive meniscus lens L13 having a convex surface facing the object; the second lens group G2 is created by disposing a cemented lens (in which a biconvex lens L21 and a biconcave lens L22 are cemented), a cemented lens (in which a biconcave lens L23 and a positive meniscus lens L24 having a convex surface facing the object are cemented), and a biconcave lens L25; the third lens group G3 is created by disposing a biconvex lens L31, and a cemented lens (in which a negative meniscus lens L32 having a convex surface facing the object and a biconvex lens L33 are cemented); the fourth lens group G4 is created by disposing a cemented lens (in which a biconcave lens L41 and a positive meniscus lens L42 having the convex surfaces facing the object are cemented); and the fifth lens group G5 is created by disposing a biconvex lens L51, a cemented lens (in which a plano-convex lens L52 having a convex surface facing the object, a plano-concave lens L53 having a concave surface facing the image, and a plano-convex lens L54 having a convex surface facing the object are cemented), a cemented lens (in which a biconvex lens L55 and a plano-concave lens L56 having a concave surface facing the object are cemented), and a negative meniscus lens L57 having a concave surface facing the object. Each lens group prepared like this is disposed according to the above mentioned procedure, whereby the zooming optical system ZL is manufactured.

A fourth preferred embodiment of the present invention will now be described with reference to the drawings. As shown in FIG. 1, a zooming optical system ZL according to the fourth preferred embodiment is constituted by, in order from the object: a first lens group G1 having positive refractive power; a second lens group G2 having negative refractive power; a third lens group G3 having positive refractive power; a fourth lens group G4 having negative refractive power; and a fifth lens group G5 having positive refractive power. In this zooming optical system ZL, it is preferable that the second lens group G2 is fixed with respect to the image plane upon zooming. By this configuration, the moving distance of each lens group upon zooming can be decreased. Fixing the second lens group G2 can also minimize the influence of decentering due to manufacturing error.

Conditions to construct the zooming optical system ZL according to the fourth preferred embodiment will now be described. It is preferable that the zooming optical system ZL satisfies the following conditional expression (13).

$$2.0 < f1/(-f2) < 6.1 \quad (13)$$

where f1 denotes a focal length of the first lens group G1, and f2 denotes a focal length of the second lens group G2.

The conditional expression (13) specifies an appropriate focal length of the first lens group G1 with respect to the focal length of the second lens group G2. By satisfying the conditional expression (13), spherical aberration and chromatic aberration in the telephoto end state can be corrected well. If the lower limit value of the conditional expression (13) is not reached, the refractive power of the first lens group G1 increases, and correction of spherical aberration and chromatic aberration in the telephoto end state becomes difficult, which is not desirable. If the lower limit value of the conditional expression (13) is 3.0, the effect of the present application can be demonstrated with certainty. If the upper limit value of the conditional expression (13) is exceeded, the refractive power of the first lens group G1 decreases and the total length of the zooming optical system increases, which is not desirable. If the upper limit value of the conditional expression (13) is 6.0, the effect of the present application can be demonstrated with certainty.

In the zooming optical system ZL, it is preferable that the following conditional expression (14) is satisfied.

$$1.3 < f1/(-f4) < 3.0 \quad (14)$$

where f1 denotes a focal length of the first lens group G1, and f4 denotes a focal length of the fourth lens group G4.

The conditional expression (14) specifies an appropriate focal length of the first lens group G1 with respect to the focal length of the fourth lens group G4. By satisfying the conditional expression (14), spherical aberration and chromatic aberration in the telephoto end state can be corrected well. If the lower limit value of the conditional expression (14) is not reached, the refractive power of the first lens group G1 increases, and correction of spherical aberration and chromatic aberration in the telephoto end state becomes difficult, which is not desirable. If the lower limit value of the conditional expression (14) is 1.4, the effect of the present application can be demonstrated with certainty. If the upper limit value of the conditional expression (14) is exceeded, the refractive power of the first lens group G1 decreases, and the total length of the zooming optical system increases, which is not desirable. If the upper limit value of the conditional expression (14) is 2.8, the effect of the present application can be demonstrated with certainty.

In the zooming optical system ZL, it is preferable that the following conditional expression (15) is satisfied.

$$1.9 < f1/f5 < 3.2 \quad (15)$$

where f1 denotes a focal length of the first lens group G1, and f5 denotes a focal length of the fifth lens group G5.

The conditional expression (15) specifies an appropriate focal length of the first lens group G1 with respect to the focal length of the fifth lens group G5. By satisfying the conditional expression (15), spherical aberration and chromatic aberration in the telephoto end state can be corrected well. If the lower limit value of the conditional expression (15) is not reached, the refractive power of the first lens group G1 increases, and correction of spherical aberration and chromatic aberration in the telephoto end state become difficult, which is not desirable. If the lower limit value of the conditional expression (15) is 2.0, the effect of the present application can be demonstrated with certainty. If the upper limit value of the conditional expression (15) is exceeded, the refractive power of the fifth lens group G5 increases, and correction of curvature of field and distortion in the wide-angle end state becomes difficult, which is not desirable. If the upper limit value of the conditional expression (15) is 3.0, the effect of the present application can be demonstrated with certainty.

In the zooming optical system ZL, it is preferable that the following conditional expression (16) is satisfied.

$$0.8 < (-f4)/f5 < 1.8 \quad (16)$$

where f4 denotes a focal length of the fourth lens group G4, and f5 denotes a focal length of the fifth lens group G5.

The conditional expression (16) specifies an appropriate focal length of the fourth lens group G4 with respect to the focal length of the fifth lens group G5. By satisfying the conditional expression (16), curvature of field and distortion in the wide-angle end state can be corrected well. If the lower limit value of the conditional expression (16) is not reached, the refractive power of the fourth lens group G4 increases, and correction of chromatic aberration in the telephoto end state becomes difficult, which is not desirable. If the lower limit value of the conditional expression (16) is 0.9, the effect of the present application can be demonstrated with certainty. If the upper limit value of the conditional expression (16) is exceeded, the refractive power of the fifth lens group G5 increases, and correction of curvature of field and distortion in the wide-angle end state becomes difficult, which is not desirable. If the upper limit value of the conditional expression (16) is 1.6, the effect of the present application can be demonstrated with certainty.

In the zooming optical system ZL, it is preferable that the following conditional expression (17) is satisfied.

$$0.3 < (-f2)/f5 < 0.8 \quad (17)$$

where f2 denotes a focal length of the second lens group G2, and f5 denotes a focal length of the fifth lens group G5.

The conditional expression (17) specifies an appropriate focal length of the second lens group G2 with respect to the focal length of the fifth lens group G5. By satisfying the conditional expression (17), curvature of field and distortion in the wide-angle end state can be corrected well. If the lower limit value of the conditional expression (17) is not reached, the refractive power of the second lens group G2 increases, and correction of coma aberration in the wide-angle end state becomes difficult, which is not desirable. If the lower limit value of the conditional expression (17) is 0.4, the effect of the present application can be demonstrated with certainty. If the upper limit value of the conditional expression (17) is exceeded, the refractive power of the fifth lens group G5 increases, and correction of curvature of field and distortion in the wide-angle end state becomes difficult, which is not desirable. If the upper limit value of the conditional expression (17) is 0.7, the effect of the present application can be demonstrated with certainty. If the upper limit value of the conditional expression (17) is 0.6, the effect of the present application can be demonstrated at the maximum.

In the zooming optical system ZL, it is preferable that an aperture stop S is disposed in a position closer to the image than the second lens group G2. In this case, it is preferable that the aperture stop S is disposed between the third lens group G3 and the fifth lens group G5. It is more preferable that the aperture stop S is disposed between the third lens group G3 and the fourth lens group G4. By this configuration, coma aberration and curvature of field can be corrected well.

In the zooming optical system ZL, it is preferable that at least a part of the third lens group G3 is moved along the optical axis upon focusing. By this configuration, quick focusing is implemented, and fluctuation of angle of view and fluctuation of spherical aberration during focusing can be decreased.

In the zooming optical system ZL, it is preferable that at least a part of the second lens group G2 to the fifth lens group G5 (a plurality of lens groups, one of the lens groups, or a part of the lenses constituting any of the lens groups) is moved so as to include a component orthogonal to the optical axis. In this case, it is more preferable that at least a part of the second lens group G2 is moved so as to include a component orthogonal to the optical axis. By this configuration, camera shake can be corrected by a lens having a small diameter, therefore the size of the lens barrel can be smaller.

In the zooming optical system ZL, it is preferable that all the lens surfaces are spherical. By this configuration, processing, assembly and adjustment of the lenses become easier, and deterioration of optical performance, due to an error in processing, assembly and adjustment, can be prevented. Even if the image plane is shifted, the drawing performance is not affected very much, which is desirable.

An overview of the manufacturing method for the zooming optical system ZL according to the fourth embodiment will be described with reference to FIG. 24. First the lens groups G1 to G5 are prepared by disposing each lens (step S100). Each lens group is disposed so that the second lens group G2 is fixed with respect to the image plane I upon zooming (step S200). Further, each lens group G1 to G5 is disposed so that the conditional expressions (13) and (14) are satisfied (step S300).

In concrete terms, in the present embodiment as shown in FIG. 1 for example, the first lens group G1 is created by disposing, in order from the object: a cemented lens (in which a negative meniscus lens L11 having a convex surface facing the object and a biconvex lens L12 are cemented), and a positive meniscus lens L13 having a convex surface facing the object; the second lens group G2 is created by disposing a cemented lens (in which a biconvex lens L21 and a biconcave lens L22 are cemented), a cemented lens (in which a biconcave lens L23 and a positive meniscus lens L24 having a convex surface facing the object are cemented), and a biconcave lens L25; the third lens group G3 is created by disposing a biconvex lens L31, and a cemented lens (in which a negative meniscus lens L32 having a convex surface facing the object and a biconvex lens L33 are cemented); the fourth lens group G4 is created by disposing a cemented lens (in which a biconcave lens L41 and a positive meniscus lens L42 having the convex surfaces facing the object are cemented); and the fifth lens group G5 is created by disposing a biconvex lens L51, a cemented lens (in which a plano-convex lens L52 having a convex surface facing the object, a plano-concave lens L53 having a concave surface facing the image, and a plano-convex lens L54 having a convex surface facing the object are cemented), a cemented lens (in which a biconvex lens L55 and a plano-concave lens L56 having a concave surface facing the object are cemented), and a negative meniscus lens L57 having a concave surface facing the object. Each lens group prepared like this is disposed according to the above mentioned procedure, whereby the zooming optical system ZL is manufactured.

A fifth preferred embodiment of the present invention will now be described with reference to the drawings. As shown in FIG. 1, a zooming optical system ZL according to the fifth preferred embodiment is constituted by, in order from the object: a first lens group G1 having positive refractive power; a second lens group G2 having negative refractive power; a third lens group G3 having positive refractive power; a fourth lens group G4 having negative refractive power; and a fifth lens group G5 having positive refractive power. In this zooming optical system ZL, it is preferable that the second lens group G2 and the fourth lens group G4 are fixed with respect to the image plane upon zooming. By this configuration, lens barrel configuration upon zooming can be simplified, and the size of the lens barrel can be smaller. Further, deterioration of optical performance, due to manufacturing error, can be controlled.

Conditions to construct the zooming optical system ZL according to the fifth preferred embodiment will now be described. It is preferable that the zooming optical system ZL satisfies the following conditional expression (18).

$$1.05 < f1/(-f2) < 6.10 \tag{18}$$

where f1 denotes a focal length of the first lens group G1, and f2 denotes a focal length of the second lens group G2.

The conditional expression (18) specifies an appropriate focal length of the first lens group G1 with respect to the focal length of the second lens group G2. By satisfying the conditional expression (18), spherical aberration and chromatic aberration in the telephoto end state can be corrected well. If the lower limit value of the conditional expression (18) is not reached, the refractive power of the first lens group G1 increases, and correction of spherical aberration and chromatic aberration in the telephoto end state becomes difficult, which is not desirable. If the lower limit value of the conditional expression (18) is 2.25, the effect of the present application can be demonstrated with certainty. If the upper limit value of the conditional expression (18) is exceeded, the refractive power of the first lens group G1 decreases and the total length of the zooming optical system increases, which is not desirable. If the upper limit value of the conditional expression (18) is 5.87, the effect of the present application can be demonstrated with certainty.

In the zooming optical system ZL, it is preferable that the following conditional expression (19) is satisfied.

$$0.32 < (-f4)/f5 < 1.93 \tag{19}$$

where f4 denotes a focal length of the fourth lens group G4, and f5 denotes a focal length of the fifth lens group G5.

The conditional expression (19) specifies an appropriate focal length of the fourth lens group G4 with respect to the focal length of the fifth lens group G5. By satisfying the conditional expression (19), curvature of field and distortion in the wide-angle end state can be corrected well. If the lower limit value of the conditional expression (19) is not reached, the refractive power of the fourth lens group G4 increases, and correction of chromatic aberration in the telephoto end state becomes difficult, which is not desirable. If the lower limit value of the conditional expression (19) is 0.44, the effect of the present application can be demonstrated with certainty. If the upper limit value of the conditional expression (19) is exceeded, the refractive power of the fifth lens group G5 increases, and correction of curvature of field and distortion in the wide-angle end state becomes difficult, which is not desirable. If the upper limit value of the conditional expression (19) is 1.63, the effect of the present application can be demonstrated with certainty.

In the zooming optical system ZL, it is preferable that the following conditional expression (20) is satisfied.

$$0.74 < f1/(-f4) < 2.82 \tag{20}$$

where f1 denotes a focal length of the first lens group G1, and f4 denotes a focal length of the fourth lens group G4.

The conditional expression (20) specifies an appropriate focal length of the first lens group G1 with respect to the focal length of the fourth lens group G4. By satisfying the conditional expression (20), spherical aberration and chromatic aberration in the telephoto end state can be corrected well. If the lower limit value of the conditional expression (20) is not reached, the refractive power of the first lens group G1 increases, and correction of spherical aberration and chromatic aberration in the telephoto end state becomes difficult, which is not desirable. If the lower limit value of the conditional expression (20) is 0.79, the effect of the present application can be demonstrated with certainty. If the upper limit value of the conditional expression (20) is exceeded, the refractive power of the first lens group G1 decreases, and the total length of the zooming optical system increases, which is not desirable. If the upper limit value of the conditional expression (20) is 2.71, the effect of the present application can be demonstrated with certainty.

In the zooming optical system ZL, it is preferable that an aperture stop S is disposed in a position closer to the image than the second lens group G2. In this case, it is preferable that the aperture stop S is disposed between the third lens group G3 and the fifth lens group G5. It is more preferable that the aperture stop S is disposed between the third lens group G3 and the fourth lens group G4. By this configuration, coma aberration and curvature of field can be corrected well.

In the zooming optical system ZL, it is preferable that at least a part of the third lens group G3 is moved along the optical axis upon focusing. By this configuration, quick focusing is implemented, and fluctuation of angle of view and fluctuation of spherical aberration during focusing can be decreased.

In the zooming optical system ZL, it is preferable that at least a part of the second lens group G2 to the fifth lens group G5 (a plurality of lens groups, one of the lens groups, or a part of the lenses constituting any of the lens groups) is moved so as to include a component orthogonal to the optical axis. In this case, it is more preferable that at least a part of the second lens group G2 is moved so as to include a component orthogonal to the optical axis. By this configuration, camera shake can be corrected by a lens having a small diameter, therefore the size of the lens barrel can be smaller.

In the zooming optical system ZL, it is preferable that all the lens surfaces are spherical. By this configuration, processing, assembly and adjustment of the lenses become easier, and deterioration of optical performance, due to an error in processing, assembly and adjustment, can be prevented. Even if the image plane is shifted, the drawing performance is not affected very much, which is desirable.

Figure 25:
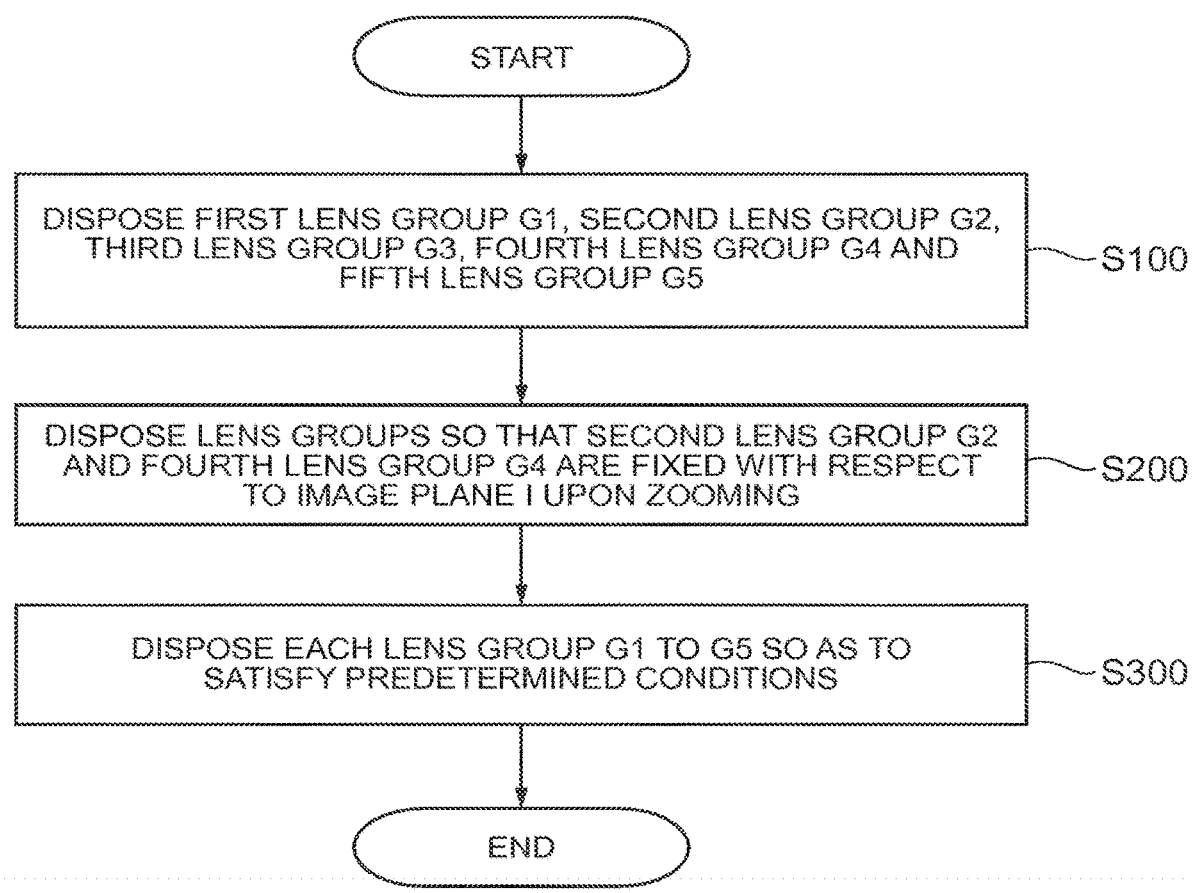
FIG. 25 is a flow chart depicting still another manufacturing method for the zooming optical system.

An overview of the manufacturing method for the zooming optical system ZL according to the fifth embodiment will be described with reference to FIG. 25. First the lens groups G1 to G5 are prepared by disposing each lens (step S100). Each lens group is disposed so that the second lens group G2 and the fourth lens group G4 are fixed with respect to the image plane I upon zooming (step S200). Further, each lens group G1 to G5 is disposed so that the conditional expressions (18) and (19) are satisfied (step S300).

In concrete terms, in the present embodiment as shown in FIG. 1 for example, the first lens group G1 is created by disposing, in order from the object: a cemented lens (in which a negative meniscus lens L11 having a convex surface facing the object and a biconvex lens L12 are cemented), and a positive meniscus lens L13 having a convex surface facing the object; the second lens group G2 is created by disposing a cemented lens (in which a biconvex lens L21 and a biconcave lens L22 are cemented), a cemented lens (in which a biconcave lens L23 and a positive meniscus lens L24 having a convex surface facing the object are cemented), and a biconcave lens L25; the third lens group G3 is created by disposing a biconvex lens L31, and a cemented lens (in which a negative meniscus lens L32 having a convex surface facing the object and a biconvex lens L33 are cemented); the fourth lens group G4 is created by disposing a cemented lens (in which a biconcave lens L41 and a positive meniscus lens L42 having the convex surfaces facing the object are cemented); and the fifth lens group G5 is created by disposing a biconvex lens L51, a cemented lens (in which a plano-convex lens L52 having a convex surface facing the object, a plano-concave lens L53 having a concave surface facing the image, and a plano-convex lens L54 having a convex surface facing the object are cemented), a cemented lens (in which a biconvex lens L55 and a plano-concave lens L56 having a concave surface facing the object are cemented), and a negative meniscus lens L57 having a concave surface facing the object. Each lens group prepared like this is disposed according to the above mentioned procedure, whereby the zooming optical system ZL is manufactured.

A sixth preferred embodiment of the present invention will now be described with reference to the drawings. As shown in FIG. 1, a zooming optical system ZL according to the sixth preferred embodiment is constituted by, in order from the object: a first lens group G1 having positive refractive power; a second lens group G2 having negative refractive power; a third lens group G3 having positive refractive power; a fourth lens group G4 having negative refractive power; and a fifth lens group G5 having positive refractive power. In this zooming optical system ZL, it is preferable that the second lens group G2 and the fourth lens group G4 are fixed with respect to the image plane upon zooming. By this configuration, lens barrel configuration upon zooming can be simplified, and the size of the lens barrel can be smaller. Further, deterioration of optical performance, due to manufacturing error, can be controlled.

In the zooming optical system ZL according to the sixth preferred embodiment, first of all it is preferable that the following conditional expression (21) is satisfied for this zooming optical system ZL.

$$0.44 < (-f2)/f3 < 0.86 \quad (21)$$

where f2 denotes a focal length of the second lens group G2, and f3 denotes a focal length of the third lens group G3.

The conditional expression (21) specifies an appropriate focal length of the second lens group G2 with respect to the focal length of the third lens group G3. By satisfying the conditional expression (21), coma aberration in the wide-angle end state and spherical aberration and chromatic aberration in the telephoto end state can be corrected well. If the lower limit value of the conditional expression (21) is not reached, the refractive power of the second lens group G2 increases, and correction of coma aberration in the wide-angle end state becomes difficult, which is not desirable. If the lower limit value of the conditional expression (21) is 0.47, the effect of the present application can be demonstrated with certainty. If the upper limit value of the conditional expression (21) is exceeded, the refractive power of the third lens group G3 increases, and correction of spherical aberration and chromatic aberration in the telephoto end state becomes difficult, which is not desirable. If the upper limit value of the conditional expression (21) is 0.76, the effect of the present application can be demonstrated with certainty.

In the zooming optical system ZL, it is preferable that the following conditional expression (22) is satisfied.

$$0.32 < (-f4)/f5 < 2.07 \quad (22)$$

where f4 denotes a focal length of the fourth lens group G4, and f5 denotes a focal length of the fifth lens group G5.

The conditional expression (22) specifies an appropriate focal length of the fourth lens group G4 with respect to the focal length of the fifth lens group G5. By satisfying the conditional expression (22), curvature of field and distortion in the wide-angle end state can be corrected well. If the lower limit value of the conditional expression (22) is not reached, the refractive power of the fourth lens group G4 increases, and correction of chromatic aberration in the telephoto end state becomes difficult, which is not desirable. If the lower limit value of the conditional expression (22) is 0.44, the effect of the present application can be demonstrated with certainty. If the upper limit value of the conditional expression (22) is exceeded, the refractive power of the fifth lens group G5 increases, and correction of curvature of field and distortion in the wide-angle end state becomes difficult, which is not desirable. If the upper limit value of the conditional expression (22) is 1.63, the effect of the present application can be demonstrated with certainty.

In the zooming optical system ZL, it is preferable that the following conditional expression (23) is satisfied.

$$0.29 < f3/(-f4) < 0.87 \quad (23)$$

where f3 denotes a focal length of the third lens group G3, and f4 denotes a focal length of the fourth lens group G4.

The conditional expression (23) specifies an appropriate focal length of the third lens group G3 with respect to the focal length of the fourth lens group G4. By satisfying the conditional expression (23), spherical aberration and chromatic aberration in the telephoto end state can be corrected well. If the lower limit value of the conditional expression (23) is not reached, the refractive power of the third lens group G3 increases, and correction of spherical aberration and chromatic aberration in the telephoto end state becomes difficult, which is not desirable. If the lower limit value of the conditional expression (23) is 0.31, the effect of the present application can be demonstrated with certainty. If the upper limit value of the conditional expression (23) is exceeded, the refractive power of the third lens group G3 decreases, and the total length of the zooming optical system increases, which is not desirable. If the upper limit value of the conditional expression (23) is 0.83, the effect of the present application can be demonstrated with certainty.

In the zooming optical system ZL, it is preferable that an aperture stop S is disposed in a position closer to the image than the second lens group G2. In this case, it is preferable that the aperture stop S is disposed between the third lens group G3 and the fifth lens group G5. It is more preferable that the aperture stop S is disposed between the third lens group G3 and the fourth lens group G4. By this configuration, coma aberration and curvature of field can be corrected well.

In the zooming optical system ZL, it is preferable that at least a part of the third lens group G3 is moved along the optical axis upon focusing. By this configuration, quick focusing is implemented, and fluctuation of angle of view and fluctuation of spherical aberration during focusing can be decreased.

In the zooming optical system ZL, it is preferable that at least a part of the second lens group G2 to the fifth lens group G5 (a plurality of lens groups, one of the lens groups, or a part of the lenses constituting any of the lens groups) is moved so as to include a component orthogonal to the optical axis. In this case, it is more preferable that at least a part of the second lens group G2 is moved so as to include a component orthogonal to the optical axis. By this configuration, camera shake can be corrected by a lens having a small diameter, therefore the size of the lens barrel can be smaller.

In the zooming optical system ZL, it is preferable that all the lens surfaces are spherical. By this configuration, processing, assembly and adjustment of the lenses become easier, and deterioration of optical performance, due to an error in processing, assembly and adjustment, can be prevented. Even if the image plane is shifted, the drawing performance is not affected very much, which is desirable.

An overview of the manufacturing method for the zooming optical system ZL according to the sixth embodiment will be described with reference to FIG. 25. First the lens groups G1 to G5 are prepared by disposing each lens (step S100). Each lens group is disposed so that the second lens group G2 and the fourth lens group G4 are fixed with respect to the image plane I upon zooming (step S200). Further, each lens group G1 to G5 is disposed so that the conditional expressions (21) and (22) are satisfied (step S300).

In concrete terms, in the present embodiment as shown in FIG. 1 for example, the first lens group G1 is created by disposing, in order from the object: a cemented lens (in which a negative meniscus lens L11 having a convex surface facing the object and a biconvex lens L12 are cemented), and a positive meniscus lens L13 having a convex surface facing the object; the second lens group G2 is created by disposing a cemented lens (in which a biconvex lens L21 and a biconcave lens L22 are cemented), a cemented lens (in which a biconcave lens L23 and a positive meniscus lens L24 having a convex surface facing the object are cemented), and a biconcave lens L25; the third lens group G3 is created by disposing a biconvex lens L31, and a cemented lens (in which a negative meniscus lens L32 having a convex surface facing the object and a biconvex lens L33 are cemented); the fourth lens group G4 is created by disposing a cemented lens (in which a biconcave lens L41 and a positive meniscus lens L42 having the convex surfaces facing the object are cemented); and the fifth lens group G5 is created by disposing a biconvex lens L51, a cemented lens (in which a plano-convex lens L52 having a convex surface facing the object, a plano-concave lens L53 having a concave surface facing the image, and a plano-convex lens L54 having a convex surface facing the object are cemented), a cemented lens (in which a biconvex lens L55 and a plano-concave lens L56 having a concave surface facing the object are cemented), and a negative meniscus lens L57 having a concave surface facing the object. Each lens group prepared like this is disposed according to the above mentioned procedure, whereby the zooming optical system ZL is manufactured.

A seventh preferred embodiment of the present invention will now be described with reference to the drawings. As shown in FIG. 1, a zooming optical system ZL according to the seventh preferred embodiment is constituted by, in order from the object: a first lens group G1 having positive refractive power; a second lens group G2 having negative refractive power; a third lens group G3 having positive refractive power; a fourth lens group G4 having negative refractive power; and a fifth lens group G5 having positive refractive power. In this zooming optical system ZL, it is preferable that the first lens group G1 is moved toward the image plane I along the optical axis upon zooming. By this configuration, aberration fluctuation during zooming can be decreased. Moreover, the refractive power of the first lens group G1 can be weakened, hence a worsening of aberrations, when decentering is generated due to manufacturing error, can be controlled.

In the zooming optical system ZL, it is preferable that at least a part of the second lens group G2 to the fifth lens group G5 (a plurality of lens groups, one of the lens groups, or a part of the lenses constituting any of the lens groups) is moved so as to include a component orthogonal to the optical axis. In this case, it is more preferable that at least a part of the second lens group G2 is moved so as to include a component orthogonal to the optical axis. By this configuration, camera shake can be corrected by a lens having a small diameter, therefore the size of the lens barrel can be smaller.

Conditions to construct the zooming optical system ZL according to the seventh preferred embodiment will now be described. It is preferable that the zooming optical system ZL satisfies the following conditional expression (24).

$$4.41 < f1/(-f2) < 5.33 \tag{24}$$

where f1 denotes a focal length of the first lens group G1, and f2 denotes a focal length of the second lens group G2.

The conditional expression (24) specifies an appropriate focal length of the first lens group G1 with respect to the focal length of the second lens group G2. By satisfying the conditional expression (24), spherical aberration and chromatic aberration in the telephoto end state can be corrected well. If the lower limit value of the conditional expression (24) is not reached, the refractive power of the first lens group G1 increases, and correction of spherical aberration and chromatic aberration in the telephoto end state becomes difficult, which is not desirable. If the lower limit value of the conditional expression (24) is 4.45, the effect of the present application can be demonstrated with certainty. If the upper limit value of the conditional expression (24) is exceeded, the refractive power of the first lens group G1 decreases and the total length of the zooming optical system increases, which is not desirable. If the upper limit value of the conditional expression (24) is 5.30, the effect of the present application can be demonstrated with certainty.

In the zooming optical system ZL, it is preferable that the following conditional expression (25) is satisfied.

$$2.15 < f1/f3 < 4.95 \tag{25}$$

where f1 denotes a focal length of the first lens group G1, and f3 denotes a focal length of the third lens group G3.

The conditional expression (25) specifies an appropriate focal length of the first lens group G1 with respect to the focal length of the third lens group G3. By satisfying the conditional expression (25), spherical aberration and chromatic aberration in the telephoto end state can be corrected well. If the lower limit value of the conditional expression (25) is not reached, the refractive power of the first lens group G1 increases, and correction of spherical aberration and chromatic aberration in the telephoto end state becomes difficult, which is not desirable. If the lower limit value of the conditional expression (25) is 2.20, the effect of the present application can be demonstrated with certainty. If the upper limit value of the conditional expression (25) is exceeded, the refractive power of the first lens group G1 decreases, and the total length of the zooming optical system increases, which is not desirable. If the upper limit value of the conditional expression (25) is 4.35, the effect of the present application can be demonstrated with certainty.

In the zooming optical system ZL, it is preferable that the following conditional expression (26) is satisfied.

$$0.18 < f3/(-f4) < 0.92 \tag{26}$$

where f3 denotes a focal length of the third lens group G3, and f4 denotes a focal length of the fourth lens group G4.

The conditional expression (26) specifies an appropriate focal length of the third lens group G3 with respect to the focal length of the fourth lens group G4. By satisfying the conditional expression (26), spherical aberration and chromatic aberration in the telephoto end state can be corrected well. If the lower limit value of the conditional expression (26) is not reached, the refractive power of the third lens group G3 increases, and correction of spherical aberration and chromatic aberration in the telephoto end state becomes difficult, which is not desirable. If the lower limit value of the conditional expression (26) is 0.22, the effect of the present application can be demonstrated with certainty. If the upper limit value of the conditional expression (26) is exceeded, the refractive power of the third lens group G3 decreases, and the total length of the zooming optical system increases, which is not desirable. If the upper limit value of the conditional expression (26) is 0.85, the effect of the present application can be demonstrated with certainty.

In the zooming optical system ZL, it is preferable that the following conditional expression (27) is satisfied.

$$0.82 < (-f4)/f5 < 1.58 \tag{27}$$

where f4 denotes a focal length of the fourth lens group G4, and f5 denotes a focal length of the fifth lens group G5.

The conditional expression (27) specifies an appropriate focal length of the fourth lens group G4 with respect to the focal length of the fifth lens group G5. By satisfying the conditional expression (27), curvature of field and distortion in the wide-angle end state can be corrected well. If the lower limit value of the conditional expression (27) is not reached, the refractive power of the fourth lens group G4 increases, and correction of chromatic aberration in the telephoto end state becomes difficult, which is not desirable. If the lower limit value of the conditional expression (27) is 0.88, the effect of the present application can be demonstrated with certainty. If the upper limit value of the conditional expression (27) is exceeded, the refractive power of the fifth lens group G5 increases, and correction of curvature of field and distortion in the wide-angle end state becomes difficult, which is not desirable. If the upper limit value of the conditional expression (27) is 1.52, the effect of the present application can be demonstrated with certainty.

In the zooming optical system ZL, it is preferable that an aperture stop S is disposed in a position closer to the image than the second lens group G2. In this case, it is preferable that the aperture stop S is disposed between the third lens group G3 and the fifth lens group G5. It is more preferable that the aperture stop S is disposed between the third lens group G3 and the fourth lens group G4. By this configuration, coma aberration and curvature of field can be corrected well.

In the zooming optical system ZL, it is preferable that at least a part of the third lens group G3 is moved along the optical axis upon focusing. By this configuration, quick focusing is implemented, and fluctuation of angle of view and fluctuation of spherical aberration during focusing can be decreased.

In the zooming optical system ZL, it is preferable that the second lens group G2 is fixed with respect to the image plane I upon zooming. By this configuration, the lens barrel configuration during zooming can be simplified, and the size of the lens barrel can be smaller. Further, deterioration of optical performance, due to manufacturing error, can be controlled.

In the zooming optical system ZL, it is preferable that all the lens surfaces are spherical. By this configuration, processing, assembly and adjustment of the lenses become easier, and deterioration of optical performance, due to an error in processing, assembly and adjustment, can be prevented. Even if the image plane is shifted, the drawing performance is not affected very much, which is desirable.

In the zooming optical system ZL, an anti-reflection film, including at least one layer formed by a wet process, is formed on at least one surface of the optical surfaces of the n-th lens group Gn (fifth lens group G5 in this embodiment). The anti-reflection film formed in the zooming optical system ZL is a multilayer film, and the outermost layer of the multilayer film is preferably a layer formed by the wet process. By this configuration, the refractive index difference from air can be decreased, hence reflection of the light can be decreased, and ghosts and flares can be further decreased.

In the zooming optical system ZL, the following conditional expression (28) is satisfied, where nd denotes a refractive index at d-line (wavelength: 587.6 nm) of the layer formed by the wet process. By satisfying this conditional expression, the refractive index difference from air can be decreased, hence reflection of light can be decreased, and ghosts and flares can be further decreased.

$$nd \leq 1.30 \quad (28)$$

The anti-reflection film may include at least one layer of which refractive index is 1.30 or less, formed without using the wet process (using dry process or the like). By this configuration as well, the same effect as the case of using the wet process can be demonstrated. In this case, it is preferable that the layer of which refractive index is 1.30 or less is the outermost layer out of the layers constituting the multilayer film.

As shown in FIG. 5, when the rays BM from the object side enter the zooming optical system ZL1, the rays are reflected on the object side lens surface of the biconvex lens L55 (first ghost generation surface, corresponding to Surface Number 29), and the reflected rays are reflected again on the image side lens surface of the plano convex lens L54 (second ghost generation surface, corresponding to Surface Number 28), reach the image plane I and generate a ghost. Although details will be described later, the anti-reflection film according to each example has a multilayer structure (seven layers), the outermost layer (seventh layer) is formed by the wet process, and the refractive index at d-line is 1.26 (see Table 16 shown below).

An overview of the manufacturing method for the zooming optical system ZL according to the seventh embodiment will be described with reference to FIG. 23. First the lens groups G1 to G5 are prepared by disposing each lens (step S100). Each lens group is disposed so that the first lens group G1 is moved along the optical axis upon zooming (step S200). Further, each lens group is disposed so that at least a part of the second lens group G2 to the fifth lens group G5 is moved so as to include a component orthogonal to the optical axis (step S300). Furthermore, each lens group is disposed so that each lens group G1 to G5 satisfies the above mentioned conditional expressions (24) and (25) (step S400).

In concrete terms, in the present embodiment as shown in FIG. 1 for example, the first lens group G1 is created by disposing, in order from the object: a cemented lens (in which a negative meniscus lens L11 having a convex surface facing the object and a biconvex lens L12 are cemented), and a positive meniscus lens L13 having a convex surface facing the object; the second lens group G2 is created by disposing a cemented lens (in which a biconvex lens L21 and a biconcave lens L22 are cemented), a cemented lens (in which a biconcave lens L23 and a positive meniscus lens L24 having a convex surface facing the object are cemented), and a biconcave lens L25; the third lens group G3 is created by disposing a biconvex lens L31, and a cemented lens (in which a negative meniscus lens L32 having a convex surface facing the object and a biconvex lens L33 are cemented); the fourth lens group G4 is created by disposing a cemented lens (in which a biconcave lens L41 and a positive meniscus lens L42 having the convex surfaces facing the object are cemented); and the fifth lens group G5 is created by disposing a biconvex lens L51, a cemented lens (in which a plano-convex lens L52 having a convex surface facing the object, a plano-concave lens L53 having a concave surface facing the image, and a plano-convex lens L54 having a convex surface facing the object are cemented), a cemented lens (in which a biconvex lens L55 and a plano-concave lens L56 having a concave surface facing the object are cemented), and a negative meniscus lens L57 having a concave surface facing the object. Each lens group prepared like this is disposed according to the above mentioned procedure, whereby the zooming optical system ZL is manufactured.

Figure 22:
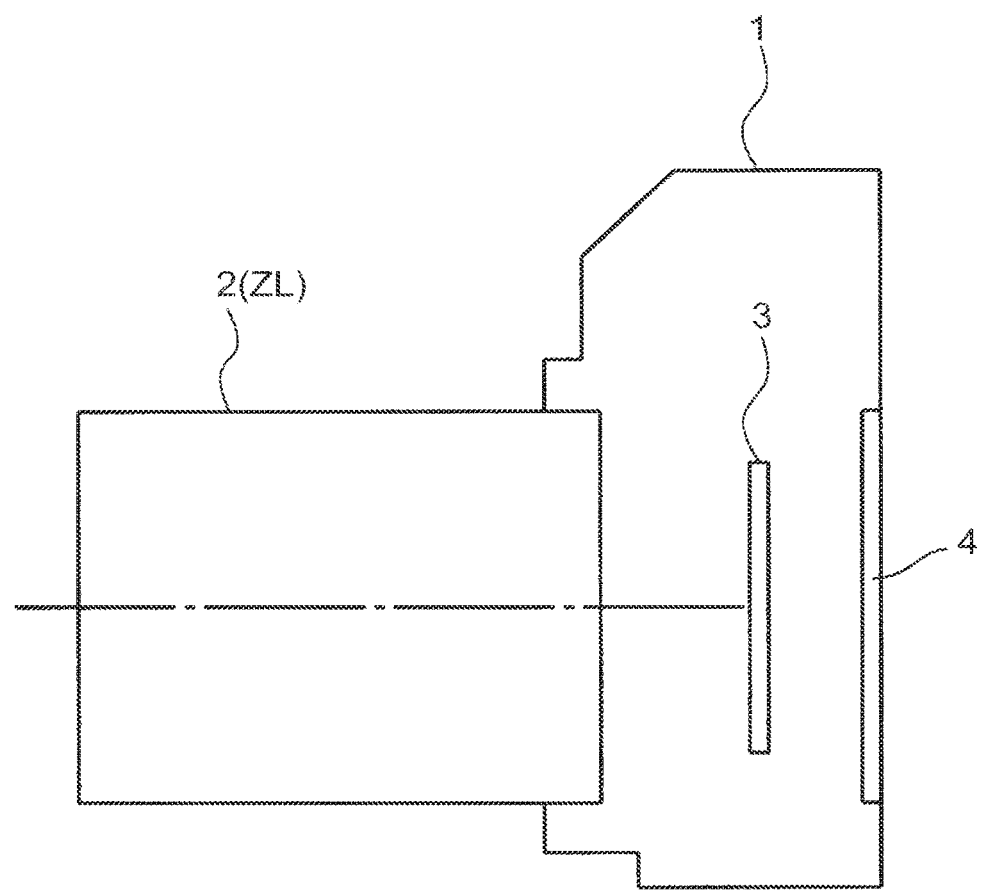
FIG. 22 is a cross-sectional view of a camera in which the zooming optical system is mounted.

Now a camera, which is an optical apparatus that includes the zooming optical system ZL according to the embodiments, will be described with reference to FIG. 22. This camera 1 is a lens replaceable type mirrorless camera that includes the zooming optical system ZL according to the embodiments as an image capturing lens 2. In this camera 1, light from an object (not illustrated) is collected by the image capturing lens 2, and forms an image of the object on the imaging plane of an imaging unit 3 via OLPF (Optical Low-Pass Filter) (not illustrated). The object image is photo-electric converted by a photo-electric conversion element disposed in the imaging unit 3, whereby an image of the object is generated. This image is displayed on an EVF (Electronic View Finder) 4 disposed on the camera 1. Thereby the user can view the object via EVF4.

If the user presses a release button (not illustrated), the photo-electric converted image by the imaging unit 3 is stored in memory (not illustrated). Thus the user can capture an image of the object using this camera 1. In the embodiments, an example of a mirrorless camera was described, but a similar effect as the case of the camera 1 can be demonstrated even if the zooming optical system ZL, according to the embodiments, is mounted in a camera main body of a single lens reflex type camera, which includes a quick return mirror, and views the object by a finder optical system.

The following content can be adopted within a range where the optical performance is not diminished.

In the embodiments, the zooming optical system ZL constituted by five lens groups or six lens groups was shown, but the conditions of the above configuration or the like can be applied to a different number of lens groups, such as a seven lens group. A lens or a lens group may be added to the side closest to the object, or a lens or a lens group may be added to the side closest to the image. "Lens group" refers to a portion having at least one lens isolated by an air space which changes upon zooming.

A single lens group, a plurality of lens groups or a partial lens group may be designed as a focusing lens group, which performs focusing from an object at infinity to an object at a short distance by moving in the optical axis direction. This focusing lens group can be applied to auto focus, and is also suitable for driving a motor for auto focusing (driving using an ultrasonic motor or the like). It is particularly preferable that at least a part of the third lens group G3 is designed to be the focusing lens group, as mentioned above.

A lens group or a partial lens group may be designed to be a vibration-isolating lens group, which corrects image blurs generated by camera shake, by moving the lens group or the partial lens group in a direction to have a component orthogonal to the optical axis, or by rotating the lens group in an in-plane direction that includes the optical axis. It is particularly preferable that at least a part of the second lens group G2 is designed to be the vibration-isolating lens group, as mentioned above.

The lens surface may be formed to be a spherical surface or a plane, or an aspherical surface. If the lens surface is a spherical surface or a plane, lens processing, assembly and adjustment are easy, as mentioned above, and deterioration of optical performance, due to an error in processing, assembly and adjustment, can be prevented. Even if the image plane is shifted, the drawing performance is not affected very much, which is desirable. If the lens surface is aspherical, the aspherical surface can be any aspherical surface out of an aspherical surface generated by grinding, a glass-molded aspherical surface generated by forming glass in an aspherical shape using a die, and a composite aspherical surface generated by forming resin on the surface of the glass to be an aspherical shape. The lens surface may be a diffraction surface, and the lens may be a refractive index-distributed lens (GRIN lens) or a plastic lens.

It is preferable that the aperture stop S is disposed between the third lens group G3 and the fifth lens group G5, as mentioned above, but the role of the aperture stop may be substituted by the frame of the lens, without disposing a separate element as the aperture stop.

Each lens surface may be coated with an anti-reflection film which has high transmittance in a wide wavelength region in order to decrease flares and ghosts, and implement a high optical performance with high contrast.

The zoom ratio of the zooming optical system ZL of each embodiment is about 3.0 to 7.0.

EXAMPLES

Each example of the present invention will now be described with reference to the drawings. FIG. 1, FIG. 6, FIG. 10, FIG. 14 and FIG. 18 are cross-sectional views depicting the configuration of each zooming optical system ZL (ZL1 to ZL5) and the allocation of refractive power according to each example. In the lower part of the cross-sectional views of the zooming optical systems ZL1 to ZL5, the moving direction of each lens group G1 to G5 or G6, upon zooming from a wide-angle end state (W) to a telephoto end state (T) along the optical axis, is shown by an arrow mark. In all the examples, the first lens group G1 moves along the optical axis with respect to the image plane I upon zooming.

Example 1

FIG. 1 shows a configuration of a zooming optical system ZL1 according to Example 1. The zooming optical system ZL1 shown in FIG. 1 is constituted by, in order from an object: a first lens group G1 having positive refractive power; a second lens group G2 having negative refractive power; a third lens group G3 having positive refractive power; a fourth lens group G4 having negative refractive power; and a fifth lens group G5 having positive refractive power. The first lens group G1 includes, in order from the object: a cemented lens in which a negative meniscus lens L11 having a convex surface facing the object and a biconvex lens L12 are cemented; and a positive meniscus lens L13 having a convex surface facing the object. The second lens group G2 includes, in order from the object: a cemented lens in which a biconvex lens L21 and a biconcave lens L22 are cemented; a cemented lens in which a biconcave lens L23 and a positive meniscus lens L24 having a convex surface facing the object are cemented; and a biconcave lens L25. The third lens group G3 includes, in order from the object: a biconvex lens L31; and a cemented lens in which a negative meniscus lens L32 having a convex surface facing the object and a biconvex lens L33 are cemented. The fourth lens group G4 includes, in order from the object: a cemented lens in which a biconcave lens L41 and a positive meniscus lens L42 having a convex surface facing the object are cemented in order from the object. The fifth lens group G5 includes, in order from the object: a biconvex lens L51; a cemented lens in which a plano-convex lens L52 having a convex surface facing the object, a plano-concave lens L53 having a concave surface facing the image, and a plano-convex lens L54 having a convex surface facing the object are cemented; a cemented lens in which a biconvex lens L55 and a plano-concave lens L56 having a concave surface facing the object are cemented; and a negative meniscus lens L57 having a concave surface facing the object.

In the zooming optical system ZL1 according to Example 1, upon zooming from a wide-angle end state to a telephoto end state, the first lens group G1, the third lens group G3 and the fifth lens group G5 move toward the object on the optical axis, and the second lens group G2 and the fourth lens group G4 are fixed in the optical axis direction with respect to the image plane I. The aperture stop S is disposed on the object side of the fifth lens group G5, and moves with the fifth lens group G5 upon zooming.

Focusing from infinity to an object at a short distance is performed by moving the third lens group G3 toward the image.

For image blur correction (vibration isolation), the cemented lens (in which the biconcave lens L23 and the positive meniscus lens L24 having a convex surface facing the object are cemented) of the second lens group G2 is designed to be a vibration-isolating lens group, and this vibration-isolating lens group is moved so as to include a component orthogonal to the optical axis. To correct a rotation blur of which angle is θ using a lens of which focal length of the zooming optical system is f and the vibration isolation coefficient (ratio of the image moving distance on the imaging surface with respect to the moving distance of the vibration-isolating lens group VL in the image blur correction) is K, the vibration-isolating lens group for blur correction is moved by (f·tan θ)/K in the direction orthogonal to the optical axis (this is the same for the other examples described below). In the wide-angle end state of Example 1, the vibration-isolation coefficient is −0.767 and focal length is 81.6 (mm), hence the moving distance of the vibration-isolating lens group for correcting a 0.2° rotation blur is −0.371 (mm). In the intermediate focal length state of Example 1, the vibration-isolation coefficient is −1.348 and focal length is 200.0 (mm), hence the moving distance of the vibration-isolation lens group for correcting a 0.2° rotation blur is −0.518 (mm). In the telephoto end state of Example 1, the vibration-isolation coefficient is −2.103 and focal length is 392.0 (mm), hence the moving distance of the vibration-isolating lens group for correcting a 0.2° rotation blur is −0.651 (mm).

Table 1 shown below lists each data on Example 1. In [General Data] in Table 1, β is a zoom ratio, f is a focal length of the zooming optical system, FNO is an F number, 2ω is an angle of view, Y is an image height, and TL is a total length. The total length TL here indicates a distance from surface 1 of the lens surface to the image plane I on the optical axis in the infinity focusing state. In [Lens Data], m in the first column is the sequence of the lens surface counted from the object in the light traveling direction (surface number), r in the second column is a radius of curvature of each lens surface, d in the third column is a distance from each optical surface to the next optical surface on the optical axis (surface distance), vd in the fourth column and nd in the fifth column are an Abbe number and a refractive index at d-line (λ=587.6 nm) respectively. The radius of curvature 0.000 indicates a plane, and the refractive index of air 1.00000 is omitted. The surface numbers 1 to 33 in Table 1 correspond to the numbers 1 to 33 in FIG. 1. [Focal Length of Lens Group] shows the first surface and focal length of the first to fifth lens groups G1 to G5 respectively. In all data values, "mm" is normally used as the unit of focal length f, radius of curvature r, surface distance d and other lengths, but the unit is not limited to "mm", since an equivalent optical performance is acquired even if the optical system is proportionally expanded or proportionally reduced. Description on the symbols and description on the data tables are the same for the other later mentioned examples.

TABLE 1

[General Data]
β = 4.8

| | Wide-angle end state | Intermediate focal length state | Telephoto end state |
|---|---|---|---|
| f = | 81.6~ | 200.0~ | 392.0 |
| FNO = | 4.56~ | 5.38~ | 5.85 |
| 2ω = | 29.6~ | 12.1~ | 6.2 |
| Y = | 21.6~ | 21.6~ | 21.6 |
| TL = | 246.4~ | 283.4~ | 302.5 |

[Lens Data]

| m | r | d | vd | nd |
|---|---|---|---|---|
| 1 | 182.816 | 2.500 | 35.7 | 1.90265 |
| 2 | 92.566 | 10.000 | 82.6 | 1.49782 |
| 3 | −707.416 | 0.100 | | |
| 4 | 83.365 | 9.200 | 95.0 | 1.43700 |
| 5 | 1420.361 | D1 | | |
| 6 | 117.082 | 6.400 | 34.9 | 1.80100 |
| 7 | −117.044 | 2.200 | 82.6 | 1.49782 |
| 8 | 61.183 | 5.810 | | |
| 9 | −265.081 | 2.000 | 46.6 | 1.81600 |
| 10 | 30.785 | 4.600 | 25.5 | 1.80518 |
| 11 | 92.264 | 6.200 | | |
| 12 | −56.342 | 2.000 | 42.7 | 1.83481 |
| 13 | 158.965 | D2 | | |
| 14 | 112.252 | 4.600 | 67.9 | 1.59319 |
| 15 | −78.685 | 0.100 | | |
| 16 | 67.612 | 1.800 | 31.3 | 1.90366 |
| 17 | 35.499 | 6.400 | 67.9 | 1.59319 |
| 18 | −238.177 | D3 | | |
| 19 | −58.467 | 1.600 | 54.6 | 1.72916 |
| 20 | 38.999 | 3.600 | 35.7 | 1.90265 |
| 21 | 146.900 | D4 | | |
| 22 | 0.000 | 2.000 | Aperture stop S | |
| 23 | 124.142 | 3.400 | 44.8 | 1.74400 |
| 24 | −124.142 | 0.100 | | |
| 25 | 26.615 | 6.800 | 70.3 | 1.48749 |
| 26 | 0.000 | 2.000 | 29.4 | 1.95000 |
| 27 | 26.437 | 4.800 | 52.2 | 1.51742 |
| 28 | 0.000 | 17.600 | | |
| 29 | 176.178 | 6.000 | 33.7 | 1.64769 |
| 30 | −19.703 | 1.600 | 65.4 | 1.60300 |
| 31 | 0.000 | 11.270 | | |
| 32 | −22.131 | 1.600 | 42.7 | 1.83481 |
| 33 | −33.748 | BF | | |

[Focal Length of Lens Group]

| Lens group | First surface | Focal length |
|---|---|---|
| First lens group | 1 | 161.714 |
| Second lens group | 6 | −32.531 |
| Third lens group | 14 | 50.816 |
| Fourth lens group | 19 | −70.030 |
| Fifth lens group | 23 | 59.673 |

In Example 1, the axial air distance D1 between the first lens group G1 and the second lens group G2, the axial air distance D2 between the second lens group G2 and the third lens group G3, the axial air distance D3 between the third lens group G3 and the fourth lens group G4, the axial air distance D4 between the fourth lens group G4 and the aperture stop S which moves together with the fifth lens group G5, and the back focus BF change upon zooming. Table 2 shows the values of the variable distances D1 to D4 and the back focus BF at each focal length in the wide-angle end state, the intermediate focal length state and the telephoto end state upon focusing on infinity. The back focus BF indicates a distance from the lens surface closest to the image (Surface 33 in FIG. 1) to the image plane I on the optical axis. This description is the same for the other later mentioned examples.

TABLE 2

[Variable Distance Data]

|  | Wide-angle end state | Intermediate focal length state | Telephoto end state |
|---|---|---|---|
| f | 81.6~ | 200.0~ | 392.0 |
| D1 | 8.225~ | 45.191~ | 64.292 |
| D2 | 27.059~ | 15.341~ | 3.056 |
| D3 | 5.388~ | 17.106~ | 29.391 |
| D4 | 26.684~ | 11.153~ | 2.382 |
| BF | 52.8~ | 68.3~ | 77.1 |

Table 3 shows values corresponding to each conditional expression in Example 1. In Table 3, f1 is a focal length of the first lens group G1, f2 is a focal length of the second lens group G2, f4 is a focal length of the fourth lens group G4, and f5 is a focal length of the fifth lens group G5. Description of the symbols is the same for the other later mentioned examples.

TABLE 3

| (1) | f1/(−f2) = 4.97 |
|---|---|
| (2) | f1/f3 = 3.18 |
| (3) | f3/(−f4) = 0.73 |
| (4) | (−f4)/f5 = 1.17 |
| (5) | f1/(−f2) = 4.97 |
| (6) | f3/f5 = 0.85 |
| (7) | f1/(−f4) = 2.31 |
| (8) | f2/f4 = 0.46 |
| (9) | ft/(−f2) = 12.1 |
| (10) | ft/(−f4) = 5.6 |
| (11) | (−f4)/f5 = 1.2 |
| (12) | (−f2)/f5 = 0.6 |
| (13) | f1/(−f2) = 5.0 |
| (14) | f1/(−f4) = 2.3 |
| (15) | f1/f5 = 2.7 |
| (16) | (−f4)/f5 = 1.2 |
| (17) | (−f2)/f5 = 0.6 |
| (18) | f1/(−f2) = 4.97 |
| (19) | (−f4)/f5 = 1.17 |
| (20) | f1/(−f4) = 2.31 |
| (21) | (−f2)/f3 = 0.64 |
| (22) | (−f4)/f5 = 1.17 |
| (23) | f3/(−f4) = 0.73 |
| (24) | f1/(−f2) = 4.97 |
| (25) | f1/f3 = 3.18 |
| (26) | f3/(−f4) = 0.73 |
| (27) | (−f4)/f5 = 1.17 |

As a result, the zooming optical system ZL1 of Example 1 satisfies all the conditional expressions (1) to (27).

Figure 2B:
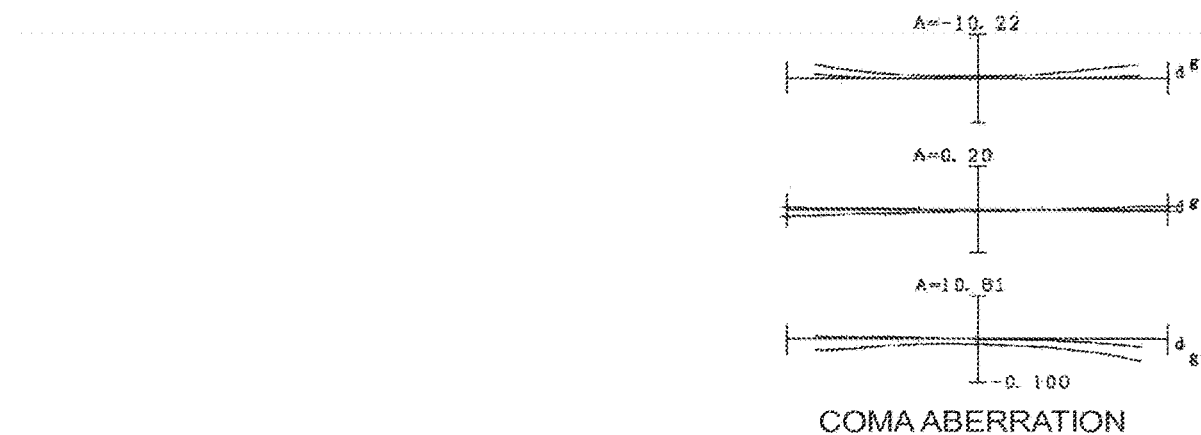
Figure 3A:
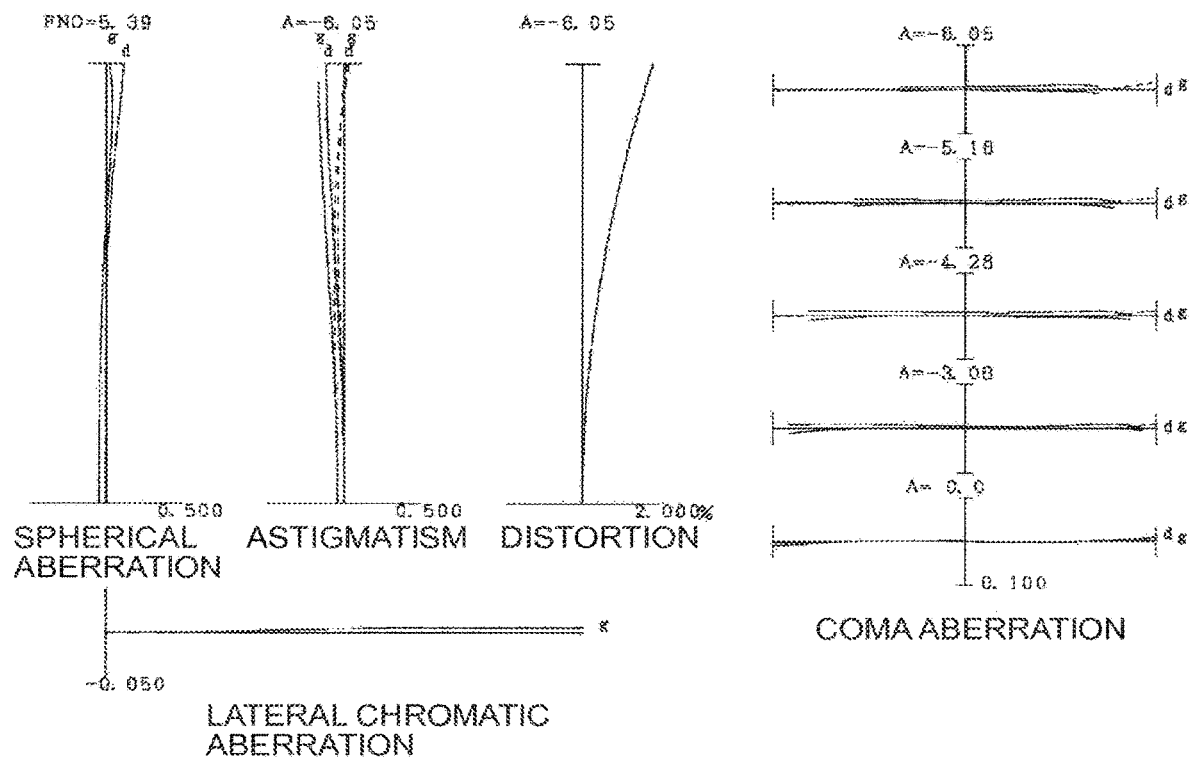
FIGS. 3A and 3B are sets of graphs showing various aberrations of the zooming optical system according to Example 1 in the intermediate focal length state, where
Figure 3B:
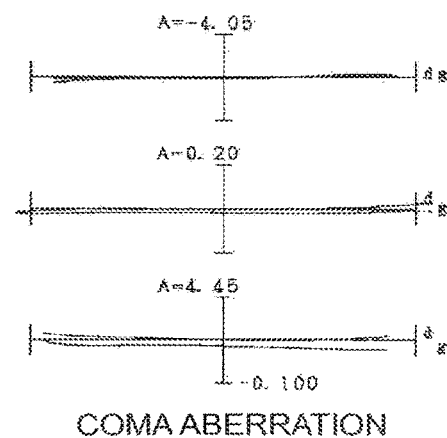
Figure 4A:
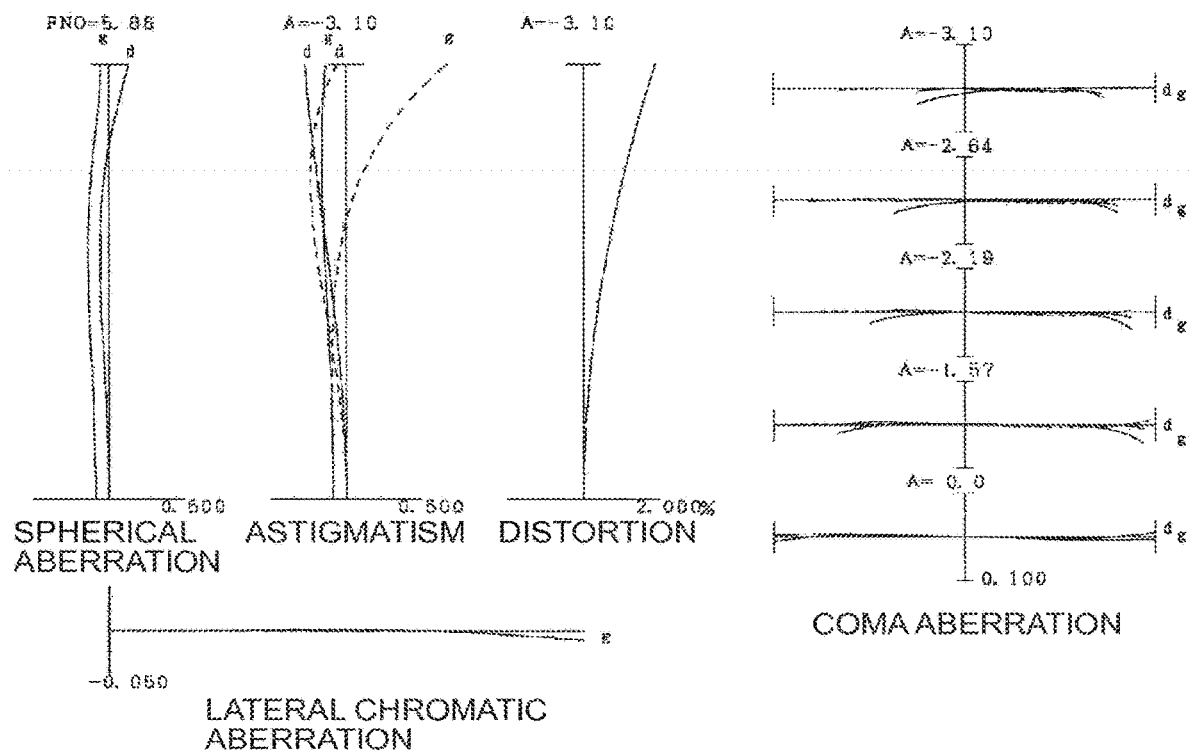
FIGS. 4A and 4B are sets of graphs showing various aberrations of the zooming optical system according to Example 1 in the telephoto end state, where
Figure 4B:
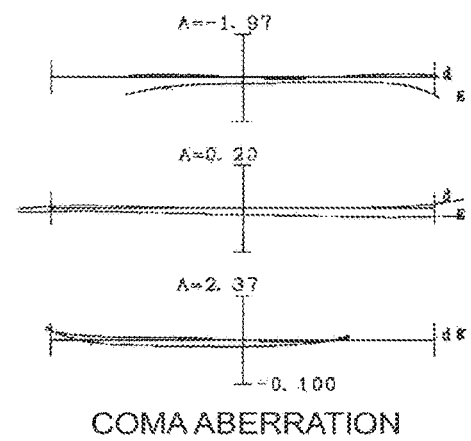

FIG. 2A is a set of graphs showing various aberrations of Example 1 upon focusing on infinity in the wide-angle end state, FIG. 3A is a set of graphs showing various aberrations of Example 1 upon focusing on infinity in the intermediate focal length state, and FIG. 4A is a set of graphs showing various aberrations of Example 1 upon focusing on infinity in the telephoto end state. FIG. 2B is a set of graphs showing coma aberration of Example 1 when image blur is corrected upon focusing on infinity in the wide-angle end state (shift amount of vibration-isolating lens group=−0.371), FIG. 3B is a set of graphs showing coma aberration of Example 1 when image blur is corrected upon focusing on infinity in the intermediate focal length state (shift amount of vibration-isolating lens group=−0.518), and FIG. 4B is a set of graphs showing coma aberration of Example 1 when image blur is corrected upon focusing on infinity in the telephoto end state (shift amount of vibration-isolating lens group=−0.651). In each graph showing aberrations, FNO is an F number, A is a half-angle of view, d is an individual aberration at d-line ($\lambda$=587.6 nm), and g is an individual aberration at g-line ($\lambda$=435.6 nm). The solid line in each graph showing astigmatism indicates the sagittal image surface, and the broken line indicates the meridional image surface. The description on the graphs showing aberrations is the same for the other later mentioned examples. As each graph showing aberrations clarifies, in Example 1, the zooming optical system has an excellent image forming performance, where various aberrations are corrected well in each focal length state from the wide-angle end state to the telephoto end state.

FIG. 5 is the zooming optical system according to Example 1, depicting an example of a state of the incident rays reflecting on the first ghost generation surface and the second ghost generation surface, generating ghosts and flares on the image plane I.

Example 2

Figure 6:
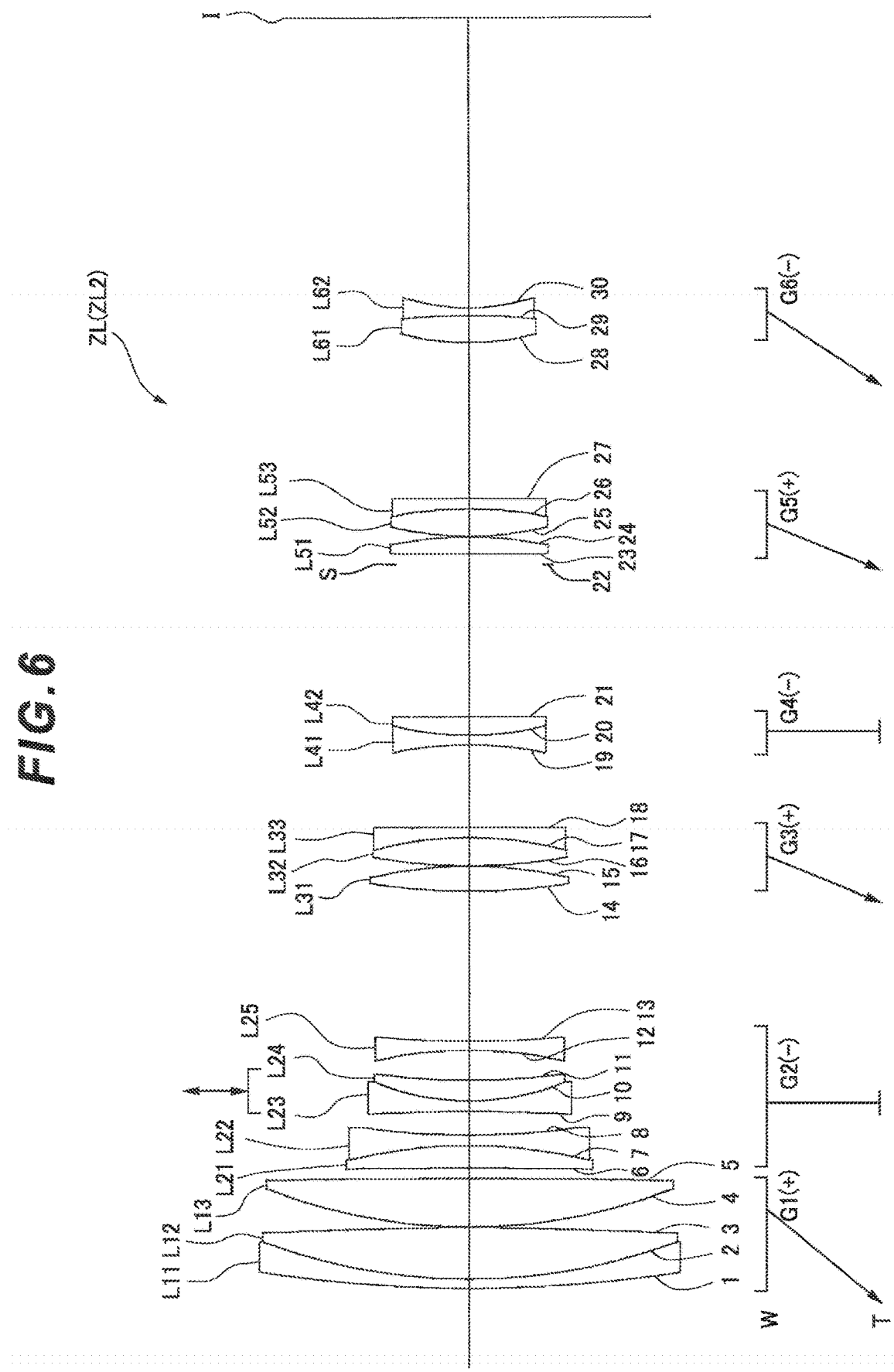
FIG. 6 is a cross-sectional view depicting a lens configuration of a zooming optical system according to Example 2.

FIG. 6 shows a configuration of a zooming optical system ZL2 according to Example 2. The zooming optical system ZL2 shown in FIG. 6 is constituted by, in order from the object: a first lens group G1 having positive refractive power; a second lens group G2 having negative refractive power; a third lens group G3 having positive refractive power; a fourth lens group G4 having negative refractive power; a fifth lens group G5 having positive refractive power; and a sixth lens group G6 having negative refractive power. The first lens group G1 includes, in order from the object: a cemented lens in which a negative meniscus lens L11 having a convex surface facing the object and a biconvex lens L12 are cemented; and a biconvex lens L13. The second lens group G2 includes, in order from the object: a cemented lens in which a positive meniscus lens L21 having a concave surface facing the object and a biconcave lens L22 are cemented; a cemented lens in which a biconcave lens L23 and a positive meniscus lens L24 having a convex surface facing the object are cemented; and a biconcave lens L25. The third lens group G3 includes, in order from the object: a biconvex lens L31; and a cemented lens in which a biconvex lens L32 and a negative meniscus lens L33 having a concave surface facing the object are cemented. The fourth lens group G4 includes a cemented lens in which a biconcave lens L41 and a biconvex lens L42 are cemented in order from the object. The fifth lens group G5 includes, in order from the object: a biconvex lens L51; and a cemented lens in which a biconvex lens L52 and a negative meniscus lens L53 having a concave surface facing the object are cemented. The sixth lens group G6 includes a cemented lens in which a biconvex lens L61 and a biconcave lens L62 are cemented in order from the object.

In the zooming optical system ZL2 according to Example 2, upon zooming from a wide-angle end state to a telephoto end state, the first lens group G1, the third lens group G3, the fifth lens group G5 and the sixth lens group G6 move toward the object on the optical axis, and the second lens group G2 and the fourth lens group G4 are fixed in the optical axis direction with respect to the image plane I. The aperture stop S is disposed on the object side of the fifth lens group G5, and moves with the fifth lens group G5 upon zooming.

Focusing from infinity to an object at a short distance is performed by moving the third lens group G3 toward the image.

For image blur correction (vibration isolation), the cemented lens (in which the biconcave lens L23 and the positive meniscus lens L24 having a convex surface facing the object are cemented) of the second lens group G2 is designed to be a vibration-isolating lens group, and this vibration-isolating lens group is moved so as to include a component orthogonal to the optical axis. In the wide-angle end state of Example 2, the vibration-isolation coefficient is −0.637 and focal length is 72.0 (mm), hence the moving distance of the vibration-isolating lens group for correcting a 0.2° rotation blur is −0.395 (mm). In the intermediate focal length state of Example 2, the vibration-isolation coefficient is −1.158 and focal length is 200.0 (mm), hence the moving distance of the vibration-isolating lens group for correcting a 0.2° rotation blur is −0.603 (mm). In the telephoto end state of Example 2, the vibration-isolation coefficient is −1.763 and focal length is 390.0 (mm), hence the moving distance of the vibration-isolating lens group for correcting a 0.2° rotation blur is −0.772 (mm).

Table 4 shown below lists each data on Example 2. The surface numbers 1 to 30 in Table 4 correspond to numbers 1 to 30 in FIG. 6. [Focal Length of Lens Group] shows the first surface and the focal length of the first to sixth lens groups G1 to G6 respectively.

TABLE 4

[General Data]
$\beta = 5.4$

| | Wide-angle end state | Intermediate focal length state | Telephoto end state |
|---|---|---|---|
| f = | 72.0~ | 200.0~ | 390.0 |
| FNO = | 4.54~ | 5.44~ | 5.88 |
| 2ω = | 33.7~ | 12.0~ | 6.2 |
| Y = | 21.6~ | 21.6~ | 21.6 |
| TL = | 244.3~ | 290.3~ | 309.3 |

[Lens Data]

| m | r | d | vd | nd |
|---|---|---|---|---|
| 1 | 218.093 | 1.800 | 40.7 | 1.88300 |
| 2 | 94.341 | 10.098 | 82.6 | 1.49782 |
| 3 | −579.376 | 0.100 | | |
| 4 | 90.320 | 9.392 | 82.6 | 1.49782 |
| 5 | −1839.350 | D1 | | |
| 6 | −1407.394 | 4.344 | 25.5 | 1.80518 |
| 7 | −80.390 | 2.000 | 67.9 | 1.59319 |
| 8 | 128.565 | 4.528 | | |
| 9 | −287.557 | 1.900 | 42.7 | 1.83481 |
| 10 | 40.640 | 3.951 | 23.8 | 1.84666 |
| 11 | 116.253 | 5.759 | | |
| 12 | −69.042 | 1.800 | 42.7 | 1.83481 |
| 13 | 177.936 | D2 | | |
| 14 | 102.836 | 4.827 | 60.2 | 1.64000 |
| 15 | −70.986 | 0.100 | | |
| 16 | 85.954 | 5.583 | 61.2 | 1.58913 |
| 17 | −58.889 | 2.000 | 23.8 | 1.84666 |
| 18 | −910.681 | D3 | | |
| 19 | −57.570 | 1.800 | 47.4 | 1.78800 |
| 20 | 50.018 | 3.583 | 23.8 | 1.84666 |
| 21 | −2308.874 | D4 | | |
| 22 | 0.000 | 2.000 | Aperture stop S | |
| 23 | 1105.472 | 3.337 | 50.3 | 1.71999 |
| 24 | −60.251 | 0.100 | | |
| 25 | 53.693 | 5.265 | 70.3 | 1.48749 |
| 26 | −61.018 | 2.000 | 23.8 | 1.84666 |
| 27 | −839.528 | D5 | | |
| 28 | 43.363 | 5.139 | 28.4 | 1.72825 |
| 29 | −106.243 | 1.500 | 40.7 | 1.88300 |
| 30 | 33.800 | BF | | |

[Focal Length of Lens Group]

| Lens group | First surface | Focal length |
|---|---|---|
| First lens group | 1 | 151.809 |
| Second lens group | 6 | −32.015 |
| Third lens group | 14 | 53.583 |

TABLE 4-continued

[General Data]
$\beta = 5.4$

| Fourth lens group | 19 | −82.521 |
|---|---|---|
| Fifth lens group | 23 | 58.368 |
| Sixth lens group | 28 | −110.027 |

In Example 2, the axial air distance D1 between the first lens group G1 and the second lens group G2, the axial air distance D2 between the second lens group G2 and the third lens group G3, the axial air distance D3 between the third lens group G3 and the fourth lens group G4, the axial air distance D4 between the fourth lens group G4 and the aperture stop S which moves together with the fifth lens group G5, the axial air distance D5 between the fifth lens group G5 and the sixth lens group G6 and the back focus BF change upon zooming. Table 5 shows the values of the variable distances D1 to D5 and the back focus BF at each focal length in the wide-angle end state, the intermediate focal length state and the telephoto end state upon focusing on infinity.

TABLE 5

[Variable Distance Data]

| | Wide-angle end state | Intermediate focal length state | Telephoto end state |
|---|---|---|---|
| f | 72.0~ | 200.0~ | 390.0 |
| D1 | 2.000~ | 47.946~ | 67.000 |
| D2 | 28.700~ | 17.520~ | 3.000 |
| D3 | 15.940~ | 29.759~ | 42.880 |
| D4 | 29.040~ | 8.875~ | 2.000 |
| D5 | 30.005~ | 22.265~ | 23.642 |
| BF | 55.7~ | 81.0~ | 87.9 |

Table 6 shows a value corresponding to each conditional expression according to Example 2.

TABLE 6

| (1) | f1/(−f2) = 4.74 |
|---|---|
| (2) | f1/f3 = 2.83 |
| (3) | f3/(−f4) = 0.65 |
| (4) | (−f4)/f5 = 1.41 |
| (5) | f1/(−f2) = 4.74 |
| (6) | f3/f5 = 0.92 |
| (7) | f1/(−f4) = 1.84 |
| (8) | f2/f4 = 0.39 |
| (9) | ft/(−f2) = 12.2 |
| (10) | ft/(−f4) = 4.7 |
| (11) | (−f4)/f5 = 1.4 |
| (12) | (−f2)/f5 = 0.6 |
| (13) | f1/(−f2) = 4.7 |
| (14) | f1/(−f4) = 1.8 |
| (15) | f1/f5 = 2.6 |
| (16) | (−f4)/f5 = 1.4 |
| (17) | (−f2)/f5 = 0.6 |
| (18) | f1/(−f2) = 4.74 |
| (19) | (−f4)/f5 = 1.41 |
| (20) | f1/(−f4) = 1.84 |
| (21) | (−f2)/f3 = 0.60 |
| (22) | (−f4)/f5 = 1.41 |
| (23) | f3/(−f4) = 0.65 |
| (24) | f1/(−f2) = 4.74 |
| (25) | f1/f3 = 2.83 |
| (26) | f3/(−f4) = 0.65 |
| (27) | (−f4)/f5 = 1.41 |

As a result, the zooming optical system ZL2 of Example 2 satisfies all the conditional expressions (1) to (27).

Figure 7A:
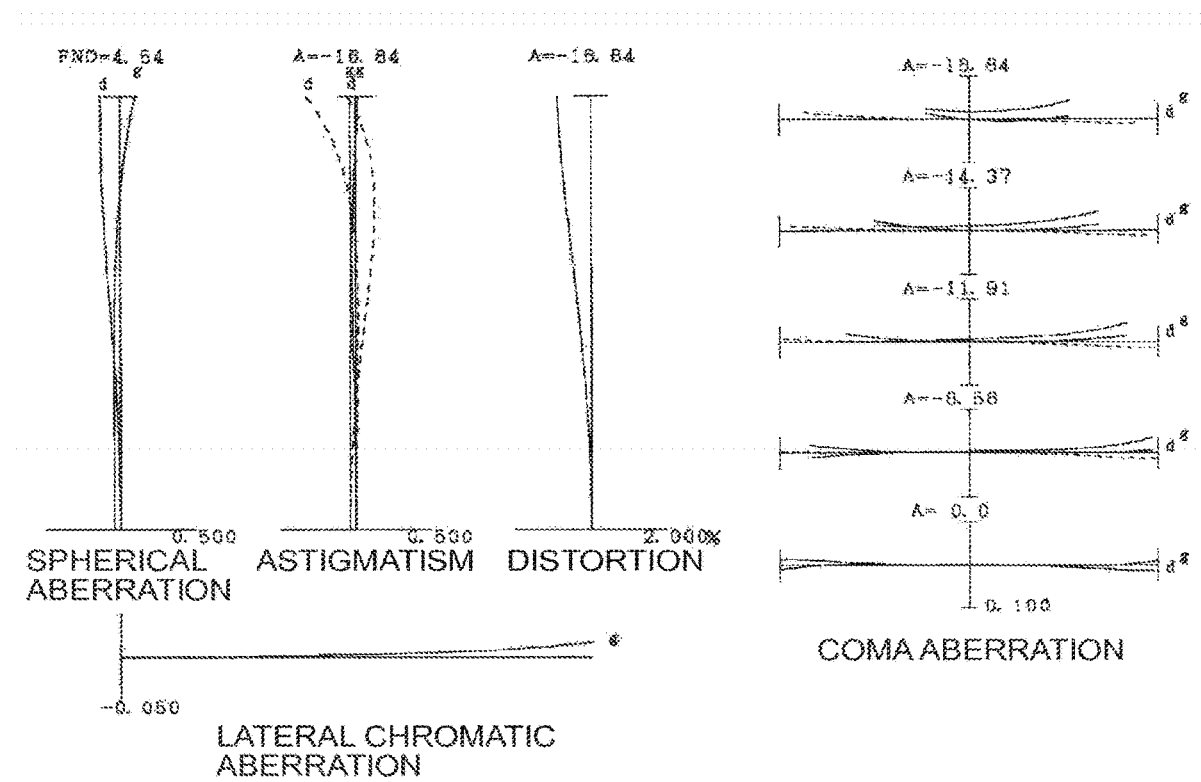
FIGS. 7A and 7B are sets of graphs showing various aberrations of the zooming optical system according to Example 2 in the wide-angle end state, where
Figure 7B:
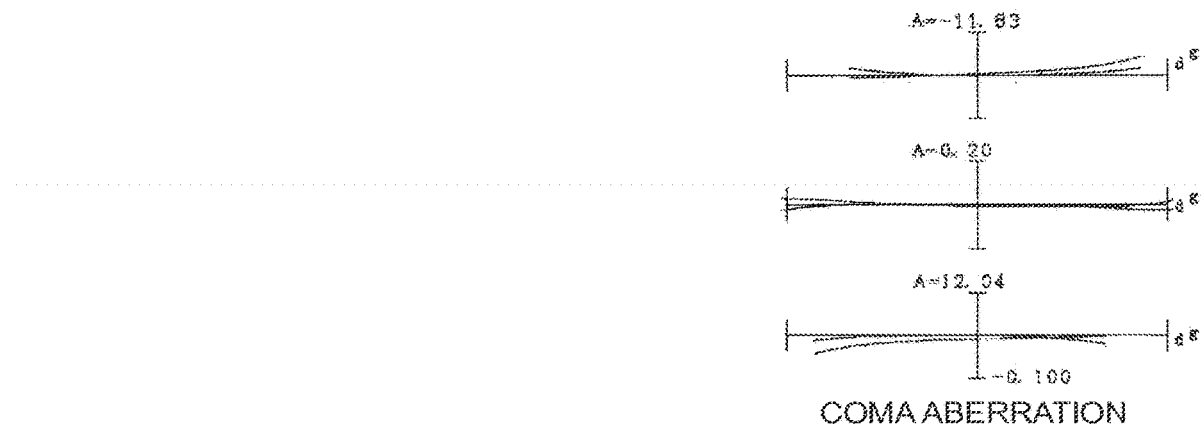
Figure 8A:
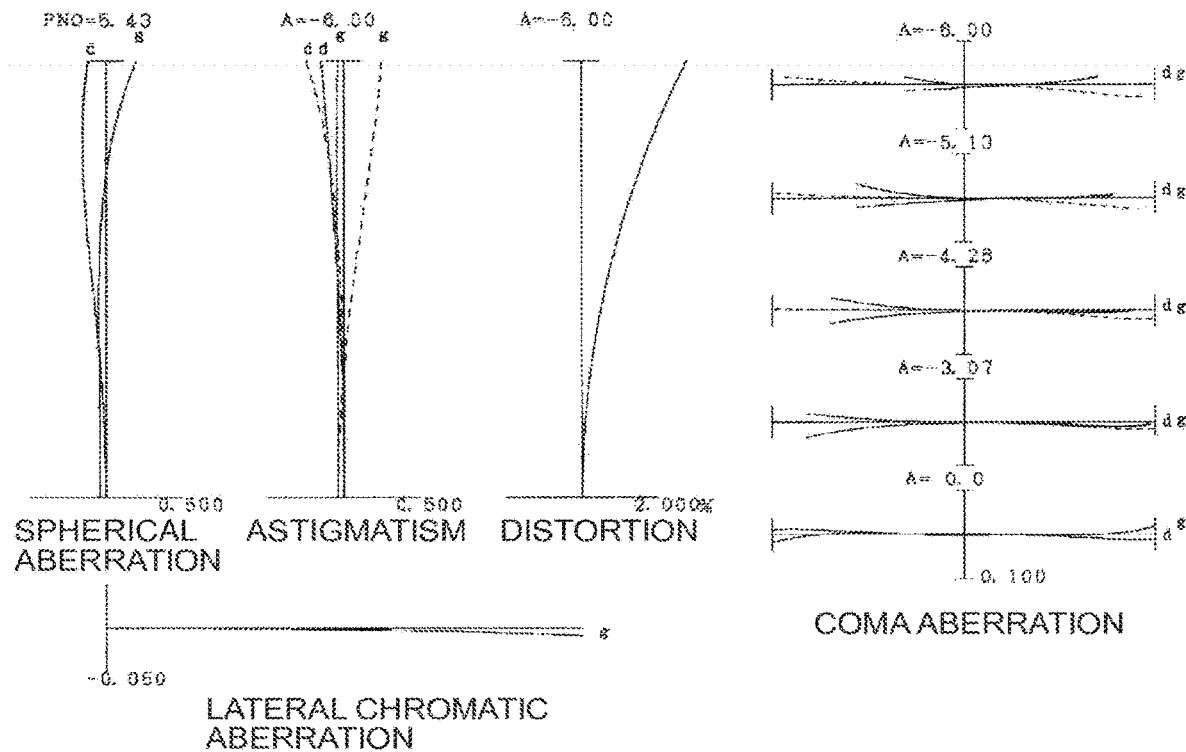
FIGS. 8A and 8B are sets of graphs showing various aberrations of the zooming optical system according to Example 2 in the intermediate focal length state, where FIG.
Figure 8B:
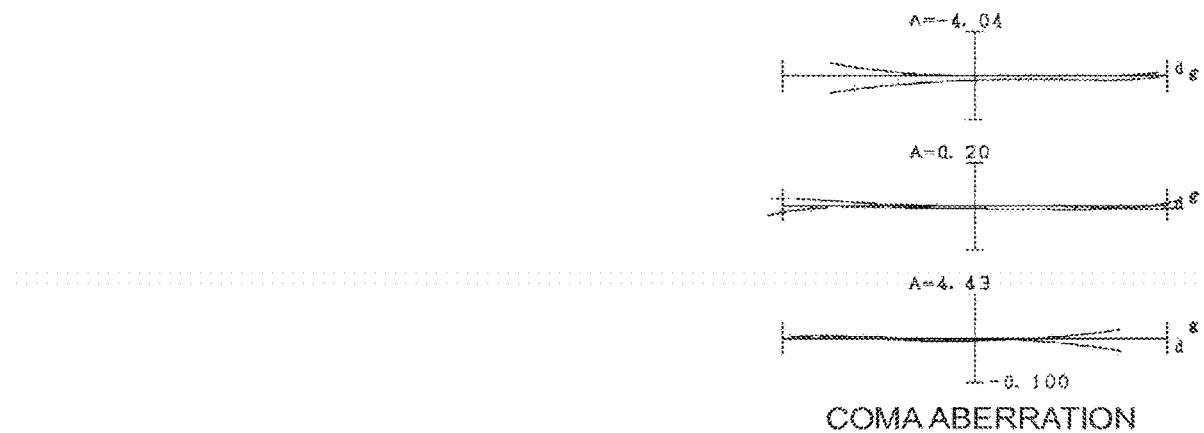
Figure 9A:
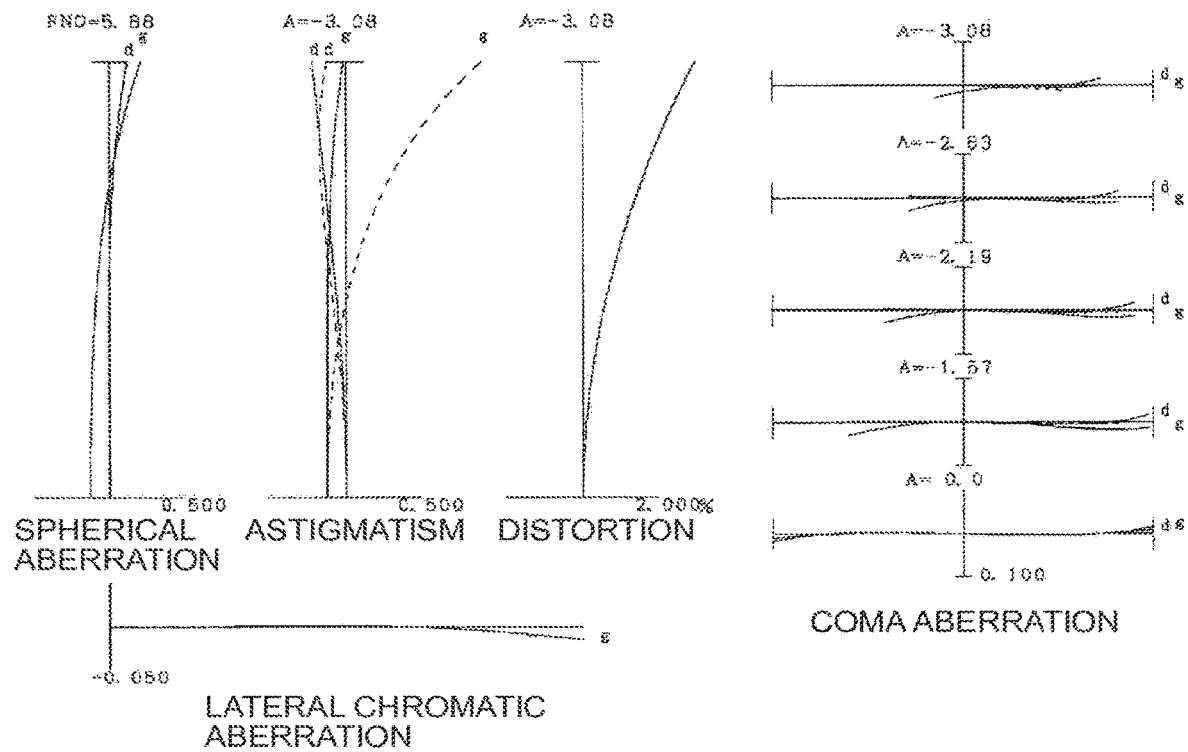
FIGS. 9A and 9B are sets of graphs showing various aberrations of the zooming optical system according to Example 2 in the telephoto end state, where
Figure 9B:
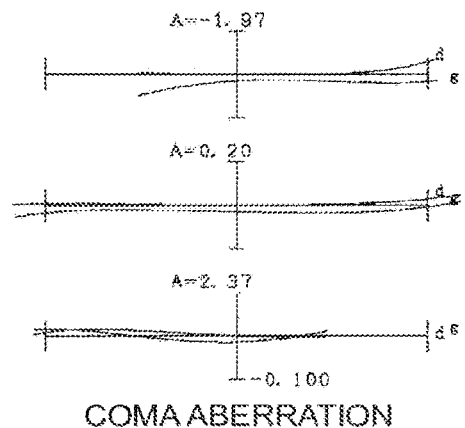

FIG. 7A is a set of graphs showing various aberrations of Example 2 upon focusing on infinity in the wide-angle end state, FIG. 8A is a set of graphs showing various aberrations of Example 2 upon focusing on infinity in the intermediate focal length state, and FIG. 9A is a set of graphs showing various aberrations of Example 2 upon focusing on infinity in the telephoto end state. FIG. 7B is a set of graphs showing coma aberration of Example 2 when image blur is corrected upon focusing on infinity in the wide-angle end state (shift amount of vibration-isolating lens group=−0.395), FIG. 8B is a set of graphs showing coma aberration of Example 2 when image blur is corrected upon focusing on infinity in the intermediate focal length state (shift amount of vibration-isolating lens group=−0.603), and FIG. 9B is a set of graphs showing coma aberration of Example 2 when image blur is corrected upon focusing on infinity in the telephoto end state (shift amount of vibration-isolating lens group=−0.772). As each graph showing aberrations clarifies, in Example 2, the zooming optical system has an excellent image forming performance, where various aberrations are corrected well in each focal length state from the wide-angle end state to the telephoto end state.

Example 3

Figure 10:
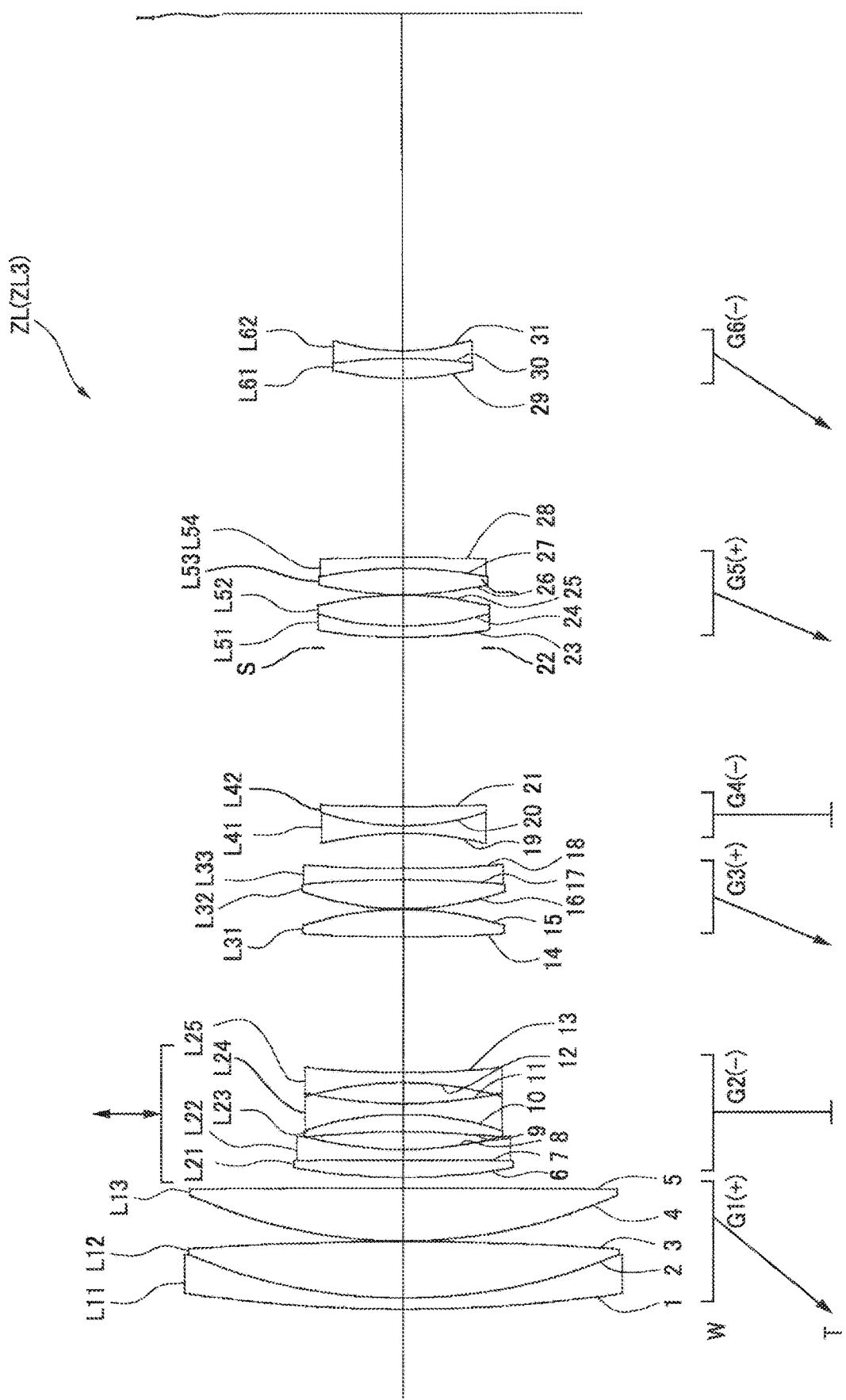
FIG. 10 is a cross-sectional view depicting a lens configuration of a zooming optical system according to Example 3.

FIG. 10 shows a configuration of a zooming optical system ZL3 according to Example 3. The zooming optical system ZL3 shown in FIG. 10 is constituted by, in order from the object: a first lens group G1 having positive refractive power; a second lens group G2 having negative refractive power; a third lens group G3 having positive refractive power; a fourth lens group G4 having negative refractive power; a fifth lens group G5 having positive refractive power; and a sixth lens group G6 having negative refractive power. The first lens group G1 includes, in order from the object: a cemented lens in which a negative meniscus lens L11 having a convex surface facing the object and a biconvex lens L12 are cemented; and a biconvex lens L13. The second lens group G2 includes, in order from the object: a cemented lens in which a biconvex lens L21 and a biconcave lens L22 are cemented; a cemented lens in which a positive meniscus lens L23 having a concave surface facing the object and a biconcave lens L24 are cemented; and a biconcave lens L25. The third lens group G3 includes, in order from the object: a biconvex lens L31; and a cemented lens in which a biconvex lens L32 and a biconcave lens L33 are cemented. The fourth lens group G4 includes a cemented lens in which a biconcave lens L41 and a positive meniscus lens L42 having a convex surface facing the object are cemented in order from the object. The fifth lens group G5 includes, in order from the object: a cemented lens in which a negative meniscus lens L51 having a convex surface facing the object and a biconvex lens L52 are cemented; and a cemented lens in which a biconvex lens L53 and a negative meniscus lens L54 having a concave surface facing the object are cemented. The sixth lens group G6 includes a cemented lens in which a biconvex lens L61 and a biconcave lens L62 are cemented in order from the object.

In the zooming optical system ZL3 according to Example 3, upon zooming from a wide-angle end state to a telephoto end state, the first lens group G1, the third lens group G3 and the fifth lens group G5 and the sixth lens group G6 move toward the object on the optical axis, and the second lens group G2 and the fourth lens group G4 are fixed in the optical axis direction with respect to the image plane I. The aperture stop S is disposed on the object side of the fifth lens group G5, and moves with the fifth lens group G5 upon zooming.

Focusing from infinity to an object at a short distance is performed by moving the third lens group G3 toward the image.

For image blur correction (vibration isolation), the entire second lens group G2 is designed to be a vibration-isolating lens group, and this vibration-isolating lens group is moved so as to include a component orthogonal to the optical axis. In the wide-angle end state of Example 3, the vibration-isolation coefficient is −1.972 and focal length is 72.0 (mm), hence the moving distance of the vibration-isolating lens group for correcting a 0.2° rotation blur is −0.127 (mm). In the intermediate focal length state of Example 3, the vibration-isolation coefficient is −3.534 and focal length is 200.0 (mm), hence the moving distance of the vibration-isolation lens group for correcting a 0.2° rotation blur is −0.198 (mm). In the telephoto end state of Example 3, the vibration-isolation coefficient is −5.379 and focal length is 390.0 (mm), hence the moving distance of the vibration-isolating lens group for correcting a 0.2° rotation blur is −0.253 (mm).

Table 7 shown below lists each data on Example 3. The surface numbers 1 to 31 in Table 7 correspond to numbers 1 to 31 in FIG. 10. [Focal Length of Lens Group] shows the first surface and the focal length of the first to sixth lens groups G1 to G6 respectively.

TABLE 7

| [General Data] | | |
| --- | --- | --- |
| β = 5.4 | | |

| | Wide-angle end state | Intermediate focal length state | Telephoto end state |
| --- | --- | --- | --- |
| f = | 72.0~ | 200.0~ | 390.0 |
| FNO = | 4.52~ | 5.34~ | 5.78 |
| 2ω = | 34.0~ | 12.1~ | 6.2 |
| Y = | 21.6~ | 21.6~ | 21.6 |
| TL = | 239.3~ | 285.8~ | 304.3 |

| [Lens Data] | | | | |
| --- | --- | --- | --- | --- |
| m | r | d | vd | nd |
| 1 | 235.129 | 2.000 | 40.7 | 1.88300 |
| 2 | 85.937 | 10.435 | 82.6 | 1.49782 |
| 3 | −492.987 | 0.100 | | |
| 4 | 81.734 | 9.789 | 82.6 | 1.49782 |
| 5 | −2477.191 | D1 | | |
| 6 | 94.480 | 3.279 | 28.7 | 1.79504 |
| 7 | −1045.056 | 2.000 | 67.9 | 1.59319 |
| 8 | 57.468 | 3.373 | | |
| 9 | −137.861 | 3.251 | 28.7 | 1.79504 |
| 10 | −48.070 | 2.000 | 67.9 | 1.59319 |
| 11 | 69.776 | 3.889 | | |
| 12 | −56.313 | 1.800 | 49.6 | 1.77250 |
| 13 | 135.256 | D2 | | |
| 14 | 220.803 | 5.100 | 67.9 | 1.59319 |
| 15 | −51.295 | 0.100 | | |
| 16 | 48.045 | 5.380 | 67.9 | 1.59319 |
| 17 | −156.768 | 2.000 | 31.3 | 1.90366 |
| 18 | 209.257 | D3 | | |
| 19 | −51.770 | 1.500 | 54.6 | 1.72916 |
| 20 | 41.489 | 3.613 | 34.9 | 1.80100 |
| 21 | 331.492 | D4 | | |
| 22 | 0.000 | 2.000 | Aperture stop S | |
| 23 | 86.564 | 2.000 | 40.7 | 1.88300 |
| 24 | 47.702 | 5.771 | 52.2 | 1.51742 |
| 25 | −52.610 | 0.100 | | |
| 26 | 60.874 | 4.753 | 82.6 | 1.49782 |
| 27 | −65.980 | 2.000 | 23.8 | 1.84666 |
| 28 | −423.943 | D5 | | |

TABLE 7-continued

[General Data]
β = 5.4

| | | | | |
|---|---|---|---|---|
| 29 | 43.795 | 3.743 | 27.6 | 1.75520 |
| 30 | −80.630 | 1.500 | 40.7 | 1.88300 |
| 31 | 36.787 | BF | | |

[Focal Length of Lens Group]

| Lens group | First surface | Focal length |
|---|---|---|
| First lens group | 1 | 151.723 |
| Second lens group | 6 | −31.512 |
| Third lens group | 14 | 48.052 |
| Fourth lens group | 19 | −67.397 |
| Fifth lens group | 23 | 58.111 |
| Sixth lens group | 29 | −140.788 |

In Example 3, the axial air distance D1 between the first lens group G1 and the second lens group G2, the axial air distance D2 between the second lens group G2 and the third lens group G3, the axial air distance D3 between the third lens group G3 and the fourth lens group G4, the axial air distance D4 between the fourth lens group G4 and the aperture stop S which moves together with the fifth lens group G5, the axial air distance D5 between the fifth lens group G5 and the sixth lens group G6 and the back focus BF change upon zooming. Table 8 shows the values of the variable distances D1 to D5 and the back focus BF at each focal length in the wide-angle end state, the intermediate focal length state and the telephoto end state upon focusing on infinity.

TABLE 8

[Variable Distance Data]

| | Wide-angle end state | Intermediate focal length state | Telephoto end state |
|---|---|---|---|
| f | 72.0~ | 200.0~ | 390.0 |
| D1 | 2.000~ | 48.459~ | 67.000 |
| D2 | 25.107~ | 13.069~ | 2.000 |
| D3 | 6.466~ | 18.504~ | 29.573 |
| D4 | 29.312~ | 12.120~ | 2.428 |
| D5 | 32.947~ | 32.202~ | 30.353 |
| BF | 55.1~ | 73.0~ | 84.5 |

Table 9 shows a value corresponding to each conditional expression according to Example 3.

TABLE 9

| (1) | f1/(−f2) = 4.81 |
|---|---|
| (2) | f1/f3 = 3.16 |
| (3) | f3/(−f4) = 0.71 |
| (4) | (−f4)/f5 = 1.16 |
| (5) | f1/(−f2) = 4.81 |
| (6) | f3/f5 = 0.83 |
| (7) | f1/(−f4) = 2.25 |
| (8) | f2/f4 = 0.47 |
| (9) | ft/(−f2) = 12.4 |
| (10) | ft/(−f4) = 5.8 |
| (11) | (−f4)/f5 = 1.2 |
| (12) | (−f2)/f5 = 0.5 |
| (13) | f1/(−f2) = 4.8 |
| (14) | f1/(−f4) = 2.3 |
| (15) | f1/f5 = 2.6 |
| (16) | (−f4)/f5 = 1.2 |
| (17) | (−f2)/f5 = 0.5 |
| (18) | f1/(−f2) = 4.81 |
| (19) | (−f4)/f5 = 1.16 |

TABLE 9-continued

| (20) | f1/(−f4) = 2.25 |
|---|---|
| (21) | (−f2)/f3 = 0.66 |
| (22) | (−f4)/f5 = 1.16 |
| (23) | f3/(−f4) = 0.71 |
| (24) | f1/(−f2) = 4.81 |
| (25) | f1/f3 = 3.16 |
| (26) | f3/(−f4) = 0.71 |
| (27) | (−f4)/f5 = 1.16 |

As a result, the zooming optical system ZL3 of Example 3 satisfies all the conditional expressions (1) to (27).

Figure 11A:
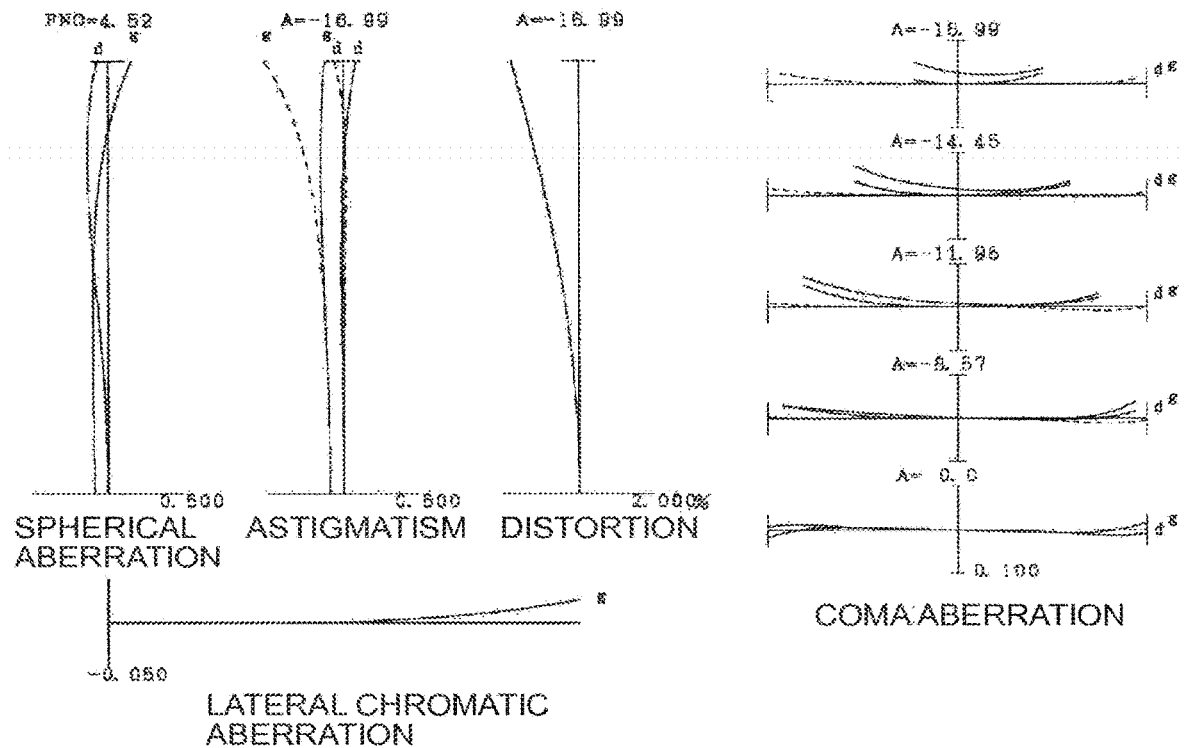
FIGS. 11A and 11B are sets of graphs showing various aberrations of the zooming optical system according to Example 3 in the wide-angle end state, where
Figure 11B:
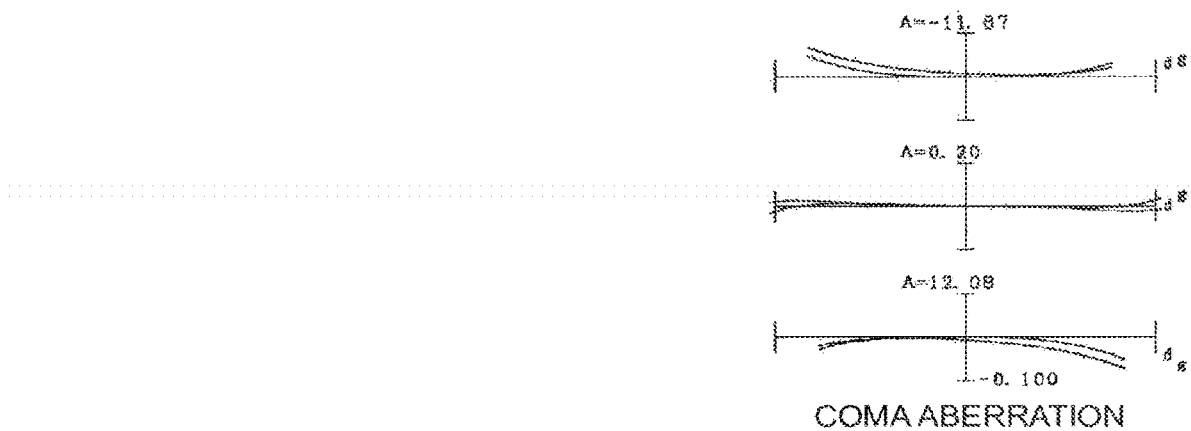
Figure 12A:
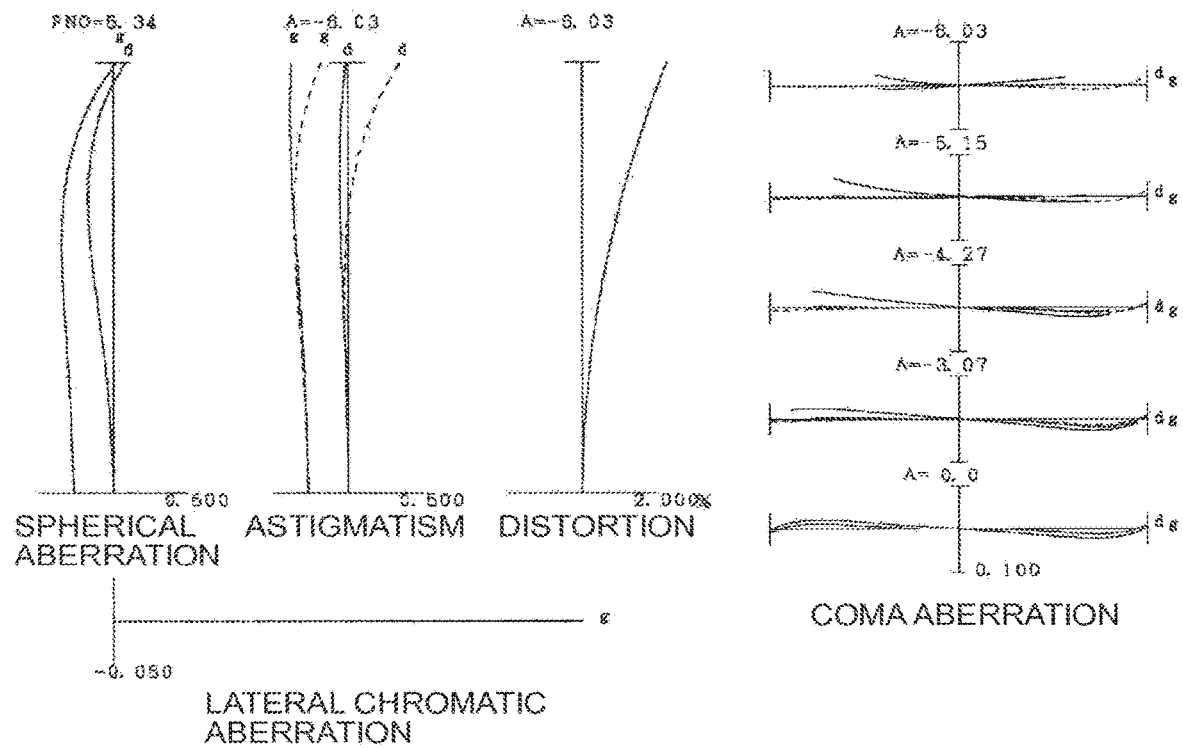
FIGS. 12A and 12B are sets of graphs showing various aberrations of the zooming optical system according to Example 3 in the intermediate focal length state, where
Figure 12B:
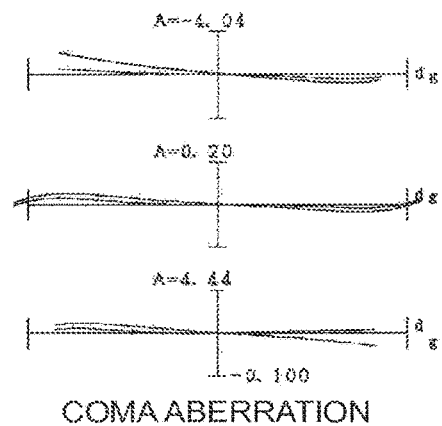
Figure 13A:
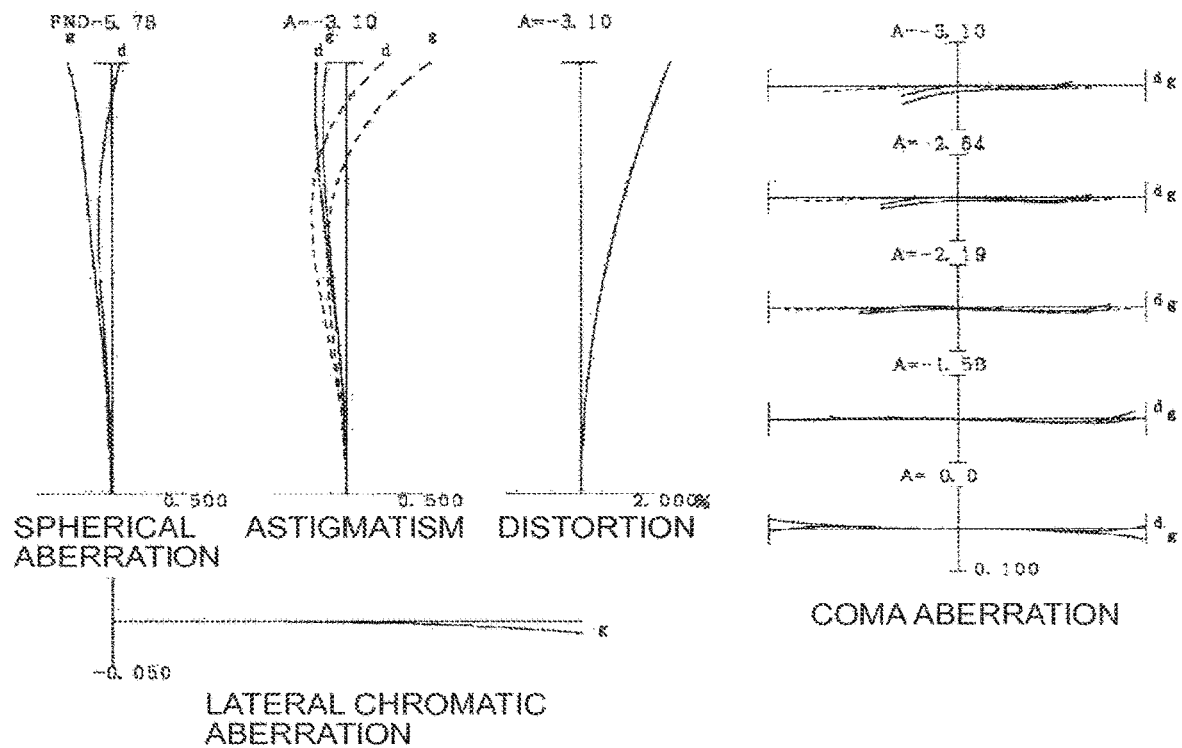
FIGS. 13A and 13B are sets of graphs showing various aberrations of the zooming optical system according to Example 3 in the telephoto end state, where
Figure 13B:
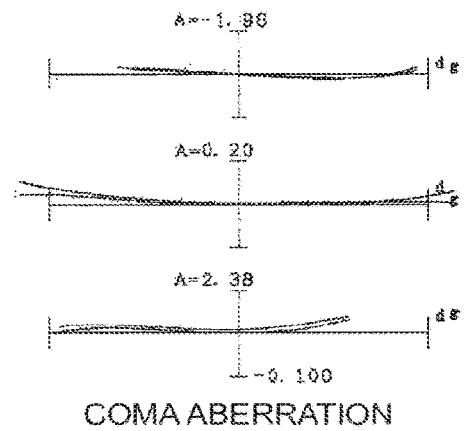

FIG. 11A is a set of graphs showing various aberrations of Example 3 upon focusing on infinity in the wide-angle end state, FIG. 12A is a set of graphs showing various aberrations of Example 3 upon focusing on infinity in the intermediate focal length state, and FIG. 13A is a set of graphs showing various aberrations of Example 3 upon focusing on infinity in the telephoto end state. FIG. 11B is a set of graphs showing coma aberration of Example 3 when image blur is corrected upon focusing on infinity in the wide-angle end state (shift amount of vibration-isolating lens group=−0.127), FIG. 12B is a set of graphs showing coma aberration of Example 3 when image blur is corrected upon focusing on infinity in the intermediate focal length state (shift amount of vibration-isolating lens group=−0.198), and FIG. 13B is a set of graphs showing coma aberration of Example 3 when image blur is corrected upon focusing on infinity in the telephoto end state (shift amount of vibration-isolating lens group=−0.253). As each graph showing aberrations clarifies, in Example 3, the zooming optical system has an excellent image forming performance, where various aberrations are corrected well in each focal length state from the wide-angle end state to the telephoto end state.

Example 4

Figure 14:
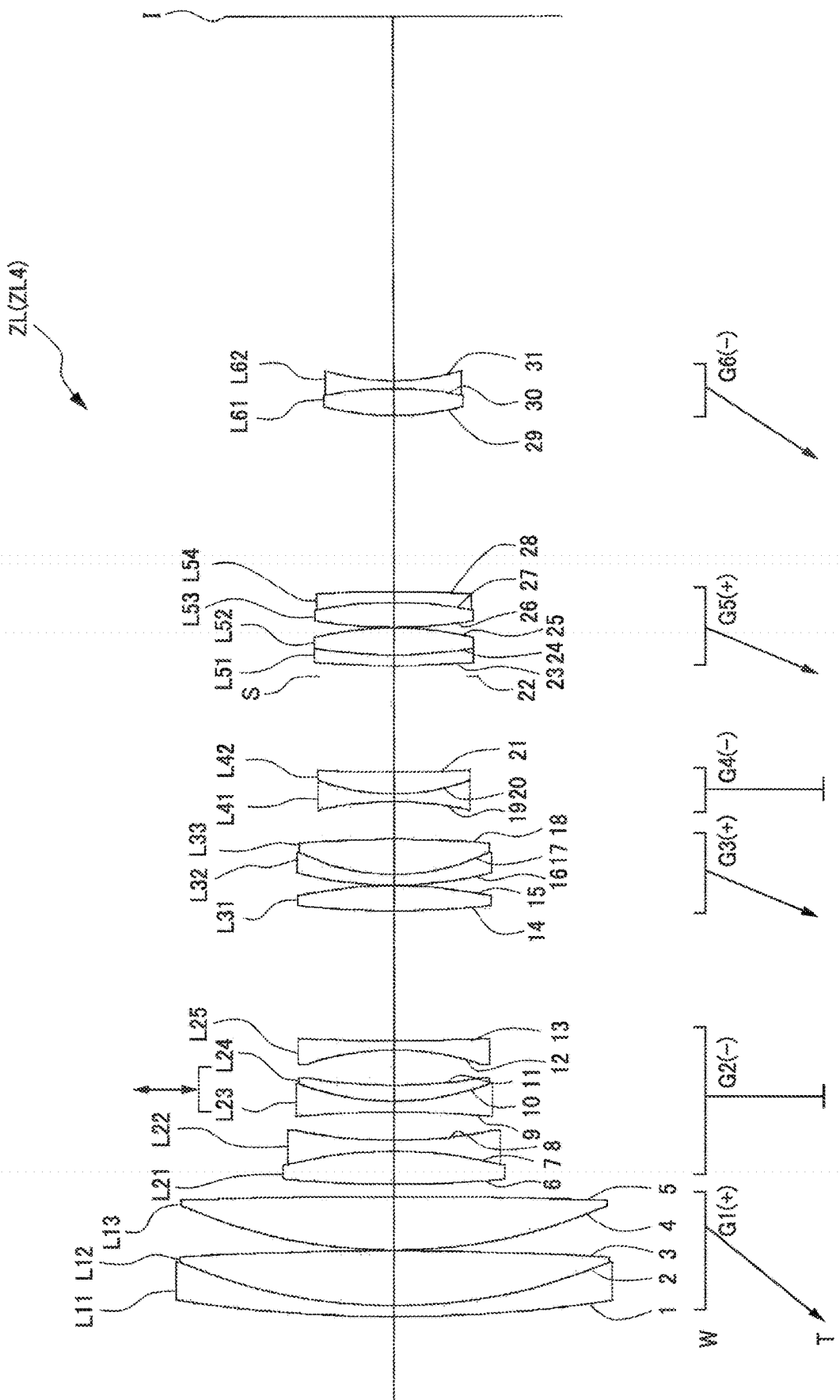
FIG. 14 is a cross-sectional view depicting a lens configuration of a zooming optical system according to Example 4.

FIG. 14 shows a configuration of a zooming optical system ZL4 according to Example 4. The zooming optical system ZL4 shown in FIG. 14 is constituted by, in order from the object: a first lens group G1 having positive refractive power; a second lens group G2 having negative refractive power; a third lens group G3 having positive refractive power; a fourth lens group G4 having negative refractive power; a fifth lens group G5 having positive refractive power; and a sixth lens group G6 having negative refractive power. The first lens group G1 includes, in order from the object: a cemented lens in which a negative meniscus lens L11 having a convex surface facing the object and a biconvex lens L12 are cemented; and a biconvex lens L13. The second lens group G2 includes, in order from the object: a cemented lens in which a biconvex lens L21 and a biconcave lens L22 are cemented; a cemented lens in which a biconcave lens L23 and a positive meniscus lens L24 having a convex surface facing the object are cemented; and a biconcave lens L25. The third lens group G3 includes, in order from the object: a biconvex lens L31; and a cemented lens in which a negative meniscus lens L32 having a convex surface facing the object and a biconvex lens L33 are cemented. The fourth lens group G4 includes a cemented lens in which a biconcave lens L41 and a positive meniscus lens L42 having a convex surface facing the object are cemented in order from the object. The fifth lens group G5 includes, in order from the object: a cemented lens in which a negative meniscus lens L51 having a convex surface facing the object and a biconvex lens L52 are cemented; and a cemented lens in which a biconvex lens L53 and a negative meniscus lens L54 having a concave surface facing the object are cemented. The sixth lens group G6 includes a cemented lens in which a biconvex lens L61 and a biconcave lens L62 are cemented in order from the object.

In the zooming optical system ZL4 according to Example 4, upon zooming from a wide-angle end state to a telephoto end state, the first lens group G1, the third lens group G3, the fifth lens group G5 and the sixth lens group G6 move toward the object on the optical axis, and the second lens group G2 and the fourth lens group G4 are fixed in the optical axis direction with respect to the image plane I. The aperture stop S is disposed on the object side of the fifth lens group G5, and moves with the fifth lens group G5 upon zooming.

Focusing from infinity to an object at a short distance is performed by moving the third lens group G3 toward the image.

For image blur correction (vibration isolation), the cemented lens (in which the biconcave lens L23 and the positive meniscus lens L24 having a convex surface facing the object are cemented) of the second lens group G2 is designed to be a vibration-isolating lens group, and this vibration-isolating lens group is moved so as to include a component orthogonal to the optical axis. In the wide-angle end state of Example 4, the vibration-isolation coefficient is −0.888 and focal length is 82.0 (mm), hence the moving distance of the vibration-isolating lens group for correcting a 0.2° rotation blur is −0.322 (mm). In the intermediate focal length state of Example 4, the vibration-isolation coefficient is −1.454 and focal length is 200.0 (mm), hence the moving distance of the vibration-isolation lens group for correcting a 0.2° rotation blur is −0.480 (mm). In the telephoto end state of Example 4, the vibration-isolation coefficient is −2.176 and focal length is 390.0 (mm), hence the moving distance of the vibration-isolating lens group for correcting a 0.2° rotation blur is −0.626 (mm).

Table 10 shown below lists each data on Example 4. The surface numbers 1 to 31 in Table 10 correspond to numbers 1 to 31 in FIG. 14. [Focal Length of Lens Group] shows the first surface and the focal length of the first to sixth lens groups G1 to G6 respectively.

TABLE 10

[General Data]
β = 4.8

|  | Wide-angle end state | Intermediate focal length state | Telephoto end state |
|---|---|---|---|
| f = | 82.0~ | 200.0~ | 390.0 |
| FNO = | 5.05~ | 5.61~ | 5.82 |
| 2ω = | 29.7~ | 12.0~ | 6.2 |
| Y = | 21.6~ | 21.6~ | 21.6 |
| TL = | 241.3~ | 283.3~ | 303.3 |

[Lens Data]

| m | r | d | vd | nd |
|---|---|---|---|---|
| 1 | 227.795 | 2.000 | 40.7 | 1.88300 |
| 2 | 84.747 | 10.413 | 82.6 | 1.49782 |
| 3 | −538.594 | 0.100 |  |  |
| 4 | 82.998 | 9.958 | 82.6 | 1.49782 |
| 5 | −1048.042 | D1 |  |  |
| 6 | 170.969 | 6.158 | 34.9 | 1.80100 |
| 7 | −66.891 | 2.000 | 65.4 | 1.60300 |
| 8 | 82.527 | 5.163 |  |  |
| 9 | −168.234 | 2.000 | 47.4 | 1.78800 |
| 10 | 41.763 | 3.001 | 23.8 | 1.84666 |
| 11 | 88.369 | 6.493 |  |  |
| 12 | −43.051 | 1.800 | 46.6 | 1.81600 |

TABLE 10-continued

[General Data]
β = 4.8

| 13 | 411.913 | D2 |  |  |
| 14 | 137.043 | 4.617 | 63.3 | 1.61800 |
| 15 | −72.111 | 0.100 |  |  |
| 16 | 62.009 | 2.000 | 31.3 | 1.90366 |
| 17 | 34.150 | 6.473 | 63.3 | 1.61800 |
| 18 | −167.969 | D3 |  |  |
| 19 | −50.276 | 1.500 | 50.3 | 1.71999 |
| 20 | 34.293 | 4.000 | 28.7 | 1.79504 |
| 21 | 221.433 | D4 |  |  |
| 22 | 0.000 | 2.000 | Aperture stop S |  |
| 23 | 178.755 | 2.000 | 23.8 | 1.84666 |
| 24 | 75.314 | 5.063 | 63.9 | 1.51680 |
| 25 | −50.146 | 0.107 |  |  |
| 26 | 72.928 | 4.620 | 58.8 | 1.51823 |
| 27 | −62.568 | 2.000 | 23.8 | 1.84666 |
| 28 | −197.918 | D5 |  |  |
| 29 | 42.990 | 4.937 | 29.6 | 1.71736 |
| 30 | −55.338 | 1.500 | 42.7 | 1.83481 |
| 31 | 37.334 | BF |  |  |

[Focal Length of Lens Group]

| Lens group | First surface | Focal length |
|---|---|---|
| First lens group | 1 | 148.584 |
| Second lens group | 6 | −29.113 |
| Third lens group | 14 | 44.313 |
| Fourth lens group | 19 | −63.143 |
| Fifth lens group | 23 | 59.877 |
| Sixth lens group | 29 | −157.384 |

In Example 4, the axial air distance D1 between the first lens group G1 and the second lens group G2, the axial air distance D2 between the second lens group G2 and the third lens group G3, the axial air distance D3 between the third lens group G3 and the fourth lens group G4, the axial air distance D4 between the fourth lens group G4 and the aperture stop S which moves together with the fifth lens group G5, the axial air distance D5 between the fifth lens group G5 and the sixth lens group G6 and the back focus BF change upon zooming. Table 11 shows the values of the variable distances D1 to D5 and the back focus BF at each focal length in the wide-angle end state, the intermediate focal length state and the telephoto end state upon focusing on infinity.

TABLE 11

[Variable Distance Data]

|  | Wide-angle end state | Intermediate focal length state | Telephoto end state |
|---|---|---|---|
| f | 82.0~ | 200.0 | 390.0 |
| D1 | 2.299~ | 44.305 | 64.299 |
| D2 | 24.152~ | 13.739 | 2.000 |
| D3 | 7.126~ | 17.538 | 29.278 |
| D4 | 17.672~ | 6.713 | 2.399 |
| D5 | 32.546~ | 31.055 | 23.798 |
| BF | 58.1~ | 70.5 | 82.1 |

Table 12 shows a value corresponding to each conditional expression according to Example 4.

TABLE 12

| (1) | f1/(−f2) = 5.10 |
| (2) | f1/f3 = 3.35 |
| (3) | f3/(−f4) = 0.70 |

TABLE 12-continued

| | |
|---|---|
| (4) | (−f4)/f5 = 1.05 |
| (5) | f1/(−f2) = 5.10 |
| (6) | f3/f5 = 0.74 |
| (7) | f1/(−f4) = 2.35 |
| (8) | f2/f4 = 0.46 |
| (9) | ft/(−f2) = 13.4 |
| (10) | ft/(−f4) = 6.2 |
| (11) | (−f4)/f5 = 1.1 |
| (12) | (−f2)/f5 = 0.5 |
| (13) | f1/(−f2) = 5.1 |
| (14) | f1/(−f4) = 2.4 |
| (15) | f1/f5 = 2.5 |
| (16) | (−f4)/f5 = 1.1 |
| (17) | (−f2)/f5 = 0.5 |
| (18) | f1/(−f2) = 5.10 |
| (19) | (−f4)/f5 = 1.05 |
| (20) | f1/(−f4) = 2.35 |
| (21) | (−f2)/f3 = 0.66 |
| (22) | (−f4)/f5 = 1.05 |
| (23) | f3/(−f4) = 0.70 |
| (24) | f1/(−f2) = 5.10 |
| (25) | f1/f3 = 3.35 |
| (26) | f3/(−f4) = 0.70 |
| (27) | (−f4)/f5 = 1.05 |

As a result, the zooming optical system ZL4 of Example 4 satisfies all the conditional expressions (1) to (27).

Figure 15A:
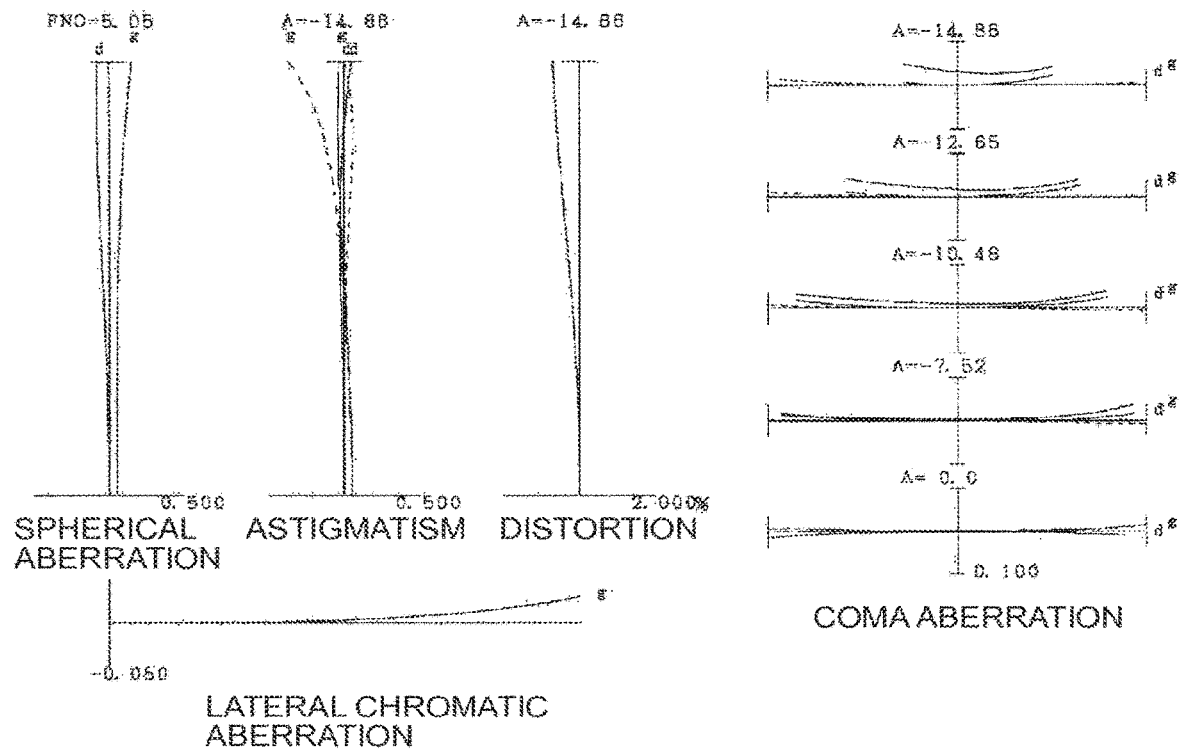
FIGS. 15A and 15B are sets of graphs showing various aberrations of the zooming optical system according to Example 4 in the wide-angle end state, where
Figure 15B:
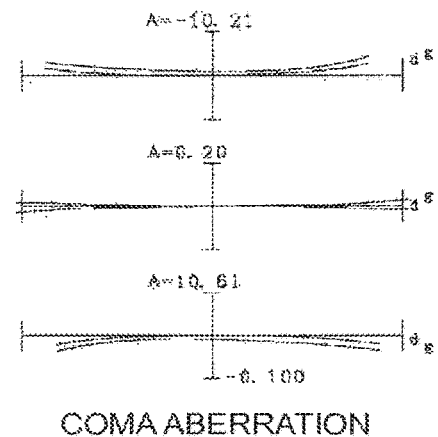
Figure 16A:
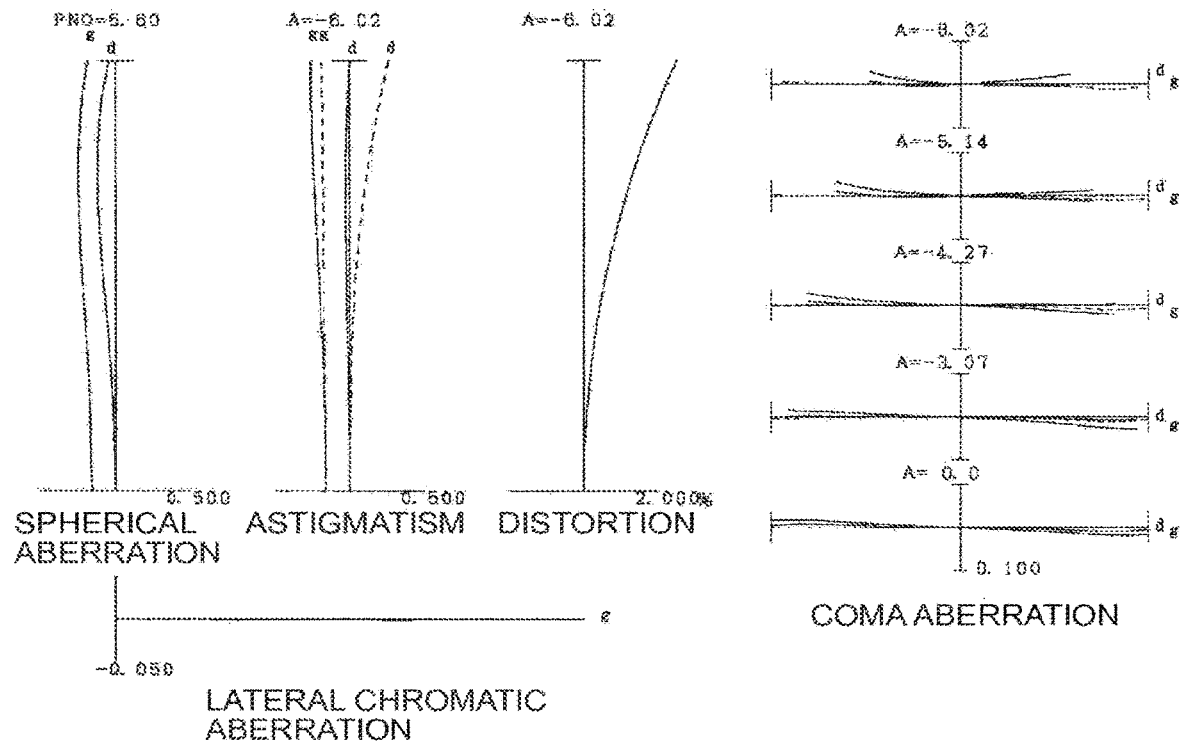
FIGS. 16A and 16B are sets of graphs showing various aberrations of the zooming optical system according to Example 4 in the intermediate focal length state, where
Figure 16B:
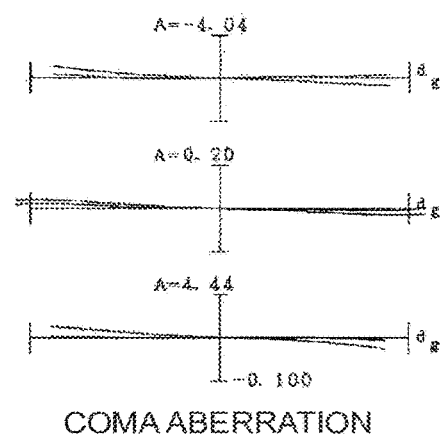
Figure 17A:
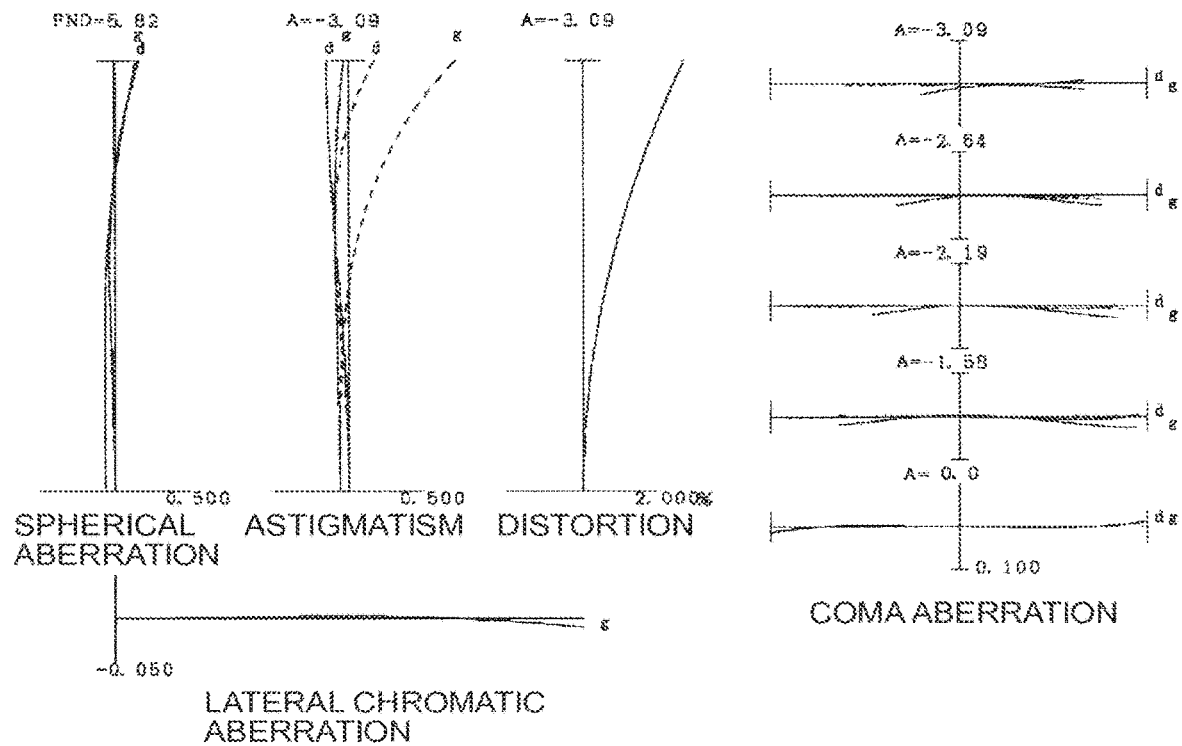
FIGS. 17A and 17B are sets of graphs showing various aberrations of the zooming optical system according to Example 4 in the telephoto end state, where
Figure 17B:
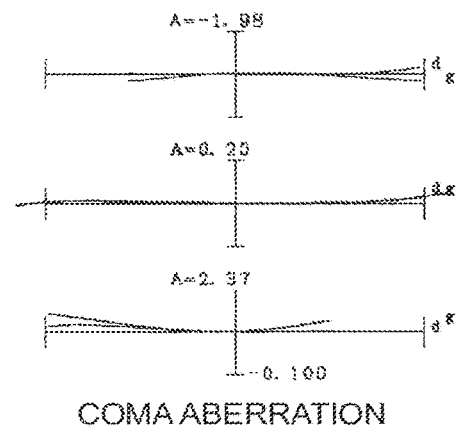

FIG. 15A is a set of graphs showing various aberrations of Example 4 upon focusing on infinity in the wide-angle end state, FIG. 16A is a set of graphs showing various aberrations of Example 4 upon focusing on infinity in the intermediate focal length state, and FIG. 17A is a set of graphs showing various aberrations of Example 4 upon focusing on infinity in the telephoto end state. FIG. 15B is a set of graphs showing coma aberration of Example 3 when image blur is corrected upon focusing on infinity in the wide-angle end state (shift amount of vibration-isolating lens group=−0.322), FIG. 16B is a set of graphs showing coma aberration when image blur is corrected upon focusing on infinity in the intermediate focal length state (shift amount of vibration-isolating lens group=−0.480), and FIG. 17B is a set of graphs showing coma aberration when image blur is corrected upon focusing on infinity in the telephoto end state (shift amount of vibration-isolating lens group=−0.626). As each graph showing aberrations clarifies, in Example 4, the zooming optical system has an excellent image forming performance, where various aberrations are corrected well in each focal length state from the wide-angle end state to the telephoto end state.

Example 5

Figure 18:
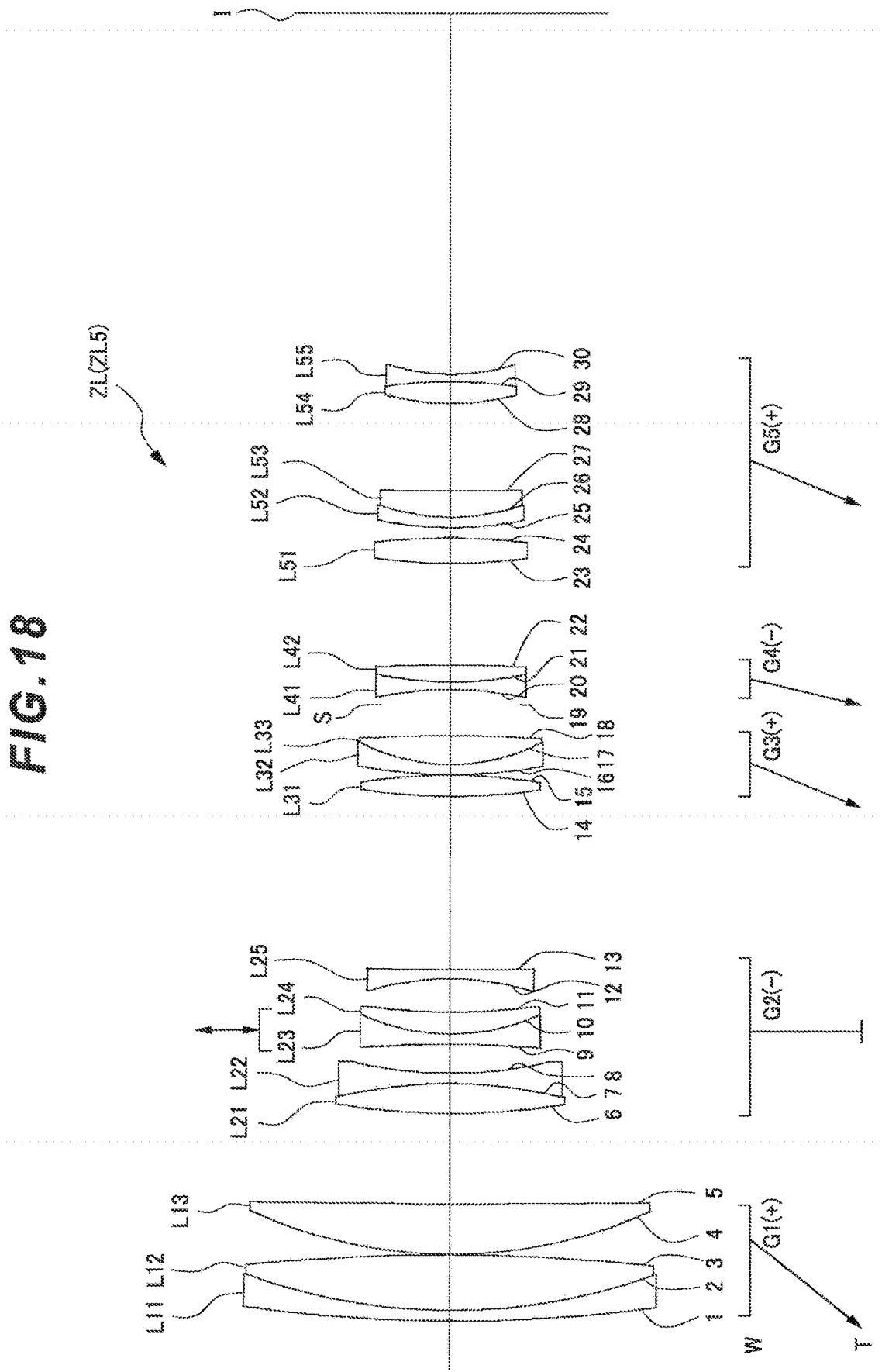
FIG. 18 is a cross-sectional view depicting a lens configuration of a zooming optical system according to Example 5.

FIG. 18 shows a configuration of a zooming optical system ZL5 according to Example 5. The zooming optical system ZL5 shown in FIG. 18 is constituted by, in order from the object: a first lens group G1 having positive refractive power; a second lens group G2 having negative refractive power; a third lens group G3 having positive refractive power; a fourth lens group G4 having negative refractive power; and a fifth lens group G5 having positive refractive power. The first lens group G1 includes, in order from the object: a cemented lens in which a negative meniscus lens L11 having a convex surface facing the object and a biconvex lens L12 are cemented; and a positive meniscus lens L13 having a convex surface facing the object. The second lens group G2 includes, in order from the object: a cemented lens in which a biconvex lens L21 and a biconcave lens L22 are cemented; a cemented lens in which a biconcave lens L23 and a positive meniscus lens L24 having a convex surface facing the object are cemented; and a biconcave lens L25. The third lens group G3 includes, in order from the object: a biconvex lens L31; and a cemented lens in which a negative meniscus lens L32 having a convex surface facing the object and a biconvex lens L33 are cemented. The fourth lens group G4 includes a cemented lens in which a biconcave lens L41 and a biconvex lens L42 are cemented in order from the object. The fifth lens group G5 includes, in order from the object: a biconvex lens L51, a cemented lens in which a negative meniscus lens L52 having a convex surface facing the object and a positive meniscus lens L53 having a convex surface facing the object are cemented; and a cemented lens in which a biconvex lens L54 and a biconcave lens L55 are cemented.

In the zooming optical system ZL5 according to Example 5, upon zooming from a wide-angle end state to a telephoto end state, the first lens group G1, the third lens group G3, the fourth lens group G4 and the fifth lens group G5 move toward the object on the optical axis, and the second lens group G2 is fixed in the optical axis direction with respect to the image plane I. The aperture stop S is disposed on the object side of the fourth lens group G4, and moves with the fourth lens group G4 upon zooming.

Focusing from infinity to an object at a short distance is performed by moving the third lens group G3 toward the image.

For image blur correction (vibration isolation), the cemented lens (in which the biconcave lens L23 and the positive meniscus lens L24 having a convex surface facing the object are cemented) of the second lens group G2 is designed to be a vibration-isolating lens group, and this vibration-isolating lens group is moved so as to include a component orthogonal to the optical axis. In the wide-angle end state of Example 5, the vibration-isolation coefficient is −0.858 and focal length is 103.0 (mm), hence the moving distance of the vibration-isolating lens group for correcting a 0.2° rotation blur is −0.419 (mm). In the intermediate focal length state of Example 4, the vibration-isolation coefficient is −1.297 and focal length is 200.0 (mm), hence the moving distance of the vibration-isolating lens group for correcting a 0.2° rotation blur is −0.538 (mm). In the telephoto end state of Example 4, the vibration-isolation coefficient is −1.987 and focal length is 388.0 (mm), hence the moving distance of the vibration-isolating lens group for correcting a 0.2° rotation blur is −0.682 (mm).

Table 13 shown below lists each data on Example 5. The surface numbers 1 to 30 in Table 13 correspond to numbers 1 to 30 in FIG. 18. [Focal Length of Lens Group] shows the first surface and the focal length of the first to fifth lens groups G1 to G5 respectively.

TABLE 13

| [General Data] | | | |
|---|---|---|---|
| β = 3.8 | | | |
| | Wide-angle end state | Intermediate focal length state | Telephoto end state |
|---|---|---|---|
| f = | 103.0~ | 200.0~ | 388.0 |
| ENO = | 4.84~ | 5.30~ | 5.86 |
| 2ω = | 23.4~ | 12.0~ | 6.2 |
| Y = | 21.6~ | 21.6~ | 21.6 |
| TL = | 257.1~ | 280.3~ | 297.4 |

TABLE 13-continued

[General Data]
β = 3.8

[Lens Data]

| m | r | d | vd | nd |
|---|---|---|---|---|
| 1 | 257.902 | 2.000 | 35.7 | 1.90265 |
| 2 | 97.659 | 11.000 | 82.6 | 1.49782 |
| 3 | −314.680 | 0.100 | | |
| 4 | 79.130 | 10.000 | 82.6 | 1.49782 |
| 5 | 2088.342 | D1 | | |
| 6 | 123.691 | 5.763 | 33.3 | 1.80610 |
| 7 | −77.164 | 2.000 | 65.4 | 1.60300 |
| 8 | 69.162 | 5.674 | | |
| 9 | −187.746 | 2.000 | 42.7 | 1.83481 |
| 10 | 35.095 | 4.370 | 23.8 | 1.84666 |
| 11 | 112.202 | 6.514 | | |
| 12 | −44.561 | 1.800 | 42.7 | 1.83481 |
| 13 | 581.099 | D2 | | |
| 14 | 97.574 | 4.250 | 60.3 | 1.62041 |
| 15 | −88.827 | 0.100 | | |
| 16 | 84.452 | 2.000 | 31.3 | 1.90366 |
| 17 | 32.485 | 5.655 | 60.3 | 1.62041 |
| 18 | −240.662 | D3 | | |
| 19 | 0.000 | 3.000 | Aperture stop S | |
| 20 | −57.650 | 1.500 | 50.3 | 1.71999 |
| 21 | 62.520 | 3.298 | 42.7 | 1.83481 |
| 22 | −209.983 | D4 | | |
| 23 | 91.072 | 5.000 | 70.3 | 1.48749 |
| 24 | −99.387 | 2.087 | | |
| 25 | 62.240 | 2.000 | 32.4 | 1.85026 |
| 26 | 35.334 | 5.183 | 82.6 | 1.49782 |
| 27 | 602.097 | 17.041 | | |
| 28 | 42.594 | 4.263 | 27.6 | 1.75520 |
| 29 | −76.745 | 1.500 | 40.7 | 1.88300 |
| 30 | 33.248 | BF | | |

[Focal Length of Lens Group]

| Lens group | First surface | Focal length |
|---|---|---|
| First lens group | 1 | 142.392 |
| Second lens group | 6 | −31.449 |
| Third lens group | 14 | 56.441 |
| Fourth lens group | 20 | −152.964 |
| Fifth lens group | 23 | 117.618 |

In Example 5, the axial air distance D1 between the first lens group G1 and the second lens group G2, the axial air distance D2 between the second lens group G2 and the third lens group G3, the axial air distance D3 between the third lens group G3 and the aperture stop S which moves together with the fourth lens group G4, the axial air distance D4 between the fourth lens group G4 and the fifth lens group G5, and the back focus BF change upon zooming. Table 14 shows the values of the variable distances D1 to D4 and the back focus BF at each focal length in the wide-angle end state, the intermediate focal length state and the telephoto end state upon focusing on infinity.

TABLE 14

[Variable Distance Data]

| | Wide-angle end state | Intermediate focal length state | Telephoto end state |
|---|---|---|---|
| f | 103.0~ | 200.0~ | 388.0 |
| D1 | 17.898~ | 41.055~ | 58.209 |
| D2 | 34.045~ | 20.108~ | 2.000 |
| D3 | 6.078~ | 21.988~ | 29.609 |
| D4 | 20.042~ | 8.963~ | 8.026 |
| BF | 71.0~ | 80.1~ | 91.5 |

Table 15 shows a value corresponding to each conditional expression according to Example 5.

TABLE 15

| (1) | f1/(−f2) = 4.53 |
|---|---|
| (2) | f1/f3 = 2.52 |
| (3) | f3/(−f4) = 0.37 |
| (4) | (−f4)/f5 = 1.30 |
| (5) | f1/(−f2) = 4.53 |
| (6) | f3/f5 = 0.48 |
| (7) | f1/(−f4) = 0.93 |
| (8) | f2/f4 = 0.21 |
| (24) | f1/(−f2) = 4.53 |
| (25) | f1/f3 = 2.52 |
| (26) | f3/(−f4) = 0.37 |
| (27) | (−f4)/f5 = 1.30 |

As a result, the zooming optical system ZL5 of Example 5 satisfies all the conditional expressions (1) to (8) and (24) to (27).

Figure 19A:
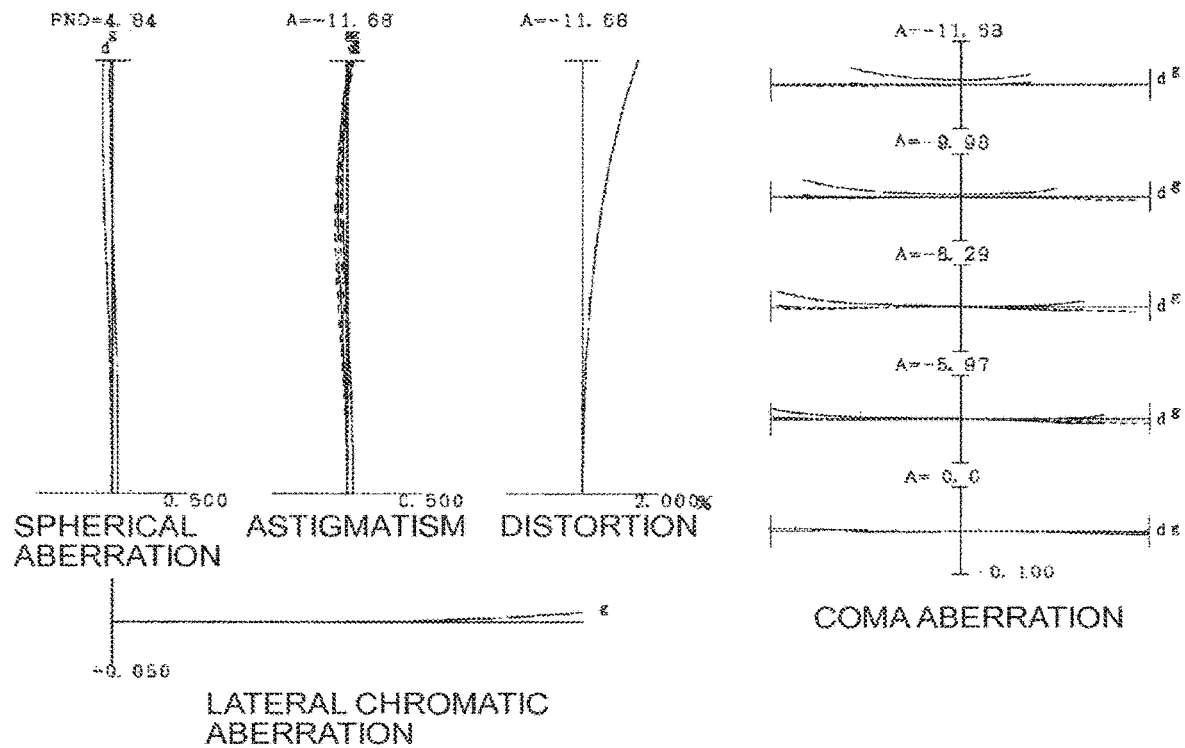
FIGS. 19A and 19B are sets of graphs showing various aberrations of the zooming optical system according to Example 5 in the wide-angle end state, where
Figure 19B:
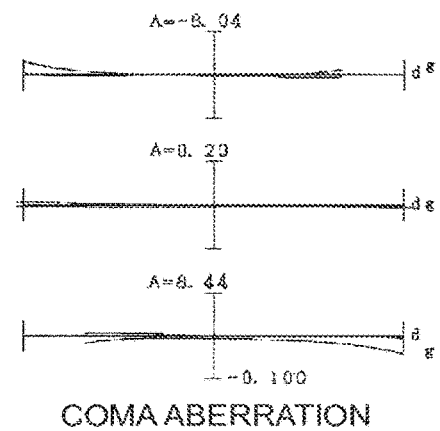
Figure 20A:
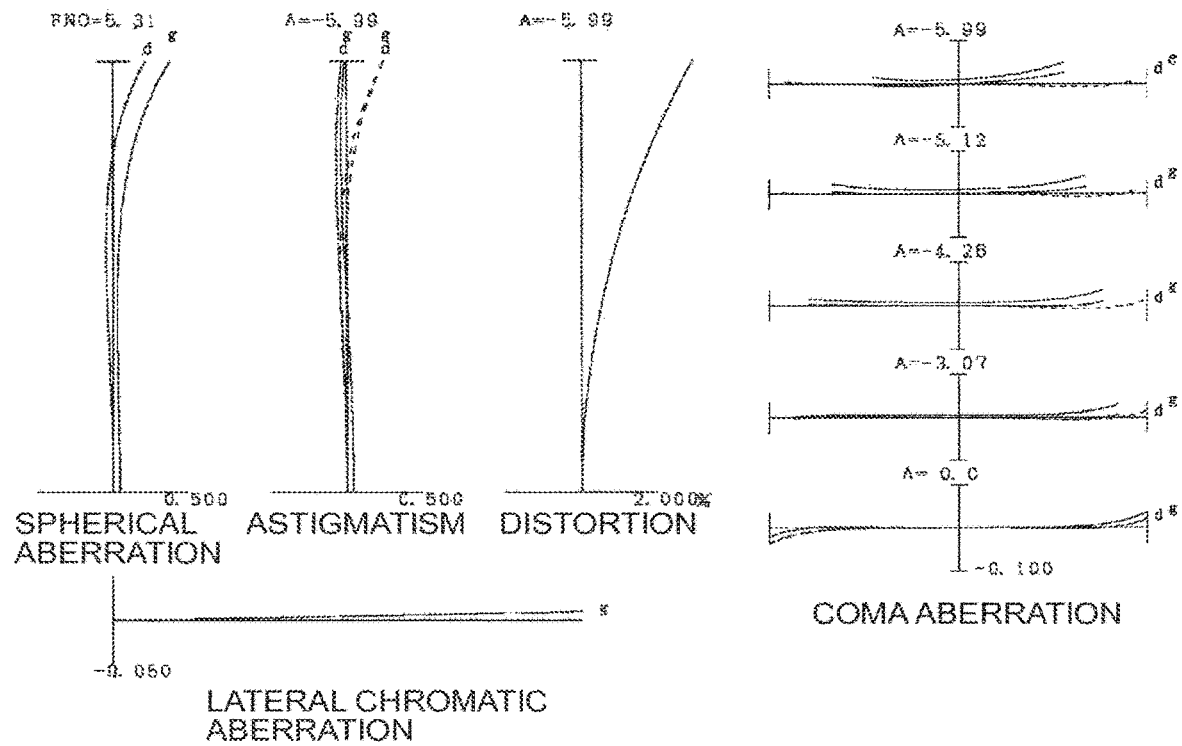
FIGS. 20A and 20B are sets of graphs showing various aberrations of the zooming optical system according to Example 5 in the intermediate focal length state, where
Figure 20B:
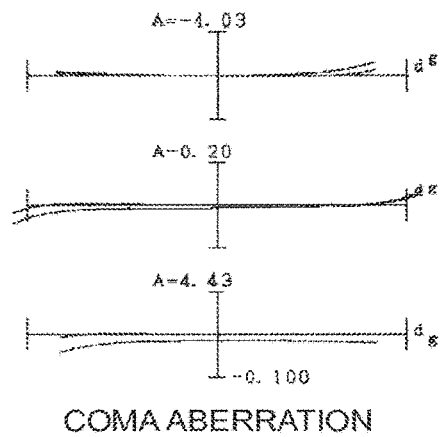
Figure 21A:
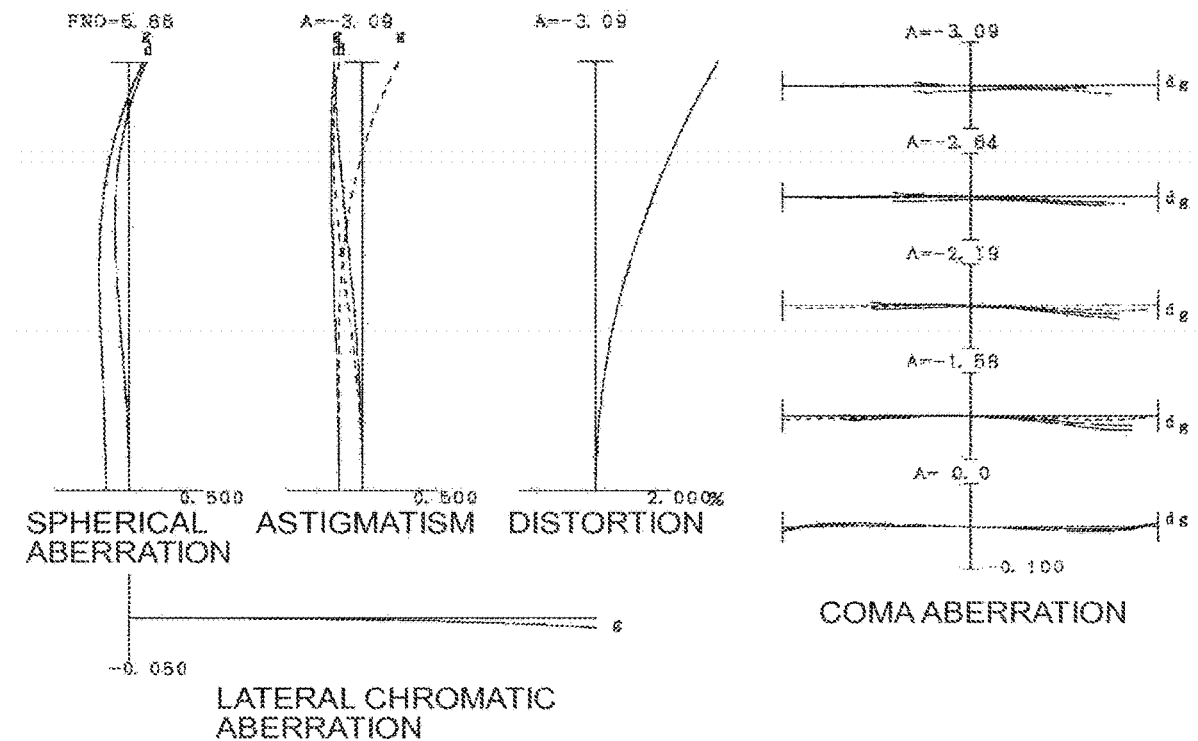
FIGS. 21A and 21B are sets of graphs showing various aberrations of the zooming optical system according to Example 5 in the telephoto end state, where
Figure 21B:
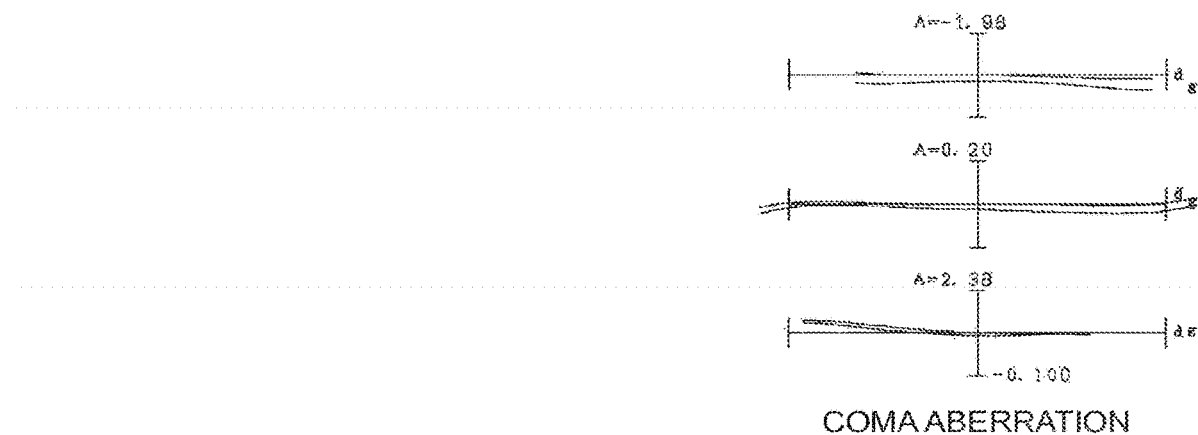

FIG. 19A is a set of graphs showing various aberrations of Example 5 upon focusing on infinity in the wide-angle end state, FIG. 20A is a set of graphs showing various aberrations of Example 5 upon focusing on infinity in the intermediate focal length state, and FIG. 21A is a set of graphs showing various aberrations of Example 5 upon focusing on infinity in the telephoto end state. FIG. 19B is a set of graphs showing coma aberration of Example 3 when image blur is corrected upon focusing on infinity in the wide-angle end state (shift amount of vibration-isolating lens group=−0.419), FIG. 20B is a set of graphs showing coma aberration when image blur is corrected upon focusing on infinity in the intermediate focal length state (shift amount of vibration-isolating lens group=−0.538), and FIG. 21B is a set of graphs showing coma aberration when image blur is corrected upon focusing on infinity in the telephoto end state (shift amount of vibration-isolating lens group=−0.682). As each graph showing aberrations clarifies, in Example 5, the zooming optical system has an excellent image forming performance, where various aberrations are corrected well in each focal length state from the wide-angle end state to the telephoto end state.

Figure 26:
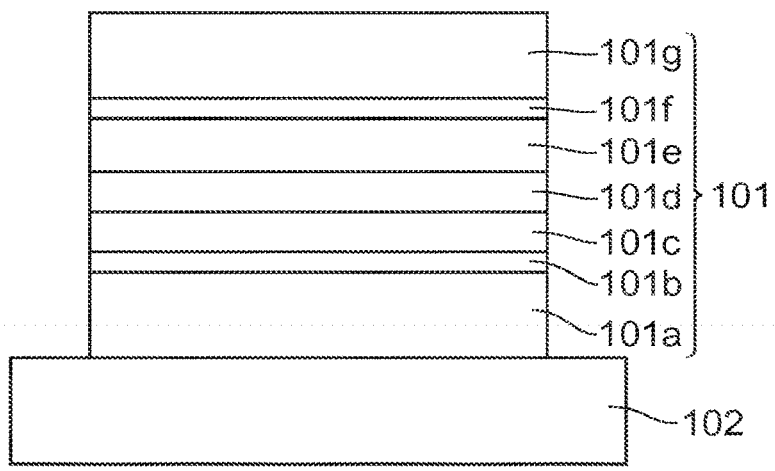
FIG. 26 is a diagram depicting a structure of an anti-reflection film according to the example.

The anti-reflection film used for the zooming optical systems ZL (ZL1 to ZL5) according to Example 1 to Example 5 will now be described. As FIG. 26 shows, the anti-reflection film 101 according to each example is constituted by seven layers (first layer 101a to seventh layer 101g), and is formed on the optical surface of an optical member 102 of the zooming optical system ZL.

The first layer 101a composed of aluminum oxide is deposited by a vacuum deposition method. The second layer 101b composed of a mixture of titanium oxide and zirconium oxide is deposited on the first layer 101a by the vacuum deposition method. Then the third layer 101c composed of aluminum oxide is deposited on the second layer 101b by the vacuum deposition method, and the fourth layer 101d composed of a mixture of titanium oxide and zirconium oxide is deposited on the third layer 101c by the vacuum deposition method. Then the fifth layer 101e composed of aluminum oxide is deposited on the fourth layer 101d by the vacuum deposition method, and the sixth layer 101f composed of a mixture of titanium oxide and zirconium oxide is deposited on the fifth layer 101e by a vacuum deposition method. Then the seventh layer 101g composed of a mixture of silica and magnesium fluoride is deposited on the sixth layer 101f by a wet process. Thereby the anti-reflection film 101 of each example is formed.

To form the seventh layer 101g, a sol-gel method, which is a type of wet process, is used. The sol-gel method is a method of generating a film by coating sol, which is an optical thin film material, on an optical surface of an optical member, depositing a gel film thereon, dipping the optical surface in liquid, and increasing the temperature of the liquid and pressure to be at or more than the critical state, so as to vaporize and dry the liquid. The wet process is not limited to the sol-gel method, but may be a method of acquiring a solid film bypassing the gel state.

As described above, the first layer 101a to the sixth layer 101f of the anti-reflection film 101 are formed by electron beam deposition, which is the dry process, and the seventh layer 101g, which is the outermost layer (top layer), is formed by the wet process using the sol solution prepared by the hydrofluoric acid/magnesium acetate method.

Now a procedure to form the anti-reflection film 101 having this configuration will be described. First the aluminum oxide layer to be the first layer 101a, the titanium oxide-zirconium oxide mixed layer to be the second layer 101b, the aluminum oxide layer to be the third layer 101c, the titanium oxide-zirconium oxide mixed layer to be the fourth layer 101d, the aluminum oxide layer to be the fifth layer 101e, and the titanium oxide-zirconium oxide mixed layer to be the sixth layer 101f are sequentially formed on the film deposition surface of the lens (optical surface of the optical member 102) using a vacuum deposition apparatus. After removing the optical member 102 out of the vacuum deposition apparatus, the binder component-added sol solution, prepared by the hydrofluoric acid/magnesium acetate method, is coated on the optical surface by a spin coat method, whereby a layer composed of a mixture of silica and magnesium fluoride to be the seventh layer 101g is formed. The reaction formula in this preparation performed by the hydrofluoric acid/magnesium acetate method is shown below.

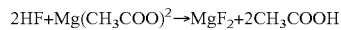

$$2HF + Mg(CH_3COO)^2 \rightarrow MgF_2 + 2CH_3COOH$$

For the sol solution used for the film deposition, raw materials are mixed first, and high temperature heating and aging processing is performed on the mixture at 140° C. for 24 hours in an autoclave before being used for film deposition. After the deposition of the seventh layer 101g is completed, the optical member 102 is heated at 160° C. in air for one hour, and processing completes. In concrete terms, several nm to several dozens of nm sized $MgF_2$ particles are formed by the sol-gel method, and several of these particles are gathered respectively and secondary particles are formed, and the seventh layer 101g is formed by the deposition of these secondary particles.

Figure 27:
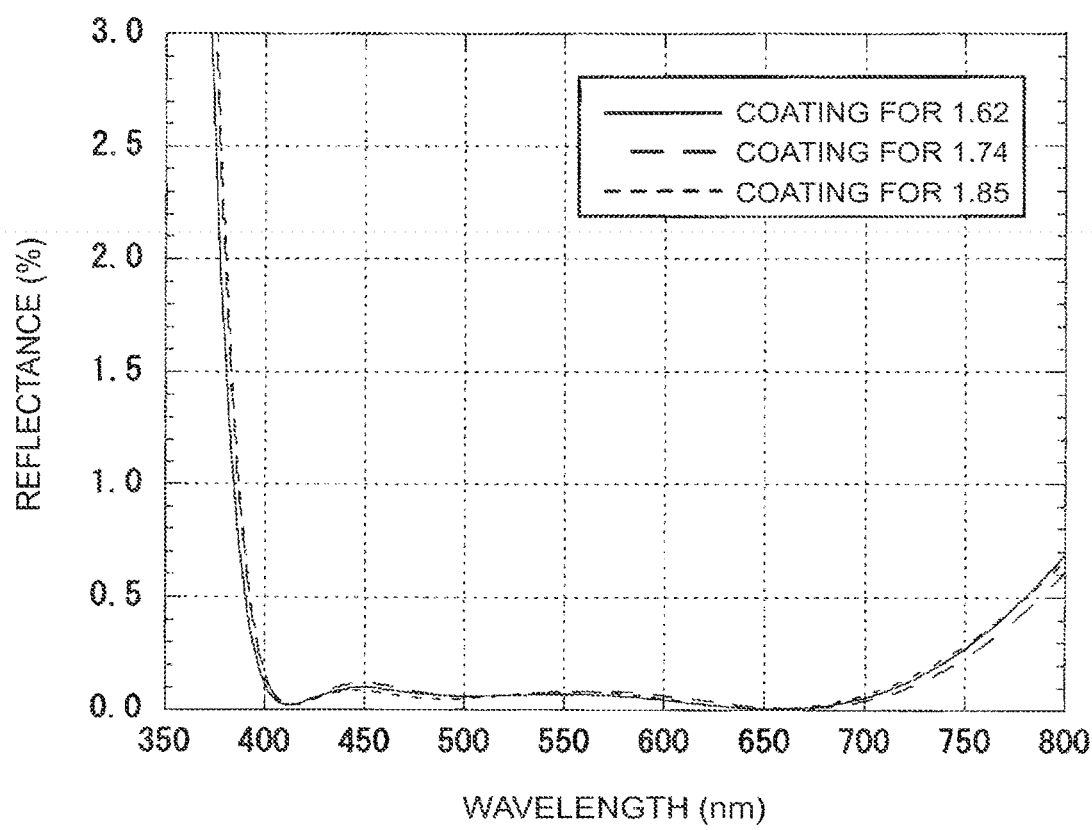
FIG. 27 is a graph depicting a spectral characteristic of the anti-reflection film according to the example.

The optical performance of the anti-reflection film 101 formed like this will be described with reference to the spectral Characteristics shown in FIG. 27. FIG. 27 shows the spectral Characteristics when light vertically enters the anti-reflection film 101 designed under the conditions shown in the following Table 16 (reference wavelength λ is 550 nm). In Table 16, $Al_2O_3$ indicates aluminum oxide, $ZrO_2$+$TiO_2$ indicates the titanium oxide-zirconium oxide mixture, and $SiO_2$+$MgF_2$ indicates the mixture of silica and magnesium fluoride, and shows the respective design values when the refractive indexes of the substrate are 1.46, 1.62, 1.74 and 1.85 (reference wavelength λ is 550 nm).

TABLE 16

| | Substance | Refractive Index | Optical Film Thickness | Optical Film Thickness | Optical Film Thickness | Optical Film Thickness |
|---|---|---|---|---|---|---|
| Medium | Air | 1.00 | | | | |
| Seventh layer | $SiO_2$ + $MgF_2$ | 1.26 | 0.275λ | 0.268λ | 0.271λ | 0.269λ |
| Sixth layer | $ZrO_2$ + $TiO_2$ | 2.12 | 0.045λ | 0.057λ | 0.054λ | 0.059λ |
| Fifth layer | $Al_2O_3$ | 1.65 | 0.212λ | 0.171λ | 0.178λ | 0.162λ |
| Fourth layer | $ZrO_2$ + $TiO_2$ | 2.12 | 0.077λ | 0.127λ | 0.130λ | 0.158λ |
| Third layer | $Al_2O_3$ | 1.65 | 0.288λ | 0.122λ | 0.107λ | 0.080λ |
| Second layer | $ZrO_2$ + $TiO_2$ | 2.12 | 0 | 0.059λ | 0.075λ | 0.105λ |
| First layer | $Al_2O_3$ | 1.65 | 0 | 0.257λ | 0.030λ | 0.030λ |
| Refractive index of substrate | | | 1.46 | 1.62 | 1.74 | 1.85 |

As shown in FIG. 27, the reflectance is controlled to 0.2% or less in the entire region of wavelengths 420 nm to 720 nm.

In the zooming optical system ZL1 of Example 1, the refractive index of the plano-convex lens L54 is 1.51742, hence the anti-reflection film corresponding to 1.46 of the refractive index of the substrate can be used for the image side lens surface of the plano-convex lens L54. The refractive index of the biconvex lens L55 is 1.64769, hence the anti-reflection film corresponding to 1.62 of the refractive index of the substrate can be used for the object side lens surface of the biconvex lens L55.

In the zooming optical system ZL2 of Example 2, the refractive index of the negative meniscus lens L53 is 1.84666, hence the anti-reflection film corresponding to 1.85 of the refractive index of the substrate can be used for the image side lens surface of the negative meniscus lens L53. The refractive index of the biconvex lens L61 is 1.72825, hence the anti-reflection film corresponding to 1.74 of the refractive index of the substrate can be used for the object side lens surface of the biconvex lens L61.

In the zooming optical system ZL3 of Example 3, the refractive index of the negative meniscus lens L54 is 1.84666, hence the anti-reflection film corresponding to 1.85 of the refractive index of the substrate can be used for the image side lens surface of the negative meniscus lens L54. The refractive index of the biconvex lens L61 is 1.75520, hence the anti-reflection film corresponding to 1.74 of the refractive index of the substrate can be used for the object side lens surface of the biconvex lens L61.

In the zooming optical system ZL4 of Example 4, the refractive index of the negative meniscus lens L54 is 1.84666, hence the anti-reflection film corresponding to 1.85 of the refractive index of the substrate can be used for the image side lens surface of the negative meniscus lens L54. The refractive index of the biconvex lens L61 is 1.71736, hence the anti-reflection film corresponding to 1.74 of the refractive index of the substrate can be used for the object side lens surface of the biconvex lens L61.

In the zooming optical system ZL5 of Example 5, the refractive index of the positive meniscus lens L53 is 1.49782, hence the anti-reflection film corresponding to 1.46 of the refractive index of the substrate can be used for the image side lens surface of the positive meniscus lens L53. The refractive index of the biconvex lens L54 is 1.75520, hence the anti-reflection film corresponding to 1.74 of the refractive index of the substrate can be used for the object side lens surface of the biconvex lens L54.

By applying the anti-reflection film 101 of each example to the zooming optical system ZL (ZL1 to ZL5) according to Examples 1 to 5 respectively, a zooming optical system having high optical performance to further decreases ghosts and flares, an optical apparatus including this zooming optical system, and a zooming method for the zooming optical system, can be provided.

The anti-reflection film 101 may be used as an optical element disposed on the optical surface of a plane parallel plate, or may be disposed on the optical surface of a lens formed in a curved shape.

A modification of the anti-reflection film 101 will be described next. The anti-reflection film according to this modification is constituted by five layers, and is constructed under the following conditions in Table 17. The above mentioned sol-gel method is used to form the fifth layer. Table 17 shows the design values when the reference wavelength λ is 550 nm and the refractive index of the substrate is 1.52.

TABLE 17

| | Substance | Refractive index | Optical film thickness |
|---|---|---|---|
| Medium | Air | 1.00 | |
| Fifth layer | Mixture of silica and magnesium fluoride | 1.26 | 0.269λ |
| Fourth layer | Titanium oxide-zirconium oxide mixture | 2.12 | 0.043λ |
| Third layer | Aluminum oxide | 1.65 | 0.217λ |
| Second layer | Titanium oxide-zirconium oxide mixture | 2.12 | 0.066λ |
| First layer | Aluminum oxide | 1.65 | 0.290λ |
| Substrate | BK7 | 1.52 | |

Figure 28:
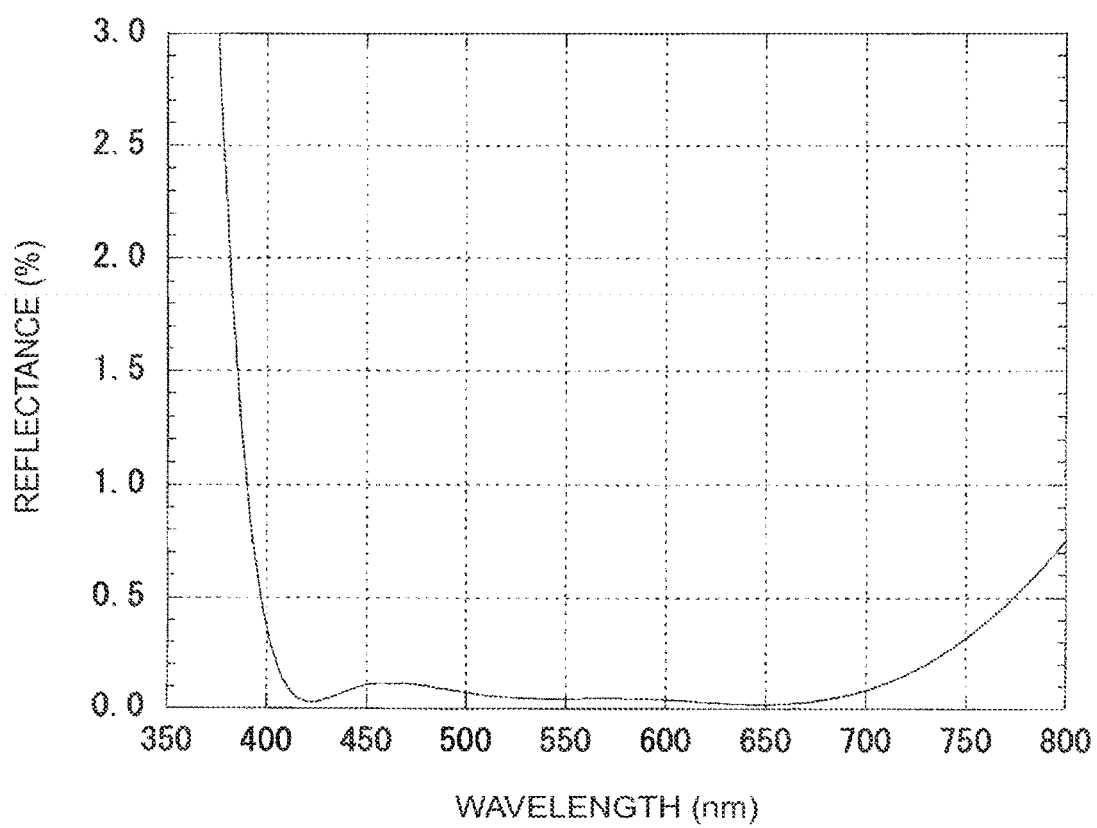
FIG. 28 is a graph depicting a spectral characteristic of the anti-reflection film according to a modification.
Figure 29:
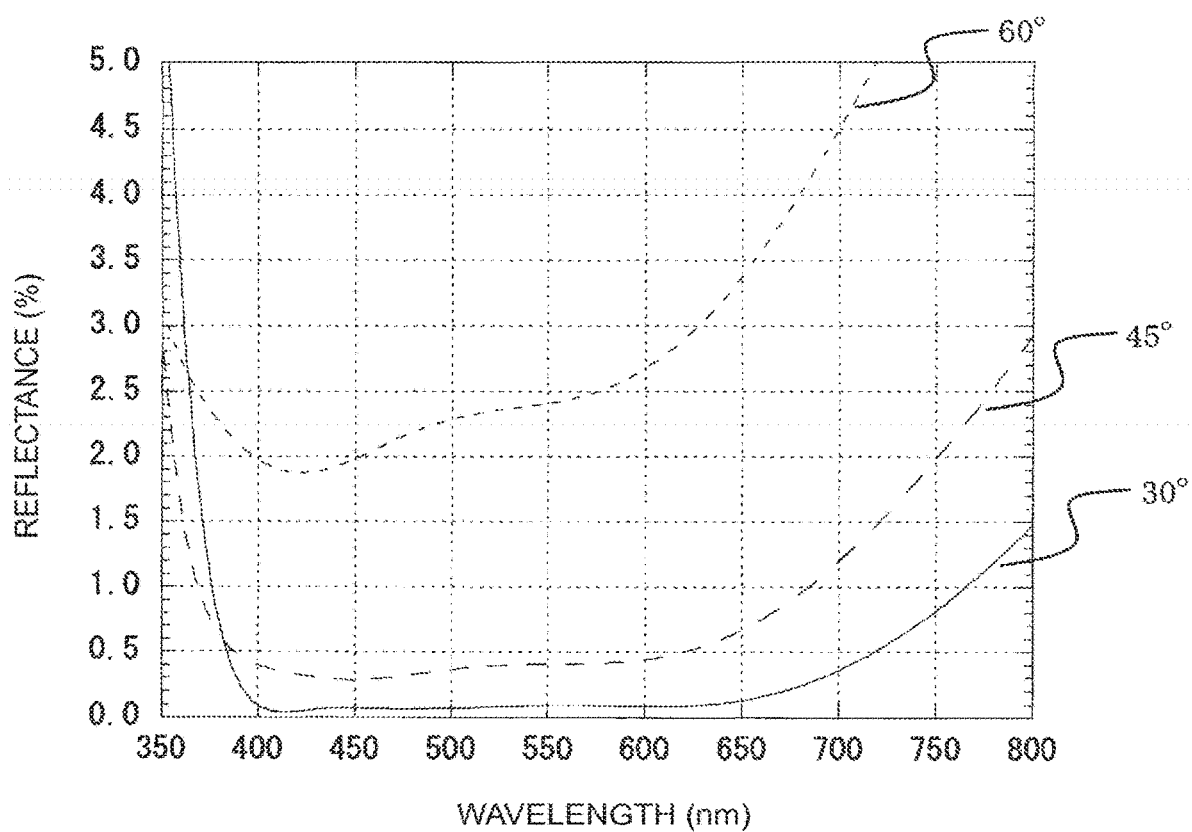
FIG. 29 is a graph depicting a spectral characteristic of the anti-reflection film according to a modification.

FIG. 28 shows the spectral characteristics when light vertically enters the anti-reflection film of the modification. As FIG. 28 shows, the reflectance is controlled to 0.2% or less in the entire region of wavelengths 420 nm to 720 nm. FIG. 29 shows the spectral characteristics in the case when the incident angle is 30°, 45° or 60°.

Figure 30:
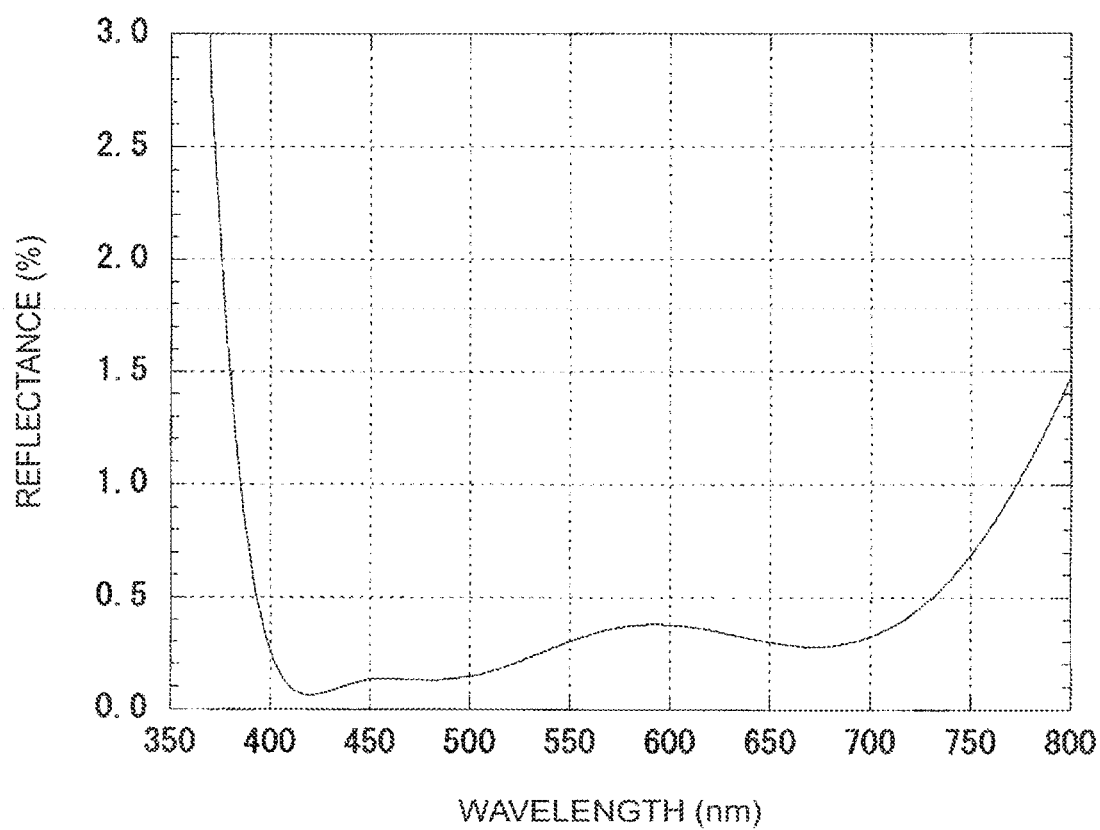
FIG. 30 is a graph depicting a spectral characteristic of an anti-reflection film formed by a prior art.
Figure 31:
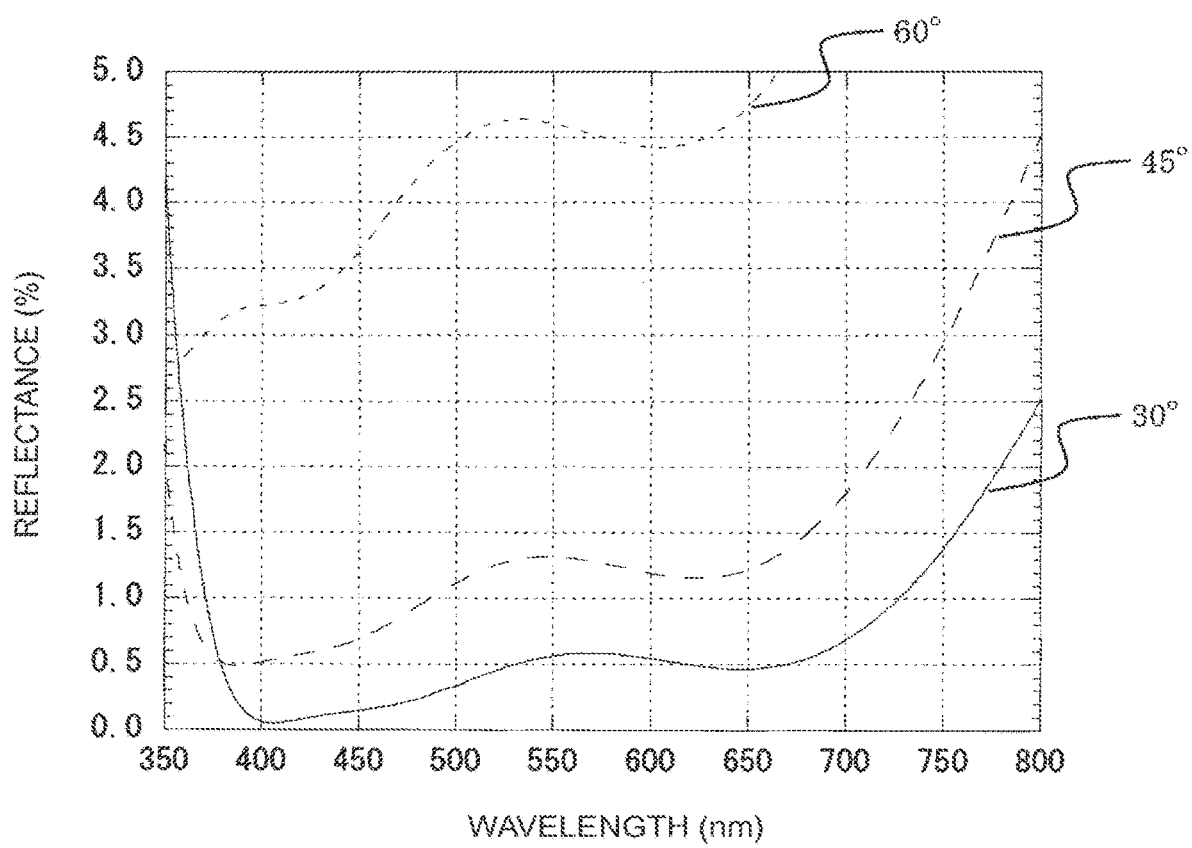
FIG. 31 is a graph depicting a spectral characteristic of an anti-reflection film formed by a prior art.

For comparison, FIG. 30 shows the spectral characteristics when light vertically enters a multilayered wideband anti-reflection film, which is formed only by a dry process, such as a conventional vacuum deposition method, and is constructed under the following conditions in Table 18. FIG. 31 shows the spectral characteristics in the case when the incident angle is 30°, 45° or 60°.

TABLE 18

| | Substance | Refractive index | Optical film thickness |
|---|---|---|---|
| Medium | Air | 1.00 | |
| Seventh layer | MgF$_2$ | 1.39 | 0.243λ |
| Sixth layer | Titanium oxide-zirconium oxide mixture | 2.12 | 0.119λ |
| Fifth layer | Aluminum oxide | 1.65 | 0.057λ |
| Fourth layer | Titanium oxide-zirconium oxide mixture | 2.12 | 0.220λ |
| Third layer | Aluminum oxide | 1.65 | 0.064λ |
| Second layer | Titanium oxide-zirconium oxide mixture | 2.12 | 0.057λ |
| First layer | Aluminum oxide | 1.65 | 0.193λ |
| Substrate | BK7 | 1.52 | |

The comparison of the spectral characteristics of the modification shown in FIG. 28 and FIG. 29 with the spectral Characteristics of the prior art shown in FIG. 30 and FIG. 31 clearly demonstrates that the reflectance of the anti-reflection film according to the modification is low.

As described above, according to these examples, a high performance optical system that has a camera shake correction mechanism and that can further decrease ghosts and flares, an optical apparatus including this zooming optical system, and a zooming method for the zooming optical system, can be provided.

EXPLANATION OF NUMERALS AND CHARACTERS

ZL (ZL1 to ZL5) zooming optical system
G1 first lens group
G2 second lens group
G3 third lens group
G4 fourth lens group
G5 fifth lens group
S1 aperture stop
1 camera (optical apparatus)

The invention claimed is:

1. A zooming optical system comprising, in order from an object:
   a first lens group having positive refractive power;
   a second lens group having negative refractive power;
   a third lens group having positive refractive power;
   a fourth lens group having negative refractive power; and
   a fifth lens group having positive refractive power,
   wherein, upon zooming, distances between adjacent lens groups of the first to the fifth lens groups change respectively, and
   the following conditional expressions are satisfied:

$$9.6 < ft/(-f2) < 20.0$$

$$1.30 \leq (-f4)/f5 < 1.8$$

$$0.48 \leq f3/f5 < 1.06$$

$$0.11 < f2/f4 \leq 0.21$$

where
ft denotes a focal length of the zooming optical system in a telephoto end state,
f2 denotes a focal length of the second lens group,
f3 denotes a focal length of the third lens group,
f4 denotes a focal length of the fourth lens group, and
f5 denotes a focal length of the fifth lens group.

2. The zooming optical system according to claim 1, wherein the following conditional expression is satisfied:

$$3.9 < ft/(-f4) < 8.8.$$

3. The zooming optical system according to claim 1, wherein the second lens group is fixed with respect to an image plane upon zooming.

4. The zooming optical system according to claim 1, wherein the following conditional expression is satisfied:

$$0.3 < (-f2)/f5 < 0.8.$$

5. The zooming optical system according to claim 1, wherein the following conditional expression is satisfied:

$$1.9 < f1/f5 < 3.2$$

where f1 denotes a focal length of the first lens group.

6. The zooming optical system according to claim 1, wherein the following conditional expression is satisfied:

$$0.44 < (-f2)/f3 < 0.86.$$

7. The zooming optical system according to claim 1, wherein the following conditional expression is satisfied:

$$0.18 < f3/(-f4) < 0.92.$$

8. The zooming optical system according to claim 1, wherein the following conditional expression is satisfied:

$$0.70 < f1/(-f4) < 2.55$$

where f1 denotes a focal length of the first lens group.

9. An optical apparatus for forming an object image on a predetermined image plane, comprising the zooming optical system according to claim 1.

10. A zooming optical system comprising, in order from an object:
a first lens group having positive refractive power;
a second lens group having negative refractive power;
a third lens group having positive refractive power;
a fourth lens group having negative refractive power; and
a fifth lens group having positive refractive power,
wherein, upon zooming, distances between adjacent lens groups of the first to the fifth lens groups change respectively, and
the following conditional expressions are satisfied:

$$0.60 < (-f2)/f3 < 0.86$$

$$1.84 \leq f1/(-f4) < 2.55$$

where
f1 denotes a focal length of the first lens group,
f2 denotes a focal length of the second lens group,
f3 denotes a focal length of the third lens group, and
f4 denotes a focal length of the fourth lens group.

11. The zooming optical system according to claim 10, wherein the following conditional expression is satisfied:

$$0.18 < f3/(-f4) < 0.92.$$

12. The zooming optical system according to claim 10, wherein the following conditional expression is satisfied:

$$0.10 < f3/f5 < 1.06$$

where
f5 denotes a focal length of the fifth lens group.

13. The zooming optical system according to claim 10, wherein the following conditional expression is satisfied:

$$0.11 < f2/f4 < 0.62.$$

14. An optical apparatus for forming an object image on a predetermined image plane, comprising the zooming optical system according to claim 10.

15. A zooming optical system comprising, in order from an object:
a first lens group having positive refractive power;
a second lens group having negative refractive power;
a third lens group having positive refractive power;
a fourth lens group having negative refractive power; and
a fifth lens group having positive refractive power,
wherein, upon zooming, distances between adjacent lens groups of the first to the fifth lens groups change respectively, and
the following conditional expressions are satisfied:

$$0.50 \leq (-f2)/f5 < 0.8$$

$$0.10 < f3/f5 < 0.85$$

where
f2 denotes a focal length of the second lens group,
f3 denotes a focal length of the third lens group, and
f5 denotes a focal length of the fifth lens group.

16. The zooming optical system according to claim 15, wherein the following conditional expression is satisfied:

$$1.9 < f1/f5 < 3.2$$

where
f1 denotes a focal length of the first lens group.

17. The zooming optical system according to claim 15, wherein the following conditional expression is satisfied:

$$0.10 < f3/f5 < 1.06.$$

18. An optical apparatus for forming an object image on a predetermined image plane, comprising the zooming optical system according to claim 15.

19. A zooming optical system comprising, in order from an object:
a first lens group having positive refractive power;
a second lens group having negative refractive power;
a third lens group having positive refractive power;
a fourth lens group having negative refractive power; and
a fifth lens group having positive refractive power,
wherein, upon zooming, distances between adjacent lens groups of the first to the fifth lens groups change respectively, and
the following conditional expressions are satisfied:

$$0.66 \leq (-f2)/f3 < 0.86$$

$$0.18 < f3/(-f4) \leq 0.71$$

where
f2 denotes a focal length of the second lens group,
f3 denotes a focal length of the third lens group, and
f4 denotes a focal length of the fourth lens group.

20. The zooming optical system according to claim 19, wherein the following conditional expression is satisfied:

$$0.10 < f3/f5 < 1.06$$

where
f5 denotes a focal length of the fifth lens group.

21. The zooming optical system according to claim 19, wherein the following conditional expression is satisfied:

$$0.11 < f2/f4 < 0.62.$$

22. An optical apparatus for forming an object image on a predetermined image plane, comprising the zooming optical system according to claim 19.

23. A manufacturing method for a zooming optical system, comprising in order from an object, a first lens group having positive refractive power, a second lens group having negative refractive power, a third lens group having positive refractive power, a fourth lens group having negative refractive power and a fifth lens group having positive refractive power, the method comprising:
arranging the lens groups in a lens barrel such that:
upon zooming, distances between adjacent lens groups of the first to the fifth lens groups change respectively, and the method further comprising satisfying one or more of the following sets A to D of conditional expressions:

$9.6 < ft/(-f2) < 20.0$ $1.30 \leq (-f4)/f5 < 1.8$ $0.48 \leq f3/f5 < 1.06$ $0.11 < f2/f4 \leq 0.21$ Set A $0.60 \leq (-f2)/f3 < 0.86$ $1.84 \leq f1/(-f4) < 2.55$ Set B $0.50(f2)/f5 < 0.8$ $0.10 < f3/f5 \leq 0.85$ Set C $0.66 \leq (-f2)/f3 < 0.86$ $0.18 < f3/(-f4) \leq 0.71$ Set D where
ft: denotes a focal length of the zooming optical system in a telephoto end state,
f1 denotes a focal length of the second lens group,
f2 denotes a focal length of the second lens group,
f3 denotes a focal length of the third lens group,
f4 denotes a focal length of the fourth lens group, and
f5 denotes a focal length of the fifth lens group.

\* \* \* \* \*